United States Patent
Reisman

(10) Patent No.: US 9,484,077 B2
(45) Date of Patent: *Nov. 1, 2016

(54) PROVIDING SERVICES FROM A REMOTE COMPUTER SYSTEM TO A USER STATION OVER A COMMUNICATIONS NETWORK

(75) Inventor: Richard R. Reisman, New York, NY (US)

(73) Assignee: Intellectual Ventures I LLC, Wilmington, DE (US)

( * ) Notice: Subject to any disclaimer, the term of this patent is extended or adjusted under 35 U.S.C. 154(b) by 948 days.

This patent is subject to a terminal disclaimer.

(21) Appl. No.: 12/893,112

(22) Filed: Sep. 29, 2010

(65) Prior Publication Data

US 2011/0016192 A1 Jan. 20, 2011

Related U.S. Application Data

(60) Continuation of application No. 12/603,229, filed on Oct. 21, 2009, which is a division of application No. 11/513,329, filed on Aug. 31, 2006, now abandoned, which is a continuation of application No.

(Continued)

(51) Int. Cl.
*G11C 8/18* (2006.01)
*G06F 9/445* (2006.01)
(Continued)

(52) U.S. Cl.
CPC . *G11C 8/18* (2013.01); *G06F 8/65* (2013.01); *G06Q 10/025* (2013.01);
(Continued)

(58) Field of Classification Search
CPC ......... H04L 29/06; H04L 67/00; G06F 8/65; G06Q 10/025; G06Q 10/067; G06Q 20/20; G06Q 20/382; G06Q 30/0601; G06Q 30/0609; G06Q 30/0623; G06Q 30/0635; G06Q 30/0641; G06Q 40/04; G06Q 40/123; G06Q 40/12; G11C 8/18; Y10S 707/99931

USPC .......................... 709/217, 218, 227; 705/14.1
See application file for complete search history.

(56) References Cited

U.S. PATENT DOCUMENTS 3,859,468 A   1/1975 Smith et al.
3,974,480 A   8/1976 Gernelle
(Continued)

FOREIGN PATENT DOCUMENTS

EP   0 463 251 A1   1/1992
EP   0 680 185 A2   11/1995
(Continued)

OTHER PUBLICATIONS

Complaint for Patent Infringement filed by Intellectual Ventures I LLC and Intellectual Ventures II LLC, in *Intellectual Ventures I LLC and Intellectual Ventures II LLC v. Motorola Mobility, Inc.*, Case No. 1:11-cv-00908-UNA United States District Court for the District of Delaware, filed Oct. 6, 2011; 9 pages.

(Continued)

*Primary Examiner* — Harunur Rashid

(57) ABSTRACT

A method includes receiving first information at a remote computer system during a first user-initiated communication session for a user station not previously identified to the remote computer system, sending second information that is a function of and different from the first information to the user station over the communications network during the first user-initiated communication session stored automatically at the user station, storing third information based on the first information at a location remote from the user station, receiving the second information over the communications network during a subsequent and separate user-initiated communication session automatically from the user station, retrieving the stored third information using the received second information, during the subsequent and separate communication session and using the retrieved third information for interaction with the remote computer system during the subsequent and separate communication session.

10 Claims, 12 Drawing Sheets

Related U.S. Application Data

09/556,062, filed on Apr. 20, 2000, now Pat. No. 8,131,883, which is a continuation-in-part of application No. 08/982,157, filed on Dec. 1, 1997, now Pat. No. 6,125,388, which is a continuation-in-part of application No. 08/251,724, filed on May 31, 1994, now Pat. No. 5,694,546, said application No. 09/556,062 is a continuation-in-part of application No. 08/641,010, filed on Apr. 29, 1996, now Pat. No. 6,594,692, which is a continuation-in-part of application No. 08/251,724, filed on May 31, 1994, now Pat. No. 5,694,546.

(51) Int. Cl.
| | |
|---|---|
| *G06Q 10/02* | (2012.01) |
| *G06Q 10/06* | (2012.01) |
| *G06Q 20/20* | (2012.01) |
| *G06Q 20/38* | (2012.01) |
| *G06Q 30/06* | (2012.01) |
| *G06Q 40/04* | (2012.01) |
| *H04L 29/06* | (2006.01) |
| *H04L 29/08* | (2006.01) |
| *G06Q 40/00* | (2012.01) |

(52) U.S. Cl.
CPC ........... *G06Q 10/067* (2013.01); *G06Q 20/20* (2013.01); *G06Q 20/382* (2013.01); *G06Q 30/0601* (2013.01); *G06Q 30/0609* (2013.01); *G06Q 30/0623* (2013.01); *G06Q 30/0635* (2013.01); *G06Q 30/0641* (2013.01); *G06Q 40/04* (2013.01); *G06Q 40/12* (2013.12); *G06Q 40/123* (2013.12); *H04L 29/06* (2013.01); *H04L 67/00* (2013.01); *H04L 69/329* (2013.01); *Y10S 707/99931* (2013.01); *Y10S 707/99944* (2013.01); *Y10S 707/99945* (2013.01)

(56) References Cited

U.S. PATENT DOCUMENTS

| | | |
|---|---|---|
| 4,009,469 A | 2/1977 | Boudreau et al. |
| 4,049,906 A | 9/1977 | Hafner et al. |
| 4,059,729 A | 11/1977 | Eddy et al. |
| 4,081,612 A | 3/1978 | Hafner |
| 4,264,782 A | 4/1981 | Konheim |
| 4,274,139 A | 6/1981 | Hodgkinson et al. |
| 4,313,036 A | 1/1982 | Jabara et al. |
| 4,317,197 A | 2/1982 | Ulug |
| 4,334,306 A | 6/1982 | Ulug |
| 4,348,740 A | 9/1982 | White |
| 4,352,103 A | 9/1982 | Slater |
| 4,354,267 A | 10/1982 | Mori et al. |
| 4,365,248 A | 12/1982 | Bargeton et al. |
| 4,380,061 A | 4/1983 | Mori et al. |
| 4,432,057 A | 2/1984 | Daniell et al. |
| 4,458,331 A | 7/1984 | Amezcua et al. |
| 4,463,350 A | 7/1984 | Kajiura et al. |
| 4,480,308 A | 10/1984 | Grafe et al. |
| 4,495,490 A | 1/1985 | Hopper et al. |
| 4,506,357 A | 3/1985 | Nakayashiki et al. |
| 4,509,117 A | 4/1985 | Korowitz |
| 4,527,270 A | 7/1985 | Sweeton |
| 4,528,643 A | 7/1985 | Freeny, Jr. |
| 4,553,233 A | 11/1985 | Debuysscher et al. |
| 4,554,659 A | 11/1985 | Blood et al. |
| 4,558,413 A | 12/1985 | Schmidt et al. |
| 4,584,641 A | 4/1986 | Guglieimino |
| 4,586,134 A | 4/1986 | Norstedt |
| 4,587,651 A | 5/1986 | Nelson et al. |
| 4,604,686 A | 8/1986 | Reiter et al. |
| 4,627,045 A | 12/1986 | Olson et al. |
| 4,635,189 A | 1/1987 | Kendall |
| 4,646,229 A | 2/1987 | Boyle |
| 4,652,990 A * | 3/1987 | Pailen et al. .................... 705/56 |
| 4,654,799 A | 3/1987 | Ogaki |
| 4,674,055 A | 6/1987 | Ogaki |
| 4,679,191 A | 7/1987 | Nelson et al. |
| 4,683,563 A | 7/1987 | Rouse et al. |
| 4,706,121 A | 11/1987 | Young |
| 4,709,365 A | 11/1987 | Beale et al. |
| 4,714,989 A | 12/1987 | Billings |
| 4,714,992 A | 12/1987 | Gladney et al. |
| 4,714,995 A | 12/1987 | Materna et al. |
| 4,720,873 A | 1/1988 | Goodman et al. |
| 4,731,784 A | 3/1988 | Keller et al. |
| 4,734,858 A * | 3/1988 | Schlafly ................... 705/26.35 |
| 4,736,321 A | 4/1988 | Brown et al. |
| 4,736,363 A | 4/1988 | Aubin et al. |
| 4,737,978 A | 4/1988 | Burke et al. |
| 4,745,559 A | 5/1988 | Willis et al. |
| 4,746,559 A | 5/1988 | Nishikawa et al. |
| 4,752,924 A | 6/1988 | Darnell et al. |
| 4,760,572 A | 7/1988 | Tomikawa |
| 4,768,150 A | 8/1988 | Chang et al. |
| 4,769,807 A | 9/1988 | Niwa et al. |
| 4,769,810 A | 9/1988 | Eckberg, Jr. et al. |
| 4,771,419 A | 9/1988 | Graves et al. |
| 4,775,935 A | 10/1988 | Yourick |
| 4,789,863 A | 12/1988 | Bush |
| 4,792,865 A | 12/1988 | Baumeister |
| 4,796,181 A | 1/1989 | Wiedemer |
| 4,796,220 A * | 1/1989 | Wolfe ............................. 705/56 |
| 4,797,913 A | 1/1989 | Kaplan et al. |
| 4,799,156 A | 1/1989 | Shavit et al. |
| 4,805,134 A | 2/1989 | Calo et al. |
| 4,815,030 A | 3/1989 | Cross et al. |
| 4,837,812 A | 6/1989 | Takahashi et al. |
| 4,841,526 A | 6/1989 | Wilson et al. |
| 4,845,658 A | 7/1989 | Gifford |
| 4,851,994 A | 7/1989 | Toda et al. |
| 4,853,956 A | 8/1989 | Astmann |
| 4,855,905 A | 8/1989 | Estrada et al. |
| 4,866,788 A | 9/1989 | Mouly et al. |
| 4,868,866 A | 9/1989 | Williams, Jr. |
| 4,873,517 A | 10/1989 | Baratz et al. |
| 4,881,271 A | 11/1989 | Yamauchi et al. |
| 4,884,263 A | 11/1989 | Suzuki |
| 4,891,503 A * | 1/1990 | Jewell .......................... 235/380 |
| 4,894,857 A | 1/1990 | Szlam et al. |
| 4,897,781 A | 1/1990 | Chang et al. |
| 4,905,233 A | 2/1990 | Cain et al. |
| 4,908,848 A | 3/1990 | Hanawa |
| 4,935,870 A | 6/1990 | Burk, Jr. et al. |
| 4,937,784 A | 6/1990 | Masai et al. |
| 4,939,718 A | 7/1990 | Servel et al. |
| 4,947,028 A | 8/1990 | Gorog |
| 4,953,210 A | 8/1990 | Mcglynn et al. |
| 4,973,863 A | 11/1990 | Gotta, III et al. |
| 4,974,149 A | 11/1990 | Valenti |
| 4,984,155 A | 1/1991 | Geier et al. |
| 4,989,230 A | 1/1991 | Gillig et al. |
| 4,992,940 A | 2/1991 | Dworkin |
| 4,999,806 A | 3/1991 | Chernow et al. |
| 5,008,814 A | 4/1991 | Mathur |
| 5,008,853 A | 4/1991 | Bly et al. |
| 5,008,879 A | 4/1991 | Fischer et al. |
| 5,014,125 A | 5/1991 | Pocock et al. |
| 5,019,963 A | 5/1991 | Alderson et al. |
| 5,029,334 A | 7/1991 | Braun et al. |
| 5,047,928 A | 9/1991 | Wiedemer |
| 5,063,523 A | 11/1991 | Vrenjak |
| 5,067,127 A | 11/1991 | Ochiai |
| 5,077,607 A | 12/1991 | Johnson et al. |
| 5,083,800 A | 1/1992 | Lockton |
| 5,093,718 A | 3/1992 | Hoarty et al. |
| 5,093,921 A | 3/1992 | Bevins, Jr. |
| 5,099,235 A | 3/1992 | Crookshanks |
| 5,101,402 A | 3/1992 | Chiu et al. |
| 5,101,451 A | 3/1992 | Ash et al. |
| 5,103,392 A | 4/1992 | Mori |
| 5,113,393 A | 5/1992 | Kam et al. |

(56) References Cited

U.S. PATENT DOCUMENTS

| | | |
|---|---|---|
| 5,113,440 A | 5/1992 | Harney et al. |
| 5,120,076 A | 6/1992 | Luxenberg et al. |
| 5,124,909 A | 6/1992 | Blakely et al. |
| 5,133,075 A | 7/1992 | Risch |
| 5,138,609 A | 8/1992 | Hashimoto |
| 5,142,680 A | 8/1992 | Ottman et al. |
| 5,146,486 A | 9/1992 | Lebowitz |
| 5,155,484 A | 10/1992 | Chambers, IV |
| 5,155,591 A | 10/1992 | Wachob |
| 5,155,680 A | 10/1992 | Wiedemer |
| 5,155,847 A | 10/1992 | Kirouac et al. |
| 5,157,783 A | 10/1992 | Anderson et al. |
| 5,161,194 A | 11/1992 | Ujiie |
| 5,163,042 A | 11/1992 | Ochiai |
| 5,165,020 A | 11/1992 | Sudama et al. |
| 5,166,886 A | 11/1992 | Molnar et al. |
| 5,166,927 A | 11/1992 | Iida et al. |
| 5,167,013 A | 11/1992 | Hube et al. |
| 5,173,933 A | 12/1992 | Jabs et al. |
| 5,185,697 A | 2/1993 | Jacobs et al. |
| 5,187,787 A | 2/1993 | Skeen et al. |
| 5,191,410 A | 3/1993 | McCalley et al. |
| 5,201,067 A | 4/1993 | Grube et al. |
| 5,203,009 A | 4/1993 | Bogusz et al. |
| 5,204,897 A | 4/1993 | Wyman |
| 5,212,691 A | 5/1993 | Hokari |
| 5,216,515 A | 6/1993 | Steele et al. |
| 5,220,501 A * | 6/1993 | Lawlor et al. ................. 705/40 |
| 5,220,657 A | 6/1993 | Bly et al. |
| 5,222,133 A | 6/1993 | Chou et al. |
| 5,226,161 A | 7/1993 | Khoyi et al. |
| 5,227,778 A | 7/1993 | Vacon et al. |
| 5,227,874 A | 7/1993 | Von Kohorn |
| 5,228,137 A | 7/1993 | Kleinerman et al. |
| 5,229,814 A | 7/1993 | Hube et al. |
| 5,233,604 A | 8/1993 | Ahmadi et al. |
| 5,235,680 A | 8/1993 | Bijnagte |
| 5,237,157 A * | 8/1993 | Kaplan ........................ 235/375 |
| 5,241,594 A | 8/1993 | Kung |
| 5,247,683 A | 9/1993 | Holmes et al. |
| 5,249,044 A | 9/1993 | Von Kohorn |
| 5,249,218 A | 9/1993 | Sainton |
| 5,257,369 A | 10/1993 | Skeen et al. |
| 5,260,999 A | 11/1993 | Wyman |
| 5,261,044 A | 11/1993 | Dev et al. |
| 5,263,164 A | 11/1993 | Kannady et al. |
| 5,267,171 A | 11/1993 | Suzuki et al. |
| 5,274,643 A | 12/1993 | Fisk |
| 5,280,610 A | 1/1994 | Travis, Jr. et al. |
| 5,283,734 A | 2/1994 | Von Kohorn |
| 5,287,504 A | 2/1994 | Carpenter et al. |
| 5,289,371 A | 2/1994 | Abel et al. |
| 5,289,462 A | 2/1994 | Ahmadi et al. |
| 5,289,525 A | 2/1994 | Issenmann et al. |
| 5,297,031 A | 3/1994 | Gutterman et al. |
| 5,297,205 A | 3/1994 | Audebert et al. |
| 5,297,249 A | 3/1994 | Bernstein et al. |
| 5,299,197 A | 3/1994 | Schlafly |
| 5,303,042 A | 4/1994 | Lewis et al. |
| 5,303,379 A | 4/1994 | Khoyi et al. |
| 5,303,393 A | 4/1994 | Noreen et al. |
| 5,307,464 A | 4/1994 | Akao et al. |
| 5,307,490 A | 4/1994 | Davidson et al. |
| 5,309,355 A | 5/1994 | Lockwood |
| 5,313,631 A | 5/1994 | Kao |
| 5,317,566 A | 5/1994 | Joshi |
| 5,319,542 A | 6/1994 | King, Jr. et al. |
| 5,319,705 A | 6/1994 | Halter et al. |
| 5,321,750 A | 6/1994 | Nadan |
| 5,321,815 A | 6/1994 | Bartolanzo, Jr. et al. |
| 5,327,478 A | 7/1994 | Lebowitz |
| 5,331,543 A | 7/1994 | Yajima et al. |
| 5,337,360 A | 8/1994 | Fischer |
| 5,339,392 A | 8/1994 | Risberg et al. |
| 5,341,478 A | 8/1994 | Travis, Jr. et al. |
| 5,345,501 A | 9/1994 | Shelton |
| 5,347,450 A | 9/1994 | Nugent |
| 5,347,511 A | 9/1994 | Gun |
| 5,347,632 A | 9/1994 | Filepp et al. |
| 5,355,364 A | 10/1994 | Abali |
| 5,355,480 A | 10/1994 | Smith et al. |
| 5,359,603 A | 10/1994 | Mctiffin |
| 5,359,730 A | 10/1994 | Marron |
| 5,365,520 A | 11/1994 | Wang et al. |
| 5,367,563 A | 11/1994 | Sainton |
| 5,367,627 A | 11/1994 | Johnson |
| 5,367,686 A | 11/1994 | Fisher et al. |
| 5,369,705 A | 11/1994 | Bird et al. |
| 5,371,532 A | 12/1994 | Gelman et al. |
| 5,371,551 A | 12/1994 | Logan et al. |
| 5,371,735 A | 12/1994 | Denneau et al. |
| 5,371,852 A | 12/1994 | Attanasio et al. |
| 5,375,240 A * | 12/1994 | Grundy ........................ 726/28 |
| 5,379,424 A | 1/1995 | Morimoto et al. |
| 5,386,369 A | 1/1995 | Christiano |
| 5,388,211 A | 2/1995 | Hornbuckle |
| 5,390,247 A | 2/1995 | Fischer |
| 5,396,546 A | 3/1995 | Remillard |
| 5,404,488 A | 4/1995 | Kerrigan et al. |
| 5,404,505 A | 4/1995 | Levinson |
| 5,406,557 A | 4/1995 | Baudoin |
| 5,408,655 A | 4/1995 | Oren et al. |
| 5,410,646 A | 4/1995 | Tondevold et al. |
| 5,410,697 A | 4/1995 | Baird et al. |
| 5,410,698 A | 4/1995 | Danneels et al. |
| 5,412,654 A | 5/1995 | Perkins |
| 5,415,416 A | 5/1995 | Scagnelli et al. |
| 5,418,713 A | 5/1995 | Allen |
| 5,419,820 A | 5/1995 | Horton et al. |
| 5,421,009 A | 5/1995 | Platt |
| 5,426,747 A | 6/1995 | Weinreb et al. |
| 5,428,671 A | 6/1995 | Dykes et al. |
| 5,432,784 A | 7/1995 | Ozveren |
| 5,434,999 A | 7/1995 | Goire et al. |
| 5,440,547 A | 8/1995 | Esaki et al. |
| 5,440,744 A | 8/1995 | Jacobson et al. |
| 5,442,541 A | 8/1995 | Hube et al. |
| 5,442,771 A | 8/1995 | Filepp et al. |
| 5,442,791 A | 8/1995 | Wrabetz et al. |
| 5,444,763 A | 8/1995 | Lazaridis et al. |
| 5,444,856 A | 8/1995 | Bowers et al. |
| 5,448,566 A | 9/1995 | Richter et al. |
| 5,450,589 A | 9/1995 | Maebayashi et al. |
| 5,452,447 A | 9/1995 | Nelson et al. |
| 5,455,865 A | 10/1995 | Perlman |
| 5,457,679 A | 10/1995 | Eng et al. |
| 5,457,746 A | 10/1995 | Dolphin |
| 5,457,795 A | 10/1995 | Willman |
| 5,459,506 A | 10/1995 | Bushnell |
| 5,461,667 A | 10/1995 | Remillard |
| 5,463,777 A | 10/1995 | Bialkowski et al. |
| 5,473,679 A | 12/1995 | La Porta et al. |
| 5,473,772 A | 12/1995 | Halliwell et al. |
| 5,475,742 A | 12/1995 | Gilbert |
| 5,481,542 A | 1/1996 | Logston et al. |
| 5,481,720 A * | 1/1996 | Loucks et al. ................. 726/21 |
| 5,483,586 A | 1/1996 | Sussman |
| 5,485,370 A | 1/1996 | Moss et al. |
| 5,485,590 A | 1/1996 | Hyatt et al. |
| 5,487,065 A | 1/1996 | Acampora et al. |
| 5,490,252 A | 2/1996 | Macera et al. |
| 5,491,800 A | 2/1996 | Goldsmith et al. |
| 5,491,820 A | 2/1996 | Belove et al. |
| 5,495,411 A | 2/1996 | Ananda |
| 5,495,610 A | 2/1996 | Shing et al. |
| 5,496,177 A | 3/1996 | Collia et al. |
| 5,497,463 A | 3/1996 | Stein et al. |
| 5,497,491 A | 3/1996 | Mitchell et al. |
| 5,499,046 A | 3/1996 | Schiller et al. |
| 5,499,343 A | 3/1996 | Pettus |
| 5,499,357 A | 3/1996 | Sonty et al. |
| 5,504,589 A | 4/1996 | Montague et al. |
| 5,504,803 A | 4/1996 | Yamada et al. |
| 5,504,921 A | 4/1996 | Dev et al. |

(56) References Cited

U.S. PATENT DOCUMENTS

| | | |
|---|---|---|
| 5,504,935 A | 4/1996 | Vercauteren |
| 5,506,984 A | 4/1996 | Miller |
| 5,509,070 A | 4/1996 | Schull |
| 5,513,126 A | 4/1996 | Harkins et al. |
| 5,515,508 A | 5/1996 | Pettus et al. |
| 5,519,769 A | 5/1996 | Weinberger et al. |
| 5,519,875 A | 5/1996 | Yokoyama et al. |
| 5,522,089 A | 5/1996 | Kikinis et al. |
| 5,528,490 A | 6/1996 | Hill |
| 5,530,852 A | 6/1996 | Meske, Jr. et al. |
| 5,534,913 A | 7/1996 | Majeti et al. |
| 5,537,141 A | 7/1996 | Harper et al. |
| 5,537,417 A | 7/1996 | Sharma et al. |
| 5,539,735 A | 7/1996 | Moskowitz |
| 5,539,822 A | 7/1996 | Lett |
| 5,541,662 A | 7/1996 | Adams et al. |
| 5,541,991 A | 7/1996 | Benson et al. |
| 5,544,320 A | 8/1996 | Konrad |
| 5,548,645 A | 8/1996 | Ananda |
| 5,548,726 A | 8/1996 | Pettus |
| 5,548,745 A | 8/1996 | Egan et al. |
| 5,552,806 A | 9/1996 | Lenchik |
| 5,553,223 A | 9/1996 | Greenlee et al. |
| 5,553,242 A | 9/1996 | Russell et al. |
| 5,555,416 A | 9/1996 | Owens et al. |
| 5,555,427 A | 9/1996 | Aoe et al. |
| 5,555,553 A | 9/1996 | Jonsson |
| 5,557,541 A | 9/1996 | Schulhof et al. |
| 5,557,724 A | 9/1996 | Sampat et al. |
| 5,557,793 A | 9/1996 | Koerber |
| 5,557,798 A | 9/1996 | Skeen et al. |
| 5,559,549 A | 9/1996 | Hendricks et al. |
| 5,559,550 A | 9/1996 | Mankovitz |
| 5,559,936 A | 9/1996 | Poulter et al. |
| 5,560,008 A * | 9/1996 | Johnson et al. ................. 726/5 |
| 5,560,012 A | 9/1996 | Ryu et al. |
| 5,564,051 A | 10/1996 | Halliwell et al. |
| 5,566,302 A | 10/1996 | Khalidi et al. |
| 5,572,643 A | 11/1996 | Judson |
| 5,576,951 A | 11/1996 | Lockwood |
| 5,577,244 A | 11/1996 | Killebrew et al. |
| 5,577,251 A | 11/1996 | Hamilton et al. |
| 5,577,735 A | 11/1996 | Reed et al. |
| 5,579,537 A | 11/1996 | Takahisa |
| 5,581,461 A | 12/1996 | Coll et al. |
| 5,581,704 A | 12/1996 | Barbara et al. |
| 5,581,755 A | 12/1996 | Koerber et al. |
| 5,581,761 A | 12/1996 | Radia et al. |
| 5,581,764 A | 12/1996 | Fitzgerald et al. |
| 5,583,997 A | 12/1996 | Hart |
| 5,586,304 A | 12/1996 | Stupek, Jr. et al. |
| 5,586,311 A | 12/1996 | Davies et al. |
| 5,586,322 A | 12/1996 | Beck et al. |
| 5,586,326 A | 12/1996 | Ryu et al. |
| 5,590,334 A | 12/1996 | Saulpaugh et al. |
| 5,594,490 A | 1/1997 | Dawson et al. |
| 5,594,782 A | 1/1997 | Zicker et al. |
| 5,594,910 A | 1/1997 | Fileppe et al. |
| 5,596,720 A | 1/1997 | Hamada et al. |
| 5,596,746 A | 1/1997 | Shen et al. |
| 5,600,831 A | 2/1997 | Levy et al. |
| 5,600,834 A | 2/1997 | Howard |
| 5,602,993 A | 2/1997 | Stromberg |
| 5,604,542 A | 2/1997 | Dedrick |
| 5,604,868 A | 2/1997 | Komine et al. |
| 5,606,493 A | 2/1997 | Duscher et al. |
| 5,606,669 A | 2/1997 | Bertin et al. |
| 5,608,446 A | 3/1997 | Carr et al. |
| 5,608,874 A | 3/1997 | Ogawa et al. |
| 5,615,112 A | 3/1997 | Liu Sheng et al. |
| 5,615,296 A | 3/1997 | Stanford et al. |
| H1641 H | 4/1997 | Sharman |
| 5,619,710 A | 4/1997 | Travis, Jr. et al. |
| 5,623,605 A | 4/1997 | Keshav et al. |
| 5,623,656 A | 4/1997 | Lyons |
| 5,623,661 A | 4/1997 | Hon |
| 5,623,690 A | 4/1997 | Palmer et al. |
| 5,625,818 A | 4/1997 | Zarmer et al. |
| 5,625,864 A | 4/1997 | Budow et al. |
| 5,627,940 A | 5/1997 | Rohra et al. |
| 5,628,005 A | 5/1997 | Hurvig |
| 5,630,066 A | 5/1997 | Gosling |
| 5,630,092 A | 5/1997 | Carreiro et al. |
| 5,630,103 A | 5/1997 | Smith et al. |
| 5,630,116 A | 5/1997 | Takaya et al. |
| 5,630,125 A | 5/1997 | Zellweger |
| 5,634,010 A | 5/1997 | Ciscon et al. |
| 5,635,978 A | 6/1997 | Alten et al. |
| 5,635,979 A | 6/1997 | Kostreski et al. |
| 5,638,446 A | 6/1997 | Rubin |
| 5,640,193 A | 6/1997 | Wellner |
| 5,640,501 A | 6/1997 | Turpin |
| 5,640,564 A | 6/1997 | Hamilton et al. |
| 5,640,577 A | 6/1997 | Scharmer |
| 5,642,419 A | 6/1997 | Rosen |
| 5,644,764 A | 7/1997 | Johnson et al. |
| 5,646,992 A | 7/1997 | Subler et al. |
| 5,649,192 A | 7/1997 | Stucky |
| 5,652,887 A | 7/1997 | Dewey et al. |
| 5,654,901 A | 8/1997 | Boman |
| 5,655,116 A | 8/1997 | Kirk et al. |
| 5,659,639 A | 8/1997 | Mahoney et al. |
| 5,664,111 A | 9/1997 | Nahan et al. |
| 5,664,207 A | 9/1997 | Crumpler et al. |
| 5,666,493 A | 9/1997 | Wojcik et al. |
| 5,668,997 A | 9/1997 | Lynch-Freshner et al. |
| 5,673,322 A | 9/1997 | Pepe et al. |
| 5,675,507 A | 10/1997 | Bobo, II |
| 5,678,002 A | 10/1997 | Fawcett et al. |
| 5,680,548 A | 10/1997 | Trugman |
| 5,680,617 A | 10/1997 | Gough et al. |
| 5,682,532 A | 10/1997 | Remington et al. |
| 5,682,533 A | 10/1997 | Siljestroemer |
| 5,684,984 A | 11/1997 | Jones et al. |
| 5,684,991 A | 11/1997 | Malcolm |
| 5,689,708 A | 11/1997 | Regnier et al. |
| 5,694,546 A | 12/1997 | Reisman |
| 5,694,549 A | 12/1997 | Carlin et al. |
| 5,694,551 A | 12/1997 | Doyle et al. |
| 5,694,596 A | 12/1997 | Campbell |
| 5,696,975 A | 12/1997 | Moore et al. |
| 5,701,451 A | 12/1997 | Rogers et al. |
| 5,706,434 A | 1/1998 | Kremen et al. |
| 5,708,709 A | 1/1998 | Rose |
| 5,708,780 A | 1/1998 | Levergood et al. |
| 5,710,883 A | 1/1998 | Hong et al. |
| 5,710,887 A | 1/1998 | Chelliah et al. |
| 5,710,918 A | 1/1998 | Lagarde et al. |
| 5,715,314 A | 2/1998 | Payne et al. |
| 5,715,399 A | 2/1998 | Bezos |
| 5,715,463 A | 2/1998 | Merkin |
| 5,717,930 A | 2/1998 | Imai et al. |
| 5,719,619 A | 2/1998 | Hattori et al. |
| 5,721,824 A | 2/1998 | Taylor |
| 5,721,911 A | 2/1998 | Ha et al. |
| 5,724,424 A | 3/1998 | Gifford |
| 5,727,163 A | 3/1998 | Bezos |
| 5,732,219 A | 3/1998 | Blumer et al. |
| 5,732,275 A | 3/1998 | Kullick et al. |
| 5,732,398 A | 3/1998 | Tagawa |
| 5,734,413 A | 3/1998 | Lappington et al. |
| 5,734,719 A | 3/1998 | Tsevdos et al. |
| 5,734,871 A | 3/1998 | Kleinerman et al. |
| 5,737,491 A | 4/1998 | Allen et al. |
| 5,737,560 A | 4/1998 | Yohanan |
| 5,740,158 A | 4/1998 | Aoki et al. |
| 5,740,252 A | 4/1998 | Minor et al. |
| 5,742,762 A | 4/1998 | Scholl et al. |
| 5,742,829 A | 4/1998 | Davis et al. |
| 5,745,681 A | 4/1998 | Levine et al. |
| 5,748,960 A | 5/1998 | Fischer |
| 5,754,864 A | 5/1998 | Hill |
| 5,758,126 A | 5/1998 | Daniels et al. |
| 5,761,200 A | 6/1998 | Hsieh |

(56) References Cited

U.S. PATENT DOCUMENTS

| | | | |
|---|---|---|---|
| 5,761,499 A | 6/1998 | Sonderegger | |
| 5,761,602 A | 6/1998 | Wagner et al. | |
| 5,761,649 A | 6/1998 | Hill | |
| 5,761,655 A | 6/1998 | Hoffman | |
| 5,761,661 A | 6/1998 | Coussens et al. | |
| 5,761,673 A | 6/1998 | Bookman et al. | |
| 5,761,677 A | 6/1998 | Senator et al. | |
| 5,761,678 A | 6/1998 | Bendert et al. | |
| 5,764,275 A | 6/1998 | Lappington et al. | |
| 5,764,906 A | 6/1998 | Edelstein et al. | |
| 5,764,992 A | 6/1998 | Kullick et al. | |
| 5,768,521 A | 6/1998 | Dedrick | |
| 5,768,528 A | 6/1998 | Stumm | |
| 5,771,354 A | 6/1998 | Crawford | |
| 5,774,664 A | 6/1998 | Hidary et al. | |
| 5,774,670 A * | 6/1998 | Montulli | 709/227 |
| 5,781,246 A | 7/1998 | Alten et al. | |
| 5,784,463 A | 7/1998 | Chen et al. | |
| 5,784,562 A | 7/1998 | Diener | |
| 5,790,644 A | 8/1998 | Kikinis | |
| 5,790,793 A | 8/1998 | Higley | |
| 5,793,843 A | 8/1998 | Morris | |
| 5,793,966 A | 8/1998 | Amstein et al. | |
| 5,793,980 A | 8/1998 | Glaser et al. | |
| 5,794,210 A | 8/1998 | Goldhaber et al. | |
| 5,794,217 A | 8/1998 | Allen | |
| 5,796,967 A | 8/1998 | Filepp et al. | |
| 5,802,283 A | 9/1998 | Grady et al. | |
| 5,802,299 A | 9/1998 | Logan et al. | |
| 5,802,502 A | 9/1998 | Gell et al. | |
| 5,805,815 A | 9/1998 | Hill | |
| 5,805,897 A | 9/1998 | Glowny | |
| 5,806,044 A | 9/1998 | Powell | |
| 5,809,076 A | 9/1998 | Hofmann | |
| 5,809,144 A | 9/1998 | Sirbu et al. | |
| 5,809,287 A | 9/1998 | Stupek, Jr. et al. | |
| 5,812,776 A | 9/1998 | Gifford | |
| 5,819,034 A | 10/1998 | Joseph et al. | |
| 5,822,539 A | 10/1998 | Van Hoff | |
| 5,826,242 A | 10/1998 | Montulli | |
| 5,826,245 A | 10/1998 | Sandberg-Diment | |
| 5,828,990 A | 10/1998 | Nishino et al. | |
| 5,835,911 A | 11/1998 | Nakagawa et al. | |
| 5,838,458 A | 11/1998 | Tsai | |
| 5,838,906 A | 11/1998 | Doyle et al. | |
| 5,838,918 A | 11/1998 | Prager et al. | |
| 5,845,073 A | 12/1998 | Carlin et al. | |
| 5,845,077 A | 12/1998 | Fawcett | |
| 5,845,090 A | 12/1998 | Collins, III et al. | |
| 5,848,396 A | 12/1998 | Gerace | |
| 5,859,969 A | 1/1999 | Oki et al. | |
| 5,860,012 A | 1/1999 | Luu | |
| 5,862,325 A | 1/1999 | Reed et al. | |
| 5,862,362 A | 1/1999 | Somasegar et al. | |
| 5,864,683 A | 1/1999 | Boebert et al. | |
| 5,884,309 A | 3/1999 | Vanechanos, Jr. | |
| 5,887,141 A | 3/1999 | Trugman | |
| 5,892,917 A | 4/1999 | Myerson | |
| 5,893,109 A | 4/1999 | DeRose et al. | |
| 5,894,554 A | 4/1999 | Lowery et al. | |
| 5,898,920 A | 4/1999 | Jacobs | |
| 5,901,228 A | 5/1999 | Crawford | |
| 5,901,287 A | 5/1999 | Bull et al. | |
| 5,901,288 A | 5/1999 | Kihara et al. | |
| 5,903,454 A | 5/1999 | Hoffberg et al. | |
| 5,903,723 A | 5/1999 | Beck et al. | |
| 5,909,492 A | 6/1999 | Payne et al. | |
| 5,909,581 A | 6/1999 | Park | |
| 5,910,987 A | 6/1999 | Ginter et al. | |
| 5,911,138 A | 6/1999 | Li et al. | |
| 5,914,941 A | 6/1999 | Janky | |
| 5,915,214 A | 6/1999 | Reece et al. | |
| 5,918,014 A | 6/1999 | Robinson | |
| 5,918,054 A | 6/1999 | Jury et al. | |
| 5,918,213 A | 6/1999 | Bernard et al. | |
| 5,926,796 A | 7/1999 | Walker et al. | |
| 5,930,473 A | 7/1999 | Teng et al. | |
| 5,933,811 A | 8/1999 | Angles et al. | |
| 5,937,197 A | 8/1999 | Jury | |
| 5,937,414 A | 8/1999 | Souder et al. | |
| 5,938,727 A | 8/1999 | Ikeda | |
| 5,940,504 A | 8/1999 | Griswold | |
| 5,949,876 A | 9/1999 | Ginter et al. | |
| 5,953,514 A | 9/1999 | Gochee | |
| 5,959,621 A | 9/1999 | Nawaz et al. | |
| 5,960,189 A | 9/1999 | Stupek, Jr. et al. | |
| 5,963,208 A | 10/1999 | Dolan et al. | |
| 5,963,625 A | 10/1999 | Kawecki et al. | |
| 5,963,915 A | 10/1999 | Kirsch | |
| 5,963,916 A * | 10/1999 | Kaplan | 705/7.29 |
| 5,966,531 A | 10/1999 | Skeen et al. | |
| 5,982,891 A | 11/1999 | Ginter et al. | |
| 5,983,200 A | 11/1999 | Slotznick | |
| 5,983,207 A | 11/1999 | Turk et al. | |
| 5,987,501 A | 11/1999 | Hamilton et al. | |
| 5,991,735 A | 11/1999 | Gerace | |
| 5,995,943 A | 11/1999 | Bull et al. | |
| 6,003,068 A | 12/1999 | Sopko | |
| 6,005,561 A | 12/1999 | Hawkins et al. | |
| 6,011,782 A | 1/2000 | DeSimone et al. | |
| 6,016,476 A | 1/2000 | Maes et al. | |
| 6,016,509 A | 1/2000 | Dedrick | |
| 6,016,520 A | 1/2000 | Facq et al. | |
| 6,026,366 A | 2/2000 | Grube | |
| 6,026,375 A | 2/2000 | Hall et al. | |
| 6,026,474 A | 2/2000 | Carter et al. | |
| 6,029,142 A | 2/2000 | Hill | |
| 6,029,175 A | 2/2000 | Chow et al. | |
| 6,031,977 A | 2/2000 | Pettus | |
| 6,035,330 A | 3/2000 | Astiz et al. | |
| 6,035,375 A | 3/2000 | Yanai et al. | |
| 6,036,086 A | 3/2000 | Sizer, II et al. | |
| 6,038,199 A | 3/2000 | Pawlowski et al. | |
| 6,038,586 A | 3/2000 | Frye | |
| 6,041,365 A | 3/2000 | Kleinerman | |
| 6,044,205 A | 3/2000 | Reed et al. | |
| 6,047,129 A | 4/2000 | Frye | |
| 6,047,319 A | 4/2000 | Olson | |
| 6,049,671 A | 4/2000 | Slivka et al. | |
| 6,049,785 A | 4/2000 | Gifford | |
| 6,055,370 A | 4/2000 | Brown et al. | |
| 6,055,510 A | 4/2000 | Henrick et al. | |
| 6,055,573 A | 4/2000 | Gardenswartz et al. | |
| 6,067,477 A | 5/2000 | Wewalaarachchi et al. | |
| 6,070,155 A | 5/2000 | Cherrington et al. | |
| 6,070,185 A | 5/2000 | Anupam et al. | |
| 6,073,214 A | 6/2000 | Fawcett | |
| 6,075,527 A | 6/2000 | Ichihashi et al. | |
| 6,078,914 A | 6/2000 | Redfern | |
| 6,078,928 A | 6/2000 | Schnase et al. | |
| 6,081,629 A | 6/2000 | Browning | |
| 6,081,731 A | 6/2000 | Boltz et al. | |
| 6,081,788 A | 6/2000 | Appleman et al. | |
| 6,085,256 A | 7/2000 | Kitano et al. | |
| 6,096,096 A | 8/2000 | Murphy et al. | |
| 6,118,860 A | 9/2000 | Hillson et al. | |
| 6,119,152 A | 9/2000 | Carlin et al. | |
| 6,119,160 A | 9/2000 | Zhang et al. | |
| 6,119,944 A | 9/2000 | Mulla et al. | |
| 6,122,642 A | 9/2000 | Mehovic | |
| 6,125,388 A | 9/2000 | Reisman | |
| 6,135,646 A | 10/2000 | Kahn et al. | |
| 6,138,153 A | 10/2000 | Collins et al. | |
| 6,144,848 A | 11/2000 | Walsh et al. | |
| 6,144,946 A | 11/2000 | Iwamura | |
| 6,151,643 A | 11/2000 | Cheng et al. | |
| 6,167,409 A | 12/2000 | DeRose et al. | |
| 6,169,789 B1 | 1/2001 | Rao et al. | |
| 6,192,394 B1 | 2/2001 | Gutfreund et al. | |
| 6,195,649 B1 | 2/2001 | Gifford | |
| 6,199,051 B1 | 3/2001 | Gifford | |
| 6,205,437 B1 | 3/2001 | Gifford | |
| 6,212,401 B1 | 4/2001 | Ackley | |
| 6,219,653 B1 | 4/2001 | O'Neill et al. | |

(56) References Cited

U.S. PATENT DOCUMENTS

| | | |
|---|---|---|
| 6,223,217 B1 | 4/2001 | Pettus |
| 6,230,202 B1 | 5/2001 | Lewine |
| 6,230,970 B1 | 5/2001 | Walsh et al. |
| 6,233,565 B1 | 5/2001 | Lewis et al. |
| 6,249,818 B1 | 6/2001 | Sharma |
| 6,252,869 B1 | 6/2001 | Silverman |
| 6,256,668 B1 | 7/2001 | Slivka et al. |
| 6,259,657 B1 | 7/2001 | Swinney |
| 6,269,361 B1 | 7/2001 | Davis et al. |
| 6,278,449 B1 | 8/2001 | Sugiarto et al. |
| 6,286,041 B1 | 9/2001 | Collins et al. |
| 6,305,020 B1 | 10/2001 | Hoarty et al. |
| 6,317,777 B1 | 11/2001 | Skarbo et al. |
| 6,317,797 B2 | 11/2001 | Clark et al. |
| 6,323,894 B1 | 11/2001 | Katz |
| 6,327,617 B1 | 12/2001 | Fawcett |
| 6,334,141 B1 | 12/2001 | Varma et al. |
| 6,356,539 B1 | 3/2002 | Zuliani et al. |
| 6,360,266 B1 | 3/2002 | Pettus |
| 6,366,933 B1 | 4/2002 | Ball et al. |
| 6,381,742 B2 | 4/2002 | Forbes et al. |
| 6,411,725 B1 | 6/2002 | Rhoads |
| 6,421,694 B1 | 7/2002 | Nawaz et al. |
| 6,434,607 B1 | 8/2002 | Haverstock et al. |
| 6,442,571 B1 | 8/2002 | Haff et al. |
| 6,446,871 B1 | 9/2002 | Buckley et al. |
| 6,505,213 B1 | 1/2003 | Kamada et al. |
| 6,507,410 B1 | 1/2003 | Robertson et al. |
| 6,512,916 B1 | 1/2003 | Forbes, Jr. |
| 6,512,919 B2 | 1/2003 | Ogasawara |
| 6,557,054 B2 | 4/2003 | Reisman |
| 6,571,279 B1 | 5/2003 | Herz et al. |
| 6,577,861 B2 | 6/2003 | Ogasawara |
| 6,584,480 B1 | 6/2003 | Ferrel et al. |
| 6,587,835 B1 | 7/2003 | Treyz et al. |
| 6,594,546 B2 | 7/2003 | Elger |
| 6,594,692 B1 | 7/2003 | Reisman |
| 6,611,862 B2 | 8/2003 | Reisman |
| 6,647,257 B2 | 11/2003 | Owensby |
| 6,658,464 B2 | 12/2003 | Reisman |
| 6,665,085 B1 | 12/2003 | Edmunds et al. |
| 6,671,567 B1 | 12/2003 | Dwyer et al. |
| 6,674,874 B1 | 1/2004 | Yoshida et al. |
| 6,707,465 B2 | 3/2004 | Yamazaki et al. |
| 6,707,581 B1 | 3/2004 | Browning |
| 6,732,358 B1 | 5/2004 | Siefert |
| 6,748,425 B1 | 6/2004 | Duffy et al. |
| 6,754,710 B1 | 6/2004 | Mcalear |
| 6,769,009 B1 | 7/2004 | Reisman |
| 6,779,113 B1 | 8/2004 | Guthery |
| 6,812,995 B2 | 11/2004 | Honma |
| 6,813,608 B1 | 11/2004 | Baranowski |
| 6,857,044 B2 | 2/2005 | Beeston et al. |
| 6,928,655 B1 | 8/2005 | Omoigui |
| 6,934,750 B2 | 8/2005 | Hijikata et al. |
| 6,965,864 B1 | 11/2005 | Thrift et al. |
| 6,965,868 B1 | 11/2005 | Bednarek |
| 6,973,333 B1 | 12/2005 | O'Neil |
| 6,975,873 B1 | 12/2005 | Banks et al. |
| 6,987,975 B1 | 1/2006 | Irvin et al. |
| 7,058,395 B2 | 6/2006 | Dowling et al. |
| 7,072,849 B1 | 7/2006 | Filepp et al. |
| 7,072,886 B2 | 7/2006 | Salmenkaita et al. |
| 7,080,051 B1 | 7/2006 | Crawford |
| 7,085,553 B1 | 8/2006 | Harrenstien et al. |
| 7,184,774 B2 | 2/2007 | Robinson et al. |
| 7,237,002 B1 | 6/2007 | Estrada et al. |
| 7,239,346 B1 | 7/2007 | Priddy |
| 7,280,642 B2 | 10/2007 | Light et al. |
| 7,283,974 B2 | 10/2007 | Katz et al. |
| 7,418,268 B1 | 8/2008 | Cabano et al. |
| 7,467,141 B1 | 12/2008 | Steele et al. |
| 7,478,381 B2 | 1/2009 | Roberts et al. |
| 7,503,051 B1 | 3/2009 | Ueda et al. |
| 7,508,789 B2 | 3/2009 | Chan |
| 7,546,594 B2 | 6/2009 | McGuire et al. |
| 7,574,706 B2 | 8/2009 | Meulemans et al. |
| 7,640,512 B1 | 12/2009 | Appling |
| 7,653,687 B2 | 1/2010 | Reisman |
| 7,676,448 B2 | 3/2010 | Henderson et al. |
| 7,725,812 B1 | 5/2010 | Balkus et al. |
| 8,006,241 B2 | 8/2011 | Dias |
| 8,024,399 B2 | 9/2011 | Reisman |
| 8,046,825 B2 | 10/2011 | Haff et al. |
| 8,069,204 B2 | 11/2011 | Reisman |
| RE43,127 E | 1/2012 | Wentink |
| 8,131,883 B1 | 3/2012 | Reisman |
| 8,166,278 B2 | 4/2012 | Cooke |
| 8,185,736 B2 | 5/2012 | Haff et al. |
| 8,245,062 B1 | 8/2012 | Nanda et al. |
| 8,457,545 B2 | 6/2013 | Chan |
| 8,499,030 B1 | 7/2013 | Reisman |
| 2001/0003177 A1 | 6/2001 | Schena et al. |
| 2001/0014868 A1 | 8/2001 | Herz et al. |
| 2001/0029525 A1 | 10/2001 | Lahr |
| 2001/0033296 A1 | 10/2001 | Fullerton et al. |
| 2001/0034603 A1 | 10/2001 | Thrift et al. |
| 2001/0036821 A1 | 11/2001 | Gainsboro et al. |
| 2002/0000468 A1 | 1/2002 | Bansal |
| 2002/0002504 A1 | 1/2002 | Engel et al. |
| 2002/0016171 A1 | 2/2002 | Doganata et al. |
| 2002/0031108 A1 | 3/2002 | Inoue |
| 2002/0049717 A1 | 4/2002 | Routtenberg et al. |
| 2002/0055817 A1 | 5/2002 | Chou |
| 2002/0069282 A1 | 6/2002 | Reisman |
| 2002/0078456 A1 | 6/2002 | Hudson et al. |
| 2002/0103822 A1 | 8/2002 | Miller |
| 2002/0105545 A1 | 8/2002 | Carter et al. |
| 2002/0112171 A1 | 8/2002 | Ginter et al. |
| 2002/0124055 A1 | 9/2002 | Reisman |
| 2002/0129094 A1 | 9/2002 | Reisman |
| 2002/0136226 A1 | 9/2002 | Christoffel et al. |
| 2002/0156546 A1 | 10/2002 | Ramaswamy |
| 2002/0174422 A1 | 11/2002 | Kelley et al. |
| 2002/0184619 A1 | 12/2002 | Meyerson |
| 2002/0191570 A1 | 12/2002 | Kim et al. |
| 2002/0198021 A1 | 12/2002 | Boesen |
| 2002/0198716 A1 | 12/2002 | Zimmerman |
| 2003/0008644 A1 | 1/2003 | Akhterzzaman et al. |
| 2003/0020629 A1 | 1/2003 | Swartz et al. |
| 2003/0041123 A1 | 2/2003 | Sato et al. |
| 2003/0054802 A1 | 3/2003 | Xie |
| 2003/0061606 A1 | 3/2003 | Hartwig et al. |
| 2003/0063072 A1 | 4/2003 | Brandenberg et al. |
| 2003/0083061 A1 | 5/2003 | Robinson et al. |
| 2003/0083080 A1 | 5/2003 | Fournier et al. |
| 2003/0123542 A1 | 7/2003 | Lee |
| 2003/0132298 A1 | 7/2003 | Swartz et al. |
| 2003/0139180 A1 | 7/2003 | Mcintosh et al. |
| 2003/0147099 A1 | 8/2003 | Heimendinger et al. |
| 2003/0153264 A1 | 8/2003 | Osato et al. |
| 2003/0163558 A1 | 8/2003 | Cao et al. |
| 2003/0167307 A1 | 9/2003 | Filepp et al. |
| 2004/0068721 A1 | 4/2004 | O'Neill et al. |
| 2004/0073631 A1 | 4/2004 | Keorkunian et al. |
| 2004/0181787 A1 | 9/2004 | Wickham et al. |
| 2004/0203608 A1 | 10/2004 | Osann, Jr. |
| 2004/0203998 A1 | 10/2004 | Knauerhase et al. |
| 2005/0044109 A1 | 2/2005 | Nanba |
| 2005/0044280 A1 | 2/2005 | Reisman |
| 2005/0050538 A1 | 3/2005 | Kawamata et al. |
| 2005/0055687 A1 | 3/2005 | Mayer |
| 2005/0076087 A1 | 4/2005 | Budd et al. |
| 2005/0091118 A1 | 4/2005 | Fano |
| 2005/0188051 A1 | 8/2005 | Sneh |
| 2005/0262498 A1 | 11/2005 | Ferguson et al. |
| 2005/0283791 A1 | 12/2005 | McCarthy et al. |
| 2006/0075016 A1 | 4/2006 | Kanayama et al. |
| 2006/0080656 A1 | 4/2006 | Cain et al. |
| 2006/0215029 A1 | 9/2006 | Katz |
| 2007/0005795 A1 | 1/2007 | Gonzalez |
| 2007/0073845 A1 | 3/2007 | Reisman |
| 2007/0073846 A1 | 3/2007 | Reisman |
| 2007/0094418 A1 | 4/2007 | Reisman |

(56) References Cited

U.S. PATENT DOCUMENTS

| | | |
|---|---|---|
| 2007/0094654 A1 | 4/2007 | Costea |
| 2007/0118426 A1 | 5/2007 | Barnes, Jr. |
| 2007/0130400 A1 | 6/2007 | Reisman |
| 2007/0192763 A1 | 8/2007 | Helvick |
| 2007/0220106 A1 | 9/2007 | Reisman |
| 2007/0220107 A1 | 9/2007 | Reisman |
| 2007/0299321 A1* | 12/2007 | Brown .......................... 600/300 |
| 2008/0215558 A1 | 9/2008 | Marinelli et al. |
| 2008/0235106 A1 | 9/2008 | Reisman |
| 2008/0319828 A1 | 12/2008 | Southam et al. |
| 2009/0144398 A1 | 6/2009 | Reisman |
| 2009/0150764 A1 | 6/2009 | Farrell et al. |
| 2009/0150878 A1 | 6/2009 | Pathak et al. |
| 2009/0271499 A1 | 10/2009 | Reisman |
| 2010/0042478 A1 | 2/2010 | Reisman |
| 2010/0287155 A1 | 11/2010 | Reisman |
| 2011/0016013 A1 | 1/2011 | Reisman |
| 2011/0016193 A1 | 1/2011 | Reisman |
| 2011/0078675 A1 | 3/2011 | Van Camp et al. |
| 2012/0124164 A1 | 5/2012 | Haff et al. |
| 2012/0204171 A1 | 8/2012 | Reisman |

FOREIGN PATENT DOCUMENTS

| | | |
|---|---|---|
| EP | 0 845 747 A2 | 6/1998 |
| EP | 0 855 659 A1 | 7/1998 |
| EP | 0 855 687 A2 | 7/1998 |
| EP | 0 883 076 A2 | 12/1998 |
| GB | 2168831 A * | 11/1984 |
| GB | 2 291 228 A | 1/1996 |
| JP | 60-229138 A | 11/1985 |
| JP | 50229138 A | 11/1985 |
| JP | 3-230234 A | 10/1991 |
| JP | 3230234 A | 10/1991 |
| JP | 4-142620 A | 5/1992 |
| JP | 1142620 A | 5/1992 |
| JP | 6253085 A | 3/1994 |
| JP | 62-53085 A | 9/1994 |
| JP | 9307617 A | 11/1997 |
| WO | WO 85/02310 | 5/1985 |
| WO | WO 94/12938 | 6/1994 |
| WO | WO 94/16508 | 7/1994 |
| WO | WO 94/25913 | 11/1994 |
| WO | WO 94/25923 | 11/1994 |
| WO | WO 94/25924 | 11/1994 |
| WO | WO 95/30961 | 11/1995 |
| WO | WO 96/38799 | 12/1996 |
| WO | WO 97/32251 | 9/1997 |
| WO | WO 98/21679 | 5/1998 |
| WO | 0035216 A | 6/2000 |

OTHER PUBLICATIONS

Court Docket History for 1:11-cv-00908-UNA, *Intellectual Ventures I LLC and Intellectual II LLC* v. *Motorola Mobility, Inc*, dated Oct. 14, 2011; 3 pgs.

U.S. Appl. No. 09/553,337, Richard R. Reisman, "Method for Updating Software", filed Apr. 20, 2000.

U.S. Appl. No. 09/553,394, Richard R. Reisman, "Electronic Commerce System", filed Apr. 20, 2000.

U.S. Appl. No. 09/553,397, Richard R. Reisman, "Software and Method for Monitoring a Data Stream and for Capturing Desired Data Within the Data Steam", filed Apr. 20, 2000.

U.S. Appl. No. 09/556,062, Richard R. Reisman, "Software and Method for Automatically Fetching Desired Data from each of a Plurality of Independently-Operated Data Sources", filed Apr. 20, 2000.

U.S. Appl. No. 09/553,336, Richard R. Reisman, "Software and Method that Enables Selection of one of a Plurality of Network Communications Service Providers", filed Apr. 20, 2000.

U.S. Appl. No. 09/553,396, Richard R. Reisman, "Software and Method for Automatically Storing and Integrating Digital Content", filed Apr. 20, 2000.

U.S. Appl. No. 09/643,872, Richard R. Reisman, "Computer-Implemented Transport of Electronic Information Objects", filed Aug. 23, 2000.

"10-Fill-out Forms and Input fields," http://www.w3.org/MarkUp/HTMLPlus/htmlplus_41.html, Nov. 8, 1993.

"1-HTML+Discussion Document," Parts 1.1-1.4, http://www.w3.org/MarkUp/HTMLPlus/htmlplus_(2-6).html, Nov. 8, 1993.

"A Brief Overview of the Viola Engine, and its Applications," http://www.viola.org/violaIntro.html, Aug. 16, 1994.

"A Decade of Innovation—The History of CableLabs 1988-1998," Cable Television Laboratories Inc., p. 38.

"A Method for Obtaining Digital Signatures and Public-Key Cryptosystems", R.L. Rivest, A. Shamir, and L. Adleman, dated Feb. 1978.

"About 1-Click ordering" at Amazon.com, 5 pages, 2001.

"About Marimba: A Word from Marimba's President and CEO, Kim Polese," Contents of WWW Web Site http://www.marimba.com/about executive_over.html as of Nov. 17, 1998.

"Achieving Electronic Privacy", D. Chaum—Aug. 1992.

"Active Message Processing: Messages As Messengers", J. Vittal 1981.

"Adding Capability Access to Conventional File Servers", F.M. Needham, dated Jan. 1979.

"Anonymous Delivery of Goods in Electronic Commerce", IBM Technical Disclosure Bulletin, pp. 363-366, Mar. 1996.

"Authentication and Delegation with Smart-cards", M. Abadi, M. Burrows, C. Kaufman, B. Lampson, Oct. 22, 1990, Revised Jul. 20, 1992.

"Automated Replacement of System Software Units", IBM Technical Disclosure Bulletin, pp. 3137-3138, Mar. 1971.

"Beginners Guide to Internet Stuff", Kevin Hintergardt, Apr. 28, 1994, Newsgroups: alt.winsock.

"Beyond Store and Forward: Extending ESD: Xcellenet Routing Server cuts out the Middleman", Data Communications, Jun. 1993.

"Browser Cookies are Persistent, Not Necessarily Evil", http://www.wired.com/news/topstories/0,1287,887,00.html, Dec. 11, 1996.

"Browser Users to Watch Cookies," CNETNews.com, http://news.com.com/2100-1001-277942.html?legacy=cnet, Mar. 13, 1997.

"Browsers Make Navigating the World Wide Web a Snap", The New York Times, Jan. 29, 1995.

"Catalink Direct, Inc.," Info Magazine, http://www.cors.com/clients/profiles/catalink.htm, Spring Ed., 1998.

"CD Plus Technical Information", Microsoft CD Plus Event Page, Microsoft Corp., Dec. 4, 1995.

"CD-ROM's: They're Not Just for Entertainment," by Laurie Flynn, The New York Times, Sunday, Apr. 24, 1994, p. 10.

"Central Point Commute: Fast Remote Control of PCs Running Windows or DOS", Central Point Sortware, Inc., 1992.

"CGI Programming on the World Wide Web," 1st Ed.,http://www.oreilly.com/openbook/cgi/ch08_03.html, Shishir Gundavaram, Mar. 1996.

"CGI Scripts and Cookies", The Perl Journal, Issue 3, http://www.samag.com/documents/s=1282/sam010300031, Fall 1996.

"Chocolate Chip Cookies + Automating New!,"http://tech.irt.org/articles/js016/index.htm, Apr. 21, 1997.

"Classic HTTP Documents," http://www.w3.org/Protocols/Classic.html, May 14, 1998.

"CMP is First Technology Publishers to Deliver Web Content to the Desktop", CMP News, Oct. 18, 1995.

"Compact Disk of Federal Register" price list, Counterpoint Publishing Co., Jul. 1, 1993.

"CompuServe Communications Toolbox Prospective Developer Information," CompuServe Inc., copyright 1994.

"Compuserve Information Manager for Windows—User's Guide," Copyright 1995.

"CompuServe Information Service; Users Guide", pp. 119-127; 153-163; 235-243; Copyright 1988.

"CompuServe" (Booklet Supplement to User Guide), (CS088309 (Apr. 1992)), 1992.

"CompuServe" Quick Start Guide, CompuServe, 1994.

"Computerized Commerce", D. Cohen, ISI Reprint Series, Oct. 1989.

(56) References Cited

OTHER PUBLICATIONS

"Cookie and Privacy FAQ", http://www.cookiecentral.com/content.phtml?area=4&id=10, Copyright 1996-2002.

"Cookie," http://www.webopedia.com/Term/c/cookie.html, Jan. 4, 2002.

"Cryptographic Sealing for Information Secrecy and Authentication" D.K. Gifford, Communications of the ACM vol. 25, No. 4, Apr. 1982.

"CyberSearch 2.0 Beta Manual", Frontier Technologies Corporation, Apr. 5, 1996.

"Development of Network Infrastructure and Services for Rapid Acquisition", J.M. Tenenbaum and A.M. Schiffman, Jan. 2, 1992.

"ecash-info: How the Web Was Won," http://www.open4success.com/O1news/rballan1/001.html, May 3, 1995.

"EDI Transaction Sct Reference Card"; TSI International, Copyright 1993.

"Electronic Currency for the Internet", EM-Electronic Markets/No. 9/pp. 30 and 31. Sep. 93.

"Electronic Wallet", S.Even and Oded Goldreich, Computer Science Dept. Techtion, Haifa, Israel., 1983.

"Enable Persistent Cookies, "http://orange.kame.netldev/cvsweb.cgi/kame/freebsd3/ports/lynx/Makefile.diff?r1=1.4&r2=1, Dec. 15, 1994.

Enbysk, M., "Banking at home; New Software Gives Access via Computer", Journal American, Feb. 11, 1994.

"Experience Network Specifying Wizardry!," NetSource advertisement, 1993.

"Exploring Hybrid World of CD-Rom/On-Line Products", Multimedia Week, Mar. 7, 1994.

"Extensibility and Mini Applications," Ch. 13, http://www.viola.org/viola/book/chp13.html, 1995.

"Federal Bulletin Board", Terry Carroll, Sep. 29, 1992, Newgroups:misc.legal.

"Financing the New Media", 1994 Intermedia Conference Proceedings on CD-ROM, San Jose, CA, Mar. 1-3, 1994.

"Frontier Technologies' CyberSearch 2.0 Internet Search Tool Now Works With Popular Browsers", Frontier Technologies Corporation, Apr. 5, 1996.

"Go-Get-It, Internet Personal Agent Thrills Net Users," NorthTech Software Inc., 1994, Contents of WWW Web Site, http://www.hpp.com/gogetit.html, as of Mar. 19, 1997.

"GView Architecture Version 1.1," Delphi Internet Services Corporation (Dec. 31, 1993).

Langberg, M., "Head's Up Your Story Request", San Jose Mercury News, CA, CD-ROM Column, Knight Ridder, Tribune Business News, File 10424154.800, Apr. 24, 1994.

"History of Sun and the Web," http://www.sun.co.ip:8080/sun-on-net/historv.html, Copyright 1996.

"How Cookies Work (client-side persistent information),"http://Iwww.newnet.co.uk/help/netscape/cookies.html, May 13, 1996.

"How to ftp patches", John Morris, Apr. 20, 1994, Newsgroups: comp.sys.hp,hpux.

"How to Publish an OM-Express Package", OM-Express Product Information, Apr. 16, 1996.

"HTML 2.0 Materials," http://www.w3.orq/MarkUp/html-spec, Nov. 1995.

"HTTP State Management Mechanism", http://www.ietf.org/rfc/rfc2109.txt, Feb. 1997.

"Http:://www.cpsr.org/cpsr/nii/imp_Amsterdam-minutes.txt"—"Internet Mercantile Protocols BOF", Jul. 14, 1993.

"Hypertext Mark Up Language (HTML)," http://www.w3.orq/MarkUp/draft-ietf-iiir-htm1-01, Jun. 1993.

"Implementing Capability-Based Protection Using Encryption", D.L. Chaum and R.S. Fabry, Jul. 17, 1978.

"In the beginning there was NCSA Mosaic . . . ,"http://archive.ncsa.uiuc.edu/General/CommGroup/MosaicHistory/history.html, Mar. 27, 2001.

"Industry Announcements", 1994 Intermedia Conference Proceedings on CD-ROM, San Jose, CA, Mar. 1-3, 1994.

"Interactive Media Works Debuts sampleNET", Interactive Media Works, news release dated Jul. 17, 1995.

"Intercepting Telnet Data" IBM Technical Disclosure Bulletin. Jun. 1993.

"Intermind Announces Approval of First Patent Application," Intermind Corporation Press Release, http://www.intermind.com/inside/press_rel/100797_allow.html, Oct. 1997.

Keizer, G., "Digital Dollars & Silicon Cents", PC Magazine, Jan. 25, 1994; pp. 235-244.

"Kiplinger's CA—Simply Money for Microsoft Windows, User Guide, Version 1.0," Computer Associates International, Inc., 1993.

Kirriemuir, J. P., et al., "Mirroring and caching network-based resources", 1997.

"LinkStar Announces Site Launcher", LinkStar Communications Corporation, Feb. 26, 1996.

"Marimba Products: Marimba's Castanet™.: An Essential Part of Your E-Business InFrastructure," Content of WWW Web Site http://www.marimba.com/product/content/product.html as of Nov. 17, 1998.

"Marimba Library," Contents of WWW Web Site, http://www.marimba.com/datasheets/ as of Nov. 17, 1998.

"Marketing via Teleshuttle", Letter from Richard Reisman to Lou Jorfan dated May 22, 1995 with enclosure, "A Short White Paper on the Teleshuttle Solution", Teleshuttle, May 5, 1995.

"MarketScape WebCD 1.0 Bypasses Internet Bottlenecks", MarketScape Press Release, MarketScape, Inc., Aug. 26, 1996.

"Mercury Operator's Log," Oct. 26 http://www.usc.edu/dept/raiders/logs/alpha-log-941202-941224.html, Dec. 1, 1994.

"Method to Control Software-Update Applications", IBM Technical Disclosure Bulletin, pp. 5059-5060, Apr. 1987.

"Microsoft Complete Baseball" Product Brochure, Microsoft Corp. product announced Mar. 1, 1994.

"Microsoft Messaging Application Program Interface (MAPI)," created Jan. 1993, Microsoft Corp.

"Mirror Applescript-Find Your Salvation with a Mirror Script for the Macintosh!, " Jim Matthews, Contents of http://www.darmouth.edu/pages/softdev/fetch.html, as of Mar. 18, 1997.

"NetCash: A design for practical electronic currency on the Internet", G. Medvinsky and B. Clifford Neuman, Proceedings of 1st the ACM Conference on Computer and Communication Security, Nov. 1993.

"NetTerm-the Ultimate telnet experience," InterSoft International, Inc., Contents of http://starbase.neosoft.com/'zkrr0l/netterm.html, as of Mar. 18, 1997.

"New File <FEE041> Express Access(New Jersey)", Peter Scott, Jun. 19, 1993, Newsgroups:bit.listserv.hytel-I.

"News Machine System Description," Retrieval Technologies, Inc., revised Jan. 1992.

"News Machine Transaction Mode Access Interface Specification," Retrieval Technologies, Inc., revised Feb. 24, 1992.

"Object Migration and Authentication", V.D. Gligor and B.G. Lindsay—IEEE Transactions on Software Engineering, vol. SE-5, No. 6, Nov. 1979.

"Office New and Mail (My Choice)," http://cpcug.org/user/mtk/offline.zip, Oct. 18, 1994.

"Open market Announces New Desktop Software to Deliver Resources of the World Wide Web Directly to the User", OM-Express News Release, Apr. 16, 1996.

"PBS National Datacast to Deliver On-Screen TV Listings Through Innovative Data Transmission System," PBS Enterprises Press Release of Sep. 11, 1990.

Pei Wei O'Reilly & Associates, "Extensibility in WWW Browsers", Stanford Computer Forum WWW Workshop, 3 pages, Sep. 20-21, 1994.

Pei Wei, O'Reilly & Associates, "WWW Browsers: Extensibility Issues", Stanford Computer Forum WWW Workshop, 1 page, Sep. 20-21, 1994.

"Persistent Client State HTTP Cookies", http:/Ihome.netscape.com/newsref/std/cookie_spec.html, Copyright 1999.

"Procomm Plus, Aspect Script Language Reference Manual," Jan. 1991.

"ProComm" Reference Manual, DatastormTechnologies, Inc., 1986.

(56) References Cited

OTHER PUBLICATIONS

"Quicken, Quicken Companion and More . . . ", Intuit advertizement, Copyright 1993.
"Re: Fed Dep Manual on Internet ?", Smcgarr, May 17, 1994, Newsgroups: bit.listserv.govdoc-I.
"Re: telnet in a shell script", Dan Bernstein, Nov. 13, 1990, Newgroups:comp.unix.admin.
"Re: Terminal emulators which provide automated file transfer", Don Libes, May 9, 1992, Newgroups: comp.sys.sun.misc.
"Re:Internet Access to GPO Federal Bulletin Board", Smcgarr, Mar. 29, 1994, Newsgroups: bit.listserv.govdoc-I.
"Reality's Wealth Builder 3.0" User's Guide, Money Magazine, Reality Technologies, Inc., 1992.
"Reality's Wealth Builder" Version 3.1 Supplement, Money Magazine, Reality Technologies, Inc., Apr. 1993.
"Remote Imaging Protocol," Copyright (c) 1992-1993, TeleGrafix Communications, Inc.
"Remote Ware Reports," product brochure Xcellenet, Inc., 1992.
"RemoteWare Documents," product brochure, Xcellenet, Inc. 1992.
"RemoteWare Server," product brochure, Xcellenet, Inc., 1992.
"Remote Ware Software Licenses," fee list, Xcellenet, Inc., Aug. 16, 1993.
"Retrospect Users Guide," Dantz Development Corp., Berkley, CA (1993).
"Security Mechanisms in High-Level Network Protocols", V.L. Voydock and S.T. Kent. Computing Surveys, vol. 15, No. 2, Jun. 1983.
"Session Tracking", Servlet Tutorial, http://www.apl.jhu/-hall/java/Servlet-Tutorial-Session-Tracking.html, Copyright 1999.
"Scssion Tracking", The Java Tutorial, http://Java.sun.com/dots/books/tutorial/servlets/client-state/Session-Tracking.html, Copyright 1995-2001.
"Simple MAPI," Microsoft Corp., 1993.
"Smart Investors Watch the Market. StreetSmart Investors Get a Windows View," Charles Schwab StreetSmart investing software for Windows advertisement, Copyright 1993.
"SmartCash: A practical electronic payment system", J.N.E. Bos, D. Chaum, Aug. 1990.
"SNPP: A Simple Network Payment Protocol", S. Dukach. 1992.
"Software Distribution is still a bad dream", PC Week, Mar. 28, 1994, p. 54.
"Software Solution Helps Pull Satellite Offices Into Network Environment," by Kathleen Doler, Investors Business Daily, Mar. 10, 1983, vol. 9, No. 231.
Symborski, Carl W., "Updating Software and Configuration Data in a Distributed Communications Network", IEEE, Copyright 1988.
"The Evolution of Cyberspace 10.1," http://www.javasoft.com/doc/languageenvironment/HotJava.doc.l.html, Copyright 1996.
"The First Electronic Superstore Just Opened on Your PC," PECOS Catalink Direct pamphlet, Copyright 1993.
"The Future of Audio CD's ", Microsoft CD Plus Event Page, Microsoft Corp., Dec. 4, 1995.
"The MD5 Message-Digest Algorithm", R. Rivest RFC 1321, Apr. 1992.
"The PECOS User Guide," Catalink Direct PECOS Personal Electronic Catalog and Ordering system, Dec. 7, 1993.
"The Unofficial Cookie FAQ—Version 2.54," http://www.cookiecentral.com/faq/, Copyright 1997-2001.
"Trading Partner PC: Affordable, high-performance EDI software for Windows", TSI International Software Ltd., Copyright 1994.
"Universal Access—$8.95 unlimited Internet access", Doug Humphrey, Jul. 15, 1993, Newgroups: alt.bbs.internet.
"Value Exchange systems Enabling Security and Unobservability"—Holger Burk and Andreas Pfitzmann—1990.
"WebWhacker", (Guide), ForeFront Group, Inc., 1995.
"What is CompuServeCD" , received Apr. 29, 1994.
"When Worlds Collide", CD ROM World, Nov. 1994.
"Why Cryptosystems Fail", R. Anderson, University of Cambridge, Computer Laboratory, dated 1993.
"WOSA Backgrounder: Delivering Enterprise Services to the Windows-based Desktop," created Jul. 1993, Microsoft Corp.
"XcelleNet RemoteWare: Integrated Mobile Communications", Operations Automation Strategies Research Note, Jul. 26, 1993.
1994 Intermediate Conference, San Jose, CA, Mar. 1-3, 1994; 7 pages.
A. Birrell, G. Nelson, S. Owicki & E. Wobber "Network Objects" Proceedings of the 14.sup.th ACM Symposium on Operating Systems Principles, Dec. 5-8, 1993.
A. Black, N. Hutchinson, E. Jul & H. Levy "Object Structure in the Emerald system" OOPSLA '86 Proceedings.
A. DeScon and R. Braden, Background File Transfer Program (BFTP), Network Working Group Request for Comments: 1068, Aug. 1988.
A. Joseph, A. deLespinasse, J. Tauber, D. Gifford & M. Kaashoek "Rover" A Toolkit for Mobile Infoimation Access SIGOPS '95 1995. ACM.
A. Roger Kaye "A User Agent for Multiple Computer-Based Message Services" Computer-Based Message Services, IFIP 1984.
Advertisement of BIX, "Byte", Feb. 1993.
American National Standard—"Financial Institution Retail Message Authentication", American Bankers Association—Aug. 13, 1986.
American National Standard—"Interchange Message Specification for Debit and Credit Card Message Exchange Among Financial Institutions"—American Bankers Association—May 16, 1988.
Anderson, P., "Managing Program Binaries in a Heterogeneous UNIX Network," LIS A V, San Diego, CA, Sep. 30-Oct. 3, 1991.
Anderson, P., "Towards a High-Level Machine Configuration System", 8th USENIX System Administration Conference, San Diego, California, Sep. 19-23, 1994.
AppleShare, Apr. 1995.
Article—Case Study: "The VISA Transaction Processing System" K.Harty, L.Ho, May 30, 1988.
Article 10383 of comp.lang.perl., URL:www.metronet.corn/perl/scripts/ftpstuff/ftpr, Apr. 6, 1993.
Article 3893 of comp.lang.perl: Xref: feenix.metronet.com comp.lang.per1:3893, URL:www.metronet.com/perlinfo/scripts/ftpstuff/ftpget, Jun. 30, 1993.
Article 5397 of comp.lang.perl: Xref: feenix.metronet.com comp.infosystems.www:1336 comp.lang.per1:5397, URL:ftp.telecom.sk/pub/mirror/CPAN/scripts/i . . . WWW//http.get.pl, Aug. 25, 1993.
Article Case Study: "The CIRRUS Banking Network", D. Gifford, A. Spector—vol. 28—Aug. 1985.
B. Clifford Neuman, Proxy-Based Authorization and Accounting for Distributed Systems, Proceedings of the 13th International Conference on Distributed Computing Systems, May 1993; pp. 283-291.
Bailey, Craig C., "Persistent Cookies", Modem Operandi FAQ, http://www.vermontguides.com/modern/faqteg14.htm, Dec. 1996.
Banks, M., "Welcome to . . . Compuserve for Windows", Copyright 1994.
Bits & Bytes, Business Week, p. 126 I, Jun. 15, 1992.
Bits & Bytes, Business Week, p. 140 D, Jul. 12, 1993.
Boly, Jean-Paul, et al., "The ESPIRIT Project Cafe—High Security Digital Payment Systems", Securicom '94, Paris, Jun. 1994.
Bowen, C., et al., "CompuServe Information Manager, The Complete Sourcebook," Bantam Books, 1990.
Branwyn, "Mosaic Quick Tour for MAC", Ventana Press, Inc., Chapel Hill, NC, Copyright 1994.
Branwyn, "Mosaic Quick Tour for Windows", Ventana Press, Inc., Chapel Hill, NC, Copyright 1994.
Brian Kantor and Phil Lapsley, Network News Transfer Protocol, "A Proposed Standard for the Stream-Based Transmission of News", Feb. 1986.
Bruner, Rick E., "Cookie Proposal Could Hinder Online Advertising", Adage,http://www.adage.com/news.cms?newsld=359, Mar. 31, 1997.
Budi Yuwono and Dik Lun Lee, "Wise: A World Wide Web Resource Database System", IEEE Transactions on Knowledge and Data Engineering, vol. 8, No. Aug. 1996.
C. Bowman, P. Danzig, D. Hardy, U. Manber, M. Schwartz & D. Wessels "Harvest: A Scalable, Customizable Discovery and Access System" Mar. 12, 1995.

(56) References Cited

OTHER PUBLICATIONS

C. Fung & M. Pong "MOCS: an Object-Oriented Programming Model for Multimedia Object Communication and Synchronization" 1994 IEEE.
Carnegie Mellon University Information Networking Institute, "Internet Billing Server Prototype Scope Document INI Technical Report 1993-1", Oct. 14, 1993.
Cheng, H.S. And Sheu, J.P., "Design and Implementation of a Distributed File System," Software—Practice and Experience, vol. 21(7), pp. 657-675, Jul. 1991.
Chris Maeda "A Metaobject Protocol for Controlling File Cache Management" Lecture Notes in Computer Science, Mar. 1996.
Cleeg, Matthew, "OKBRIDGE: Frequently Asked Questions," Newsgroups: rec.games.bridge, Jul. 2, 1992.
Compact Disk containing documents cited by Defendant, *Microsoft Corporation in Teleshuttle Technologies LLC et al.* vs. *Microsoft Corporation*, United States District Court for the Northern District of California, Case No. Apr. 2927, and *Teleshuttle LLC et al.* vs. *Microsoft Corporation et al.*, United States District Court for the Northern District of California, Case No. 04-2928.
Compact Disk containing exhibits to Defendants' invalidity contentions from *Teleshuttle Technologies LLC et al.* vs. *Microsoft Corporation*, United States District Court for the Northern District of California, Case No. 04-2927, and *Teleshuttle Technologies LLC et al.* vs. *Microsoft Corporation et al.*, United States District Court for the Northern District of California, Case No. 04-2928.
CompuServe Introductory Membership, CompuServe, print date Dec. 1992.
"Concept for a Smart Card Kerberos" by Marjan Krajewski, Jr., paper presented at the 15th National Computer Security Conference, Baltimore, MD, Oct. 1992.
Cosmos Nicolaou "Architecture for Real-Time Multimedia Communications Systems", 1990 IEEE, Apr. 1990.
CRA—Philippe Rabergeau, 'Client Remote Access Specifications—Preliminary,' pp. 1-8, Mar. 24, 1994.
D. Bulterman, G. van Rossum and R. van Liere "A Structure for Transportable, Dynamic Multimedia Documents" US-ENIX, Summer '91 Nashville, TN.
D. Chaum, A. Fiat, M. Naor "Untraceable Electronic Cash", Advances in Cryptology Crypto, 1988.
D. Crocker, E. Szurkowski & D. Farber "An Internet work Memo Distribution Capability—MMDF" IEEE, ACM 1979.
D. Hardy & M. Schwartz "Customized Information Extraction as a Basis for Resource Discovery" Mar. 1994.
D. Woelk, W. Kim & W. Luther, "An Object-Oriented Approach to MultiMedia Database," ACM 1986.
Daily Federal Register, 1993, Counterpoint Publishing, Fall 1993.
Dan Skelton, "Remembering the Gameline," www.geocities.com/TimeSqure/l.air/9260/gameline.html (Sep. 16, 2003).
Daniel T. Chang "Coral: A Concurrent Object-Oriented System for Constructing and Executing Sequential, Parallel and Distributed Applications" OOPS Messenger, Apr. 1991.
Daniels, D. and Spector, A.Z., "An Algorithm for Replicated Directories," PODC Conference Proceedings, ACM, Copyright 1983.
Darrow, et al., "Microsoft Debuts Low-Cost NT 3.5", Computer Reseller News, (596):1-2, Sep. 19, 1994.
Data Broadcasting Corporation DBC/ DataReceiver II and II Plus data sheets, Data broadcasting Corp. (1989).
David Snyder, "The Poor Man's Mirror Script," 8 page printout of software documentation, Nov. 30, 1984.
Davis, S., "Compuserve Information Manager for Windows: Complete Handbook and Membership Kit", Copyright 1994.
Debra P. Deutsch, "Implementing Distribution Lists in Computer-Based Message Systems," Computer-Based Message Services, IFIP, 1984.
Digital Delivery Launches Unique Delivery Agent; Introduces First Delivery Agent to Seamlessly Provide PC Users With Fully-Formatted Content, Business Wire, Oct. 3, 1995.
Digital Delivery Product Data Sheet, Digital Delivery, Inc., Sep. 17, 1995.
Digital Video Disk containing documents cited by Defendant, Apple Computer, Inc. in *Teleshuttle Technologies LLC et al.* vs. *Microsoft Corporation et al.*, United States District Court for the Northern District of California, Case No. 04-2928.
Douglas Englebert "Authorship Provisions in Augment" IEEE, 1984.
Dow Jones News Ser.backslash.vice (DowVision.™.) Lecture Presentation Handout, lecture presented by Charles I. Brady at the Wall Street Workstation Conference, New York City, NY, Oct. 11-12, 1989.
DowVision Broadcast Specification, Dow Jones & Company, Inc., Copyright 1989-92.
Dyson, E., "Friendly Invoices", Forbes, Copyright 1992.
E. Hoffert & G. Gretsch, "The Digital News System at Edu.com: A Convergence of Interactive Computing Newspaper, Television and High Speed Networks" Communications of the ACM Apr. 1991.
E. Moeller, A. Scheller & G. Schurmann "Distributed Processing of Multimedia Information" IEEE Computer Society Proceedings May 28-Jun. 1, 1990.
Eirich, Thomas, "Beam: A Tool for Flexible Software Update", 1994 LISA, San Diego, CA, Sep. 19-23, 1994.
Engst, Adam C., "TidBITS#125/May 25, 1992," Newsgroups: comp.sys.mac.digest, May 26, 1992.
F. Horn & J. Stefani "On Programming and Supporting Multimedia Object Synchronization" The Computer Journal, vol. 36, No. 1, 1993.
Fitzpatrick et al., "Automatic Mirroring of the IRAF FTP and WWW Archives," Contents of WWW Web Site, http://iraf.nano.edu:80/project/mirror/, as of Mar. 18, 1997.
Flavin, et al., "Management of distributed applications in large networks," 1988 IEEE publication, pp. 232-241, Copyright 1998.
Fletcher, Mark, "doit: A Network Software Management Tool", USENIX Association, Proceedings of the Sixth Systems Administration Conference (LISA VI), Long Beach, CA, Oct. 19-23, 1992.
Fowler, "Treading the boards: BBS that draw you closer to the Internet, and away disaster", Computer Shopper, v13, n10, p. 608(2), Oct. 1993.
Froomlcin, A. M., "Flood Control on the Information Ocean: Living With Anonymity, Digital Cash, and Distributed Databases", http://www.law.miami.edu/—froomkin/articles/oceanl.htm, 15 U. Pittsburgh Journal of Law and Commerce 395, 1996.
Fuchs, W.K., et al., "Low-Cost Comparison and Diagnosis of Large Remotely Located Files," Fifth Symposium on Reliability in Distributed Software and Database Systems, IEEE Computer Society, pp. 67-73, Jan. 1986.
Functional Specification: GView Delphi Applications Version .03, Delphi Internet Services Corporation, Dec. 31, 1993.
G. Almes and C. Holman "Edmas: An Object-Oriented, Locally Distributed Mail System" IEEE Transactions on Software Engineering, Sep. 1987.
G. Almes, A Black, C. Bunie and Weibe "Edmas: A Locally Distributed Mail System" IEEE, 1984.
Glave, J., "PGP Lets You Take Charge of Your Cookies", http://www.wired.com/news/printo%2C1294%%2C928%2000.html, Dec. 10, 1996.
Google—Advanced Group Search Results; see: "Users Guide for Public Access to the Federal Bulletin Board " The Federal Bulletin Board, U.S. GPO, ttp://groups.google.com/groups?q=terry'+carroll++%22government+printing+office%22&hl=en&asdrrb=b&as_mind=12&as_minm=5&asminy=1981&as_maxd=12&as_maxm=2&as_maxy=1993&selm=16ty0294245p01%40JUTs.ccc.amdahl.com&mum=2, Sep. 1992.
Google.com, Newsgroup:comp.dcom.telecom, Jul. 21, 1989, http://groups.google.com/groups?q=10 xxx . . . 09i025m01%40vector.dallas.ex.us&mu.
Google.com, Newsgroup:comp.sys.mac.misc, Aug. 21, 1990, http://groups.google.com/groups?q=Globa . . . =UTP-8&selm=9882%40marque.mu.edu&mu.

(56) References Cited

OTHER PUBLICATIONS

Google.com, Newsgroups: comp.sys.pen, Aug. 5, 1993, hppt:// groups.google.com/groups?q=apple . . . SKILB. 93AUG5164314%40volt.hrp.no&mu.

Gopal, I. and Segall, A., "Directories for Networks with Casually Connected Users," Computer Networks and ISDN Systems 18, pp. 255-262, 1989-1990.

Greenspun, Philip, "Philip & Alex's Guide to Web Publishing," Morgan Kaufmann Publishers Inc., pp. 240-252, 260-265, 470-476, 518-521, Copyright 1999.

Grosse, Eric, "Repository Mirroring", ACM Transactions on Mathematical Software, vol. 21, No. 1, pp. 89-97, Mar. 1995.

H. Penny Nii "Blackboard Systems" The Al Magazine, Summer, 1986.

Hallman, "Exploring the Internet", Aug. 1992, http:/ / sunsite. unicamp.br/ pub/ docs/ about-the-net/ internet-tutorials/ exploring_oit.

Hamel, Stephanie, "Automatic Patch Retrieval & Installation," Newsgroups: comp.sys.sun.admin, Mar. 8, 1994.

Harlander, Magnus, "Central System Administration in a Heterogeneous Unix Environment: GeNUAdmin", 1994 LISA, San Diego, CA, Sep. 19-23, 1994.

Henrik Eriksson, "Expert System As Knowledge Services", IEEE Expert Magazine, pp. 14-19, Jun. 1996.

Herman, "GPO bulletin board opens gateway to agency info. (the Government Printing Office's electronic bulletin board)", Federal Computer Week, v6, n26, p. 1(2), Aug. 1992.

Hideyo Imazu, "OMNICONF—Making OS Upgrades and Disk Crash Recovery Easier", 1994 LISA, San Diego, CA, Sep. 19-23, 1994.

Howard, J.H., "Using Reconciliation to Share Files Between Occasionally Connected Computers," IEEE Fourth Workshop on Workstation Operating Systems, pp. 56-60, Oct. 1993.

http:/ /ftp.sunset.se/pub/etext/wiretap-classic-library/online.txt, "The online world", Sep. 1993.

http://www.automation.rockwell.com/copyright/cookies.html, "Cookies", Copyright 1999.

http://www.cookiecentral.com/dsm.htm, The Dark Side of Cookies, Copyright 1997-1998.

littp://www.evolution.com/press/boardwatch, Dec. 1992.

http://www.math.osu.edu/local/cac-access/access "93.60 Electronic Information Access at Penn State", Sep. 1993.

littp://www-fhi-berlin.mpg.de/amiga/ar/ar201/p4-6.html, Nov. 1994.

IBM Technical Disclosure Bulletin, vol. 37, No. 02B, Feb. 1994, "Use of Containers for Installing/Removing Products.".

IDD Information Services Tradeline Electronic Stock Guide subscription information and update coupon, 1993.

Information Today, Feb. 1998.

Intermedia Conference, (transcript), Mar. 1994., pp. 81-83 and 1 other.

International Standard—"Bank card originated messages—Interchange message specifications—content for financial transactions" First edition Aug. 15, 1987.

Int'l Stock Exchange Preps New Networks, Network World, Nov. 23, 1988.

J. Postel, G. Finn, A. Katz & J. Reynolds "The ISI Experimental Multimedia Mail System" Information Sciences Institute, Sep. 1986.

J.J. Garcia-Luna-Aceves "Towards Computer-Based Multimedia Information Systems" Computer Message System 85, 1986.

Jack Lund, local/bin/perlbin/perl—urlget—Get a Document Given a WWW URL, URL:www.chemie.uni-dortmund.de/.about.loki/ exp/urlget, Mar. 23, 1994.

Jacob Palme "Distribution Agents (mailing lists) in Message Handling Systems" Computer Message Systems 85 IFIP, 1986.

Jacob Palme "You Have 134 Unread Mail! Do You Want to Read Them Now?" Computer-Based Message Services IFIP, 1984.

Jacques Ferber "Computational Reflection in Class based Object Oriented Languages" OOPSLA '89 Proceedings.

Jia, X et al., "Highly Concurrent Directory Management in the Galaxy Distributed System," IEEE 10th International Conference on Distributed Computing Systems, pp. 416-423, May/Jun. 1990.

K. Smith and S. Zdonik "Intermedia: A Case Study of the Differences Between Relational and Object-Oriented Database Systems" OOPSLA '87 Proceedings.

Khare, Rohit, "Session-ID", w3.org, http://lists.w3.org/Archives/Public/www-logging/msg00066.html, Feb. 16, 1996.

Klemens Bohm & Thomas C. Rakow "Metadata for Multimedia Documents" SIGMOD Record, vol. 23, No. 4, Dec. 1994.

Kramer, Matt, "Off-line readers keep users afloat in sea of E-mail", PC Week Special Report, pp. 94, 96, 99, Oct. 4, 1993.

Lecture Presentation Notes on the Folio World-Wide-Web Retriever 3.1, presented by Jeff Gammon at the Infobase '95 Conference, Copyright 1995.

Lee McLoughlin, usr/bin/perl—Mirror Master—Run Several Mirrors in Parallel, URL:strucbio. biologie.uni-konstanz.de/pdb/mirror/mm, Jan. 18, 1994.

Letter from David Stets to Dick Reisman regarding Retrieval Technologies Inc., including company overview, product descriptions for News Machine, Multi-Serve Gateway, and XFE products, features description for New Machine product (printed Nov. 12, 1991), and Press Release for the Translation Mode Access feature for News Machine, Mar. 10, 1992.

Letter to Dick Reisman from DRI/McGraw-Hill including literature explaining company and its data service, Nov. 18, 1993.

Levy, S., "E-Money (That's What I Want)", http://www.wired.com/wired/archive/2.12/emoney_pr.html, Dec. 1994.

Liddle, Jean, "patent Repository Now Open: rs6000.cmp.ilstu.edu," Newsgroups: comp.os.linus, Sep. 8, 1992.

Lichty, T., America Online's Internet: Easy Graphical Access-The AOL way Windows Edition, pp. 123-163, Copyright 1994.

Lichty, T., The Official America Online for Macintosh Tour Guide, 2.sup.nd Ed., Version 2.5, pp. 135-178, Copyright 1994.

Lother Wosnitza "Group Communication in the MHS Context" Computer Message System 85 IFIP, 1986.

M. Crispin "Networking Group", University of Washington, Dec. 1996.

M. Papa, G. Raguiccini, G. Corrente, M. Ferrise, S. Giurlco and D. Vitale "The Development of an Object-Oriented Multimedia Information System" Lecture Notes in Computer Science, Sep. 1994.

M. Vazirgiannis & C. Mourlas "An Object-Oriented Model for Interactive Multimedia Presentations" The Computer Journal, vol. 36, No. 1, 1993.

Mainstream Intelligent Data Receiver User's Guide, Version 2.0, Mainstream Data, Ltd. (Nov. 4, 1987).

Marvin Sirbu and J.D. Tygar, "Netbill: An Internet Commerce System Optimized for Network-Delivered Services", IEEE Personal Communications Magazine, pp. 34-39, Aug. 1995.

McDermott, Irene E., "Come Out, Come Out, Wherever You Are: Directories on the Web", Searcher, Jun. 2000.

Memorandum from P. Trubey Subject: "Protocol Proposal based on SNPP", Nov. 24, 1993.

Menge, Jede et al.; MS Money, Bis Version 2.0b, copyright 1993 with partial translation of pp. 168-170.

Michael Caplinger "An Information System Based on Distrbuted Objects" OOPSLA '87 Proceedings.

Michael Tschichholz "Message Handling System: Requirements to the User Agent" Computer Message Systems-85, IFIP, 1986.

Microsoft Money für Windows Version 3.0, copyright 1991-1994, pp. 318-319 with partial English translation of p. 319.

Microsoft Press Computer Dictionary, 2nd Edition, p. 185, 1993-1994.

Milburn, John, "HP-UX Patch Availability," Newsgroups: comp. sys.hp, Aug. 18, 1993.

Mirror(1L) Misc. Reference Manual Pages Mirror(1L)Name mirror—minor packages on remote sites URL:nic.funet.fi/FUNET/hamster.mirror.txt, Dec. 2, 1993.

MIT/I.CS/TM-419, "Notes on Community Information Systems", D.K. Gifford—Dec. 10, 1989.

Moore, "SMS Debut Draws Crowds, Queries; Corporate Role Remains Uncertain", Computerworld, vol. 28, No. 38, p. 14, Sep. 19, 1994.

(56) References Cited

OTHER PUBLICATIONS

Mockapetris, P., "Domain Names—Implementation and Specification," Network Working Group, Request for Comments—883, Nov. 1983.
Mori et al., "Superdistribution: The Concept and the Architecture," The Transactions of the IEICE, vol. E 73, No. 7, pp. 1133-1146, Jul. 1990.
Murphy, Sean, "The state WWW biz", Electronic Engineering Times, p. 80, Dec. 19, 1994.
N. Borestein, C. Everhart, J. Rosenberg, A. Stoller "A Multi-media Message System for Andrew" USENIX Winter Conference Feb. 1988.
N. Yankelovich, B. Haan, N. Meyrowitz & S. Drucker "Intermedia: The Concept and the Construction of a Seamless Information Environment" Jan. 1988 IEEE.
Nachbar, Daniel, "When Network File Systems Aren't Enough: Automatic Software Distribution Revisited," Proceedings of the USENIX Association Summer Conference, pp. 159-171, Atlanta, GA (Jun. 9-13, 1986).
Nelson, Stephen L.; Microsoft Money Version 2.0b, 1992.
Online Business Today Archives, Home Page Press, Inc., Contents of WWW Web Site, http://www.hpp.com/s-clickshare95.html, as of Mar. 19, 1997.
Osel, P. And Gansheimer W., "OpenDist—Incremental Software Distribution", 1995 LISA IX, Monterey, CA Sep. 17-22, 1995.
Overview of New Electronic Marketing & Communications Channel From Pipeline, letter from Pat Dane of Pipeline Communications to Harland Levinson and Dick Reisman of Unct (Apr. 13, 1994 (Fax header states Apr. 14, 1995)).
P. Venkat Rangan, Harrick M. Vin, and Srinivas Ramanathan—"Designing an On-Demand Multimedia Service", Jul. 1992.
Palme, Jacob, "Issues and Concepts in Senior Online", Senior Online, Telematics DE4002, Report D6.1, Dec. 1994.
Paul Wilson "Structure for Mailbox System Applications" Computer-Based Message Services, IFIP 1984.
Phil Lapsley and Brian Kantor "Network News Transfer Protocol", Feb. 1986.
Powell Crowe, E., "Log Me On, Log Me Off", Computeruser.com, http://www.computeruser.com/magazine/national/1204/nets1204.html, Jul. 5, 1994.
Qmodem—4.6 Test-Drive, Professional Communications, Software for your PC, Copyright (C) 1994 Mustang Software, Inc.
Qmodem 4.0 Operations Manual, 1989, The Forbin Project, Inc.
R. Campbell, N. Islam, R. Johnson, P. Kougiouris & P. Madany "Choices, Frameworks and Refinement" Department of Computer Science, University of Illinois, Dec. 1991.
R. Gotze, H. Eirund & R. Claass in "Object-Oriented Dialog Control for Multimedia User Interfaces" Lecture Notes in Computer Science-Human Computer Interaction Sep. 1993.
R. Thomas, H. Forsdick, T. Crowley, R. Schaaff, R. Tomlinson & V. Travers "Diamond: A Multimedia Message System Built on a Distributed Architecture" IEEE, Dec. 1994.
R. J. Anderson, "UEPS—A Second Generation Electronic Wallet", 1992.
Philippe Rabergeau, "My American Dream—Map for Gateway Highway 94," Mar. 13, 1994.
Ralf Steinmetz "Synchronization Properties in Multimedia Systems" 1990 IEEE, Apr. 1990.
Reisman, Richard, "CD-ROM/Online Hybrids, The Missing Link," "CD-ROM Professional," vol. 8 No. 4, Apr. 1995, pp. 66-67, 68, 70-74.
Rich, K. And Leadley, S., "hobgoblin: A File and Directory Auditor," LISA V, San Diego, pp. 199-207, Sep. 30-Oct. 3, 1991.
Richard L. Phillips "An Interpersonal Multimedia Visualization System" IEEE Computer Graphics & Applications IEEE 1991.
Richman, B., "Online or OnDisc? When to Choose CD-ROM for Your Database", pp. 53-54, Mar. 1993, CD-ROM Professional.
RIPscrip Graphics Protocol Specification "Remote Imaging Protocol" Copyright (c) 1992-1993 TeleGrafix Communications, Inc. Revision (Jul. 19, 1993).
Rosenberg, Steven (ed.), "Over-the-phone PPV", Cable TV Technology, No. 27, Jun. 4, 1982, pp. 1-2.
Rothfeder, J., "Dow Jones Makes a Young Dog Do New Tricks", Business Weekly, pp. 89 & 92, Jan. 16, 1989.
Rouillard, J. And Martin, R., "Config: A Mechanism for Installing and Tracking System Configurations", 1994 USA, San Diego, CA Sep. 19-23, 1994.
Rozenblit, M., "O, A & M Capabilities for Switching Software Management," IEEE Global Telecommunications Conference, pp. 357-361, Copyright 1993.
S. Jackson & N. Yankelovich "InterMail: A Prototype Hypermedia Mail System" Hypertext 91 Proceedings Dec. 1991.
S. Ramanathan & P.V. Rangan "Architectures for Personalized Multimedia" IEEE, 1994.
SAEF Product Review, 1988, Chapter 2.
Saltzer, J., "On the Naming and Binding of Network Destinations," Networking Group, Request for Comments—1498, Aug. 1993.
Sarin, S. et al., "A Flexible Algorithm for Replicated Directory Management," IEEE 9.sup.th International Conference on Distributed Computing System, pp. 456-464, Jun. 1989.
Satdeva, B. Moriarty, P.M., "Fdist: A Domain Based File Distribution System for a Heterogeneous Environment," LISA V, San Diego, CA, pp. 109-125, Sep. 30-Oct. 3, 1991.
Schaumiller-Bichl, I., "IC-Cards in High-Security Applications", 1987.
Screenshots from MS Money 2.0b (with annotations), copyright 1991-92.
Segal, Mark E. amd Frieder, Ophir, "Dynamically Updating Distributed Software: Supporting Change in Uncertain and Mistrustful Environments", IEEE Proceedings Conference on Software Maintenance—1989, Oct. 16-19, 1989.
Sellens, J., "Software Maintenance in a Campus Environment: The Xhier Approach," LISA V, San Diego, CA, pp. 21-28, Sep. 30-Oct. 3, 1991.
Schroeder, Erica and Knowles, Anne, "Windows 95 rushes the Net", PC Week, vol. 12, No. 34, Aug. 28, 1995.
Shafer, Steven and Thompson, Mary, "The SUP Software Upgrade Protocol", Carnegie Mellon University School of Computer Science, Sep. 7, 1989.
Silvano Maffeis "A Flexible System Design to Support Object-Groups and Object-Oriented Distrubuted Programming" Lecture Notes in Computer Science, Jul. 1993.
Simon Gibbs "Composite Multimedia and Active Objects" OOPSLA '91.
Smalley, "Hermes Nears Finish Line; Bloodhound will be Part of Summer Debut", PC Week, vol. 11, No. 19, p. 31, May 16, 1994.
"Smart Card Augmentation of Kerberos" by Marjan Krajewski, Jr., paper presented at the Privacy and Security Research Group Workshop on Network and Distributed System Security, San Diego, CA, Feb. 1993.
Smith, JR., K. H., et al., "Accessing Multimedia Network Services", IEEE Communications Magazine, May 1992; pp. 72-80.
Symonds, W. C., "Getting Rid of Paper Is Just the Beginning", Business Week, Dec. 21, 1992.
T. Hase & M. Matsuda "A New Audio-Visual Control Using Message Object Transmission", 1994 IEEE, Nov. 1994.
T. Little & A. Ghafoor "Network Considerations for Distributed Multimedia Object Compsition and Communications" 1990 IEEE Network Magazine, Nov. 1990.
T. Little & A. Ghafoor Spatio-Temporal Composition of Distributed Multimedia Objects for Value-Added Networks, IEEE, 1991.
T. Little & A. Ghafoor "Synchronization and Storage Models for Multimedia Objects" 1990 IEEE, Apr. 1990.
T. Purdin, R. Schlichting & G. Andrews "A File Replication Facility for Berkeley Unix" Software Practice and Experience, vol. 17, Dec. 1987.
T. Purdy, D. Thorslund & N. Witchlow "Merdian SL Messaging" Computer Message Systems-85 IFIP, 1986.
Teresa F. Lunt "A Model for Message System Security" Computer Message Systems 85 IFIP, 1986.
Terry Gray "Message Access Paradigms and Protocols", University of Washington, Aug. 1995.

(56) References Cited

OTHER PUBLICATIONS

The Federal Register, product brochure, Counterpoint Publishing, Fall 1993.
The Frye Utilities for Networks, "Software Update and Distribution System," Frye Computer Systems, Inc., Copyright 1992.
Ubois, "Electronic bulletin board help companies communicate: BSS offer an efficient, cost-effective way to exchange information" Dec. 1992.
UNIX System Manager's Manual (SMM), 4.3, Berkeley Software Distribution Virtual VAX-11 Version, Apr. 1986 (including a document entitled "A Fast File System for UNIX," by Marshall McKusick et al., pp. SMM 14-1 through SMM 14-15.
UNIX User's Reference Manual (URM), 4.3 Berkley Software Distribution Virtual VAX-11 Version, Apr. 1986 (including the description of a RDIST—a remote file distribution program—4 pages).
User's Guide Microsoft Money for Windows, Version 3.0, copyright 1991-1994.
User's Guide Microsoft Money, Version 2.0, copyright 1991-1992.
Vaughan-Nichols, "Lotus and CIS team up on Notes; Wall Street Edge on Prodigy; new Internet options", Computer Shopper, v13, n7, 0.562(2), Jul. 1993.
Wagner, Mitch, "As Agency DoubleClick Heads Off Downtime With Redudant Systems", Internet Week, 21, Sep. 13, 1999.
Weber, Thomas, "The Man Who Baked the First Web Cookies Chews Over Their Fate", Wall Street Journal, E-World, Feburary, 28, 2000.
Wempen, Faithe, Using Microsoft Money for Windows 95, copyright 1996.
William G. Camargo "The Harvest Broker," Dec. 1994.
Williams, Sara, "Internet Component Download", Microsoft Interactive Developer, pp. 49-52, Summer 1996.
Wilson, Tim, "Web Site Mining Gets Granular", Internet Week, n 758, 1999.
Wingfield, "Netscape Inks Pact with Sun, Macromedia", InfoWorld, vol. 17, No. 22, p. 16, May 29, 1995.
Wolfgang Lux "Adaptable Object Migration: Concept and Implementation" Operating Systems Review Apr. 1995.
Wong, W.C., "Local Disk Depot—Customizing the Software Environment," 1993 LISA, Monterey, CA, pp. 51-55, Nov. 1-5, 1993.
Request for Inter Partes Reexamination of U.S. Pat. No. 6,557,054, Control. No. 95/002,093, filed Aug. 20, 2012, including accompanying Exhibits J-K and L-P; 473 pages.
U.S. Appl. No. 08/124,616, Gary W. Grube, "Method for Collecting and Providing Network and User Information,"filed Sep. 22, 1993; 21 pages.
Bowen, C., "How to Get the Most Out of CompuServe," 1st Edition, 1984; 290 pages.
Diamond, J., "Giving CompuServe a Chance," Network World, May 15, 1995; 3 pages.
Jones, R. S., "Compuserve Users Receive Crosstalk Forum," Info World, Sep. 21, 1987; 1 page.
Request for Inter Partes Reexamination of U.S. Pat. No. 6,658,464, Control No. 95/002,095, filed Aug. 21, 2012, including accompanying Exhibits J-K and L-P, 398 pages.
Berners-Lee, T., et al., "Hypertext Markup Language (HTML): A Representation of Textual Information and Meta Information for Retrieval and Interchange," Jun. 1993; 42 pages.
Bowen, C., "How to Get the Most Out of CompuServe," 5th Edition, 1991; 477 pages.
Gilster, P., "The Mosaic Navigator: The Essential Guide to the Internet Interface," 1st Edition, 1995, 253 pages.
Decision on Appeal No. 2011-009259, mailed Sep. 27, 2012 for U.S. Pat. No. 09/553,336, filed Apr. 20, 2000; 8 pages.
Decision on Appeal No. 2012-000514, mailed Oct. 11, 2012 for U.S. Appl. No. 10/954,239, filed Oct. 1, 2004; 8 pages.
"Crosstalk User's manual Version 3.0," Microstuf, 1984.
Bozdag, E, et al., "A Comparison of Push and Pull Techniques for AJAX," Report TUD-SERG-2007-016a, Software Engineering Research Group, Delft University of Technology, 2007; 12 pages.

CompuServe Inc., "I Didn't Know I Could Do That on CompuServe," p. 56, 1993.
Girard, M., "Assistant Agents for creation and management of distributed applications," IEEE Proceedings for the Eighth International Conference on Tools with Artificial Intelligence, 1996; pp. 456-457.
Gkantsidis, C, et al., "Planet Scale Software Updates," ACM SIGCOMM '06, Sep. 11-15, 2006; 12 pages.
J. L. Hopkins, "Compuserve for IAPPP Announcements," 1984 I.A.P.P.P. Symposium in Big Bear, 1984.
T. Greene, "CompuServe Offers Internet, IP Services," Network World, p. 13, Jul. 3, 1995.
"Foreground/background" definition, PC Magazine Encyclopedia, 1981-2013, The Computer Language Co. Inc.
"History of Computing," 1982-2001, Lexikon Services, ISBN 0-944601-78-2, http://www.computermuseum.li/Testpage/Chip-Intel80286.htm.
"List of disk magazines," Jul. 24, 3013, Wikipedia.
"Making Connections: InfoWorld Compares Seven Window Communications Packages," InfoWorld, May 30, 1994.
"Reference Manual Relay/PC Gold 6.0 for Windows," Jul. 1993, pp. 1-3, 9-11, 13-16, Relay Tech., Inc.
"Script Language Manual Rely/PC Gold 6.0 for Windows," Jul. 1993, pp. 1-2, Relay Tech., Inc.
"The CD-ROM 'magazine'," Strategy, Feb. 21, 1994.
"User Guide Qmodem Pro for Windows," Nov. 15, 1993, pp. 81-83, Mustang Software.
"User Manual Relay/PC Gold 6.0 for Windows," Jul. 1993, pp. 2-8, 27-30, 101, 104, Relay Tech., Inc.
Atkin, Denny, "QmodemPro for Windows," May 1994, p. 76, Issue 164.
Background definition, Webopedia Computer Dictionary, Jul. 30, 2013.
Bird, Peter J., "LEO, The First Business Computer," 1994.
Franklin, Curt & Dave Soustan, "Flow Operating Systems Work," 2013.
Giovetti, Alfred C., "Nautilus," Compute!, Dec. 1992, p. S4, issue 147.
MitemView website screenshot, mitemview.pdf, Oct. 2, 2013.
Rassuli, Kathleen & Michael Tippins, "History and Cyberspace: A Marketing History of the CD-ROM Book Industry," Journal of Macromarketing, Spring 1997.
PTAB Appeal Decision dated Feb. 28, 2014 in Appeal No. 2011-011028 for U.S. Appl. No. 11/513,329.
Request for Rehearing of PTAB Appeal Decision dated Feb. 28, 2014 in Appeal No. 2011-011028 for U.S. Appl. No. 11/513,329.
PTAB Rehearing Decision dated Jul. 25, 2014 in Appeal No. 2011-011028 for U.S. Appl. No. 11/513,329.
Transcript of Oral Argument held Jun. 7, 2016 in Appeal No. 2014-000914 for U.S. Appl. No. 12/603,229.
PTAB Appeal Decision dated Jun. 30, 2016 in Appeal No. 2014-000914 for U.S. Appl. No. 12/603,229.
PTAB Appeal Decision dated Jul. 1, 2016 in Appeal No. 2014-000545 for U.S. Appl. No. 12/893,112.
PTAB Appeal Decision dated Jun. 27, 2016 in Appeal No. 2014-000548 for U.S. Appl. No. 12/893,246.
PTAB Appeal Decision dated Jun. 23, 2016 in Appeal No. 2014-000651 for U.S. Appl. No. 12/893,259.
Tom Lichty, "The Official America Online for Macintosh Tour Guide," 2nd Ed., Ventana Press, Inc., 1994.
K. von der Heydt, J. Kemp, J. Lynch, J. Miller and C.S. Chiu, "Array Data Acquisition with Wireless LAN Telemetry as Applied to Shallow Water Tomography in the Barents Sea," Woods Hole Ocean. Inst., Technical Report, Dec. 1992.
David J. Ewing, Richard S. Hall, Michael F. Schwartz, "A Measurement Study of Internet File Transfer Traffic," Dept. of computer Sci., Univ. Of Colo., Boulder, Jan. 1992.
Ex Parte Reexamination Certificate for U.S. Pat. No. 6,658,464 (May 11, 2016).
Inter Partes Reexamination Certificate for U.S. Pat. No. 6,658,464 (Jul. 6, 2016).
PTAB Decision Denying Institution of CBM Patent Review of U.S. Pat. No. 6,658,464, CBM2014-00084, Paper 18 (Aug. 6, 2014).

(56) References Cited

OTHER PUBLICATIONS

PTAB Decision Denying Rehearing of Non-Institution of CBM Patent Review of U.S. Pat. No. 6,658,464, CBM2014-00084, Paper 21 (Sep. 23, 2014).
PTAB Final Written Decision re. U.S. Pat. No. 6,658,464, CBM2015-00004, Paper 33 (Mar. 21, 2016).
Ex Parte Reexamination Certificate for U.S. Pat. No. 6,557,054 (May 20 2016).
Inter Partes Reexamination Certificate for U.S. Pat. No. 6,557,054 (Jul. 6, 2016).
PTAB Decision Denying Institution of CBM Patent Review of U.S. Pat. No. 6,557,054, CBM2014-00083, Paper 17 (Aug. 6, 2014).
PTAB Decision Denying Rehearing of Non-Institution of CBM Patent Review of U.S. Pat. No. 6,557,054, CBM2014-00083, Paper 20 (Sep. 23, 2014).
PTAB Order Terminating CBM Trial of U.S. Pat. No. 6,557,054 CBM2015-00005, Paper 15 (Apr. 23, 2015).
Anderson, Heidi, "GPS: It's Everywhere You Want to Be", Wireless Computing, vol. 8, Issue 5, 2002, 25-28.
Carmack, Carmen, The Evolution of the Pen, Wireless Computing, vol. 8, Issue 5, 2002, 99-102.
Dakss, Hyperactive: An automated tool for creating hyperlinked video, Massachusetts Institute of Technology, 1999.
Dedrick, "A Consumption Model for targeted Electronic Advertising", MultiMedia IEEE, Summer 1995.
Dodd, Jeff, "3G & The Future of Wireless", Wireless Computing, vol. 8, Issue 5, 2002, 48-51.
Dodd, Jeff, "A Generation in Waiting", Wireless Computing, vol. 8, Issue 5, 2002, 45-47.
Dodd, Jeff, "PDAs & Cell Phones Battle It Out", Wireless Computing, vol. 8, Issue 5, 2002, 52-53.
Dodd, Jeff, "Reach Out & Surf Somewhere With 2G", Wireless Computing, vol. 8, Issue 5, 2002, 41-44.
Dodd, Jeff, "The PDA as a Communicator", Wireless Computing, vol. 8, Issue 5, 2002, 38-40.
Edge-Salois, Bryan, "Mobile Messenger Devices Keep Users Mobile", Wireless Computing, vol. 8, Issue 5, 2002, 56-58.
Farwell, Jennifer, "Sensored Information", Wireless Computing, vol. 8, Issue 5, 2002, 135-136.
Lortz, John et al., "What is Bluetooth", Wireless Computing, vol. 8, Issue 5, 2002, 72-74.
Mahler, Jay, "PDAs Phone Home", Wireless Computing, vol. 8, Issue 5, 2002, 33-36.
Nelson, Tom, et al., "The Other Guys", Wireless Computing, vol. 8, Issue 5, 2002, 18-20.
Nelson, Tom, et al., "Wireless PDA Honor Roll", Wireless Computing, vol. 8, Issue 5, 2002, 15-17.
Perry, Christian, "Converging Technologies", Wireless Computing, vol. 8, Issue 5, 2002, 5-9.
Perry, Christian, "The Handheld Internet"., Wireless Computing, vol. 8, Issue 5, 2002, 29-32.
Perry, Christian, "What's the Big Deal with Going Wireless?", Wireless Computing, vol. 8, Issue 5, 2002, 13-14.
Phelps, Alan, "GPS Receivers & PDAs Join Forces", Wireless Computing, vol. 8, Issue 5, 2002, 21-24.
Bowling, Rebecca, "PDA Video", Wireless Computing, vol. 8, Issue 5, 2002, 119-122.
Smith, Steven, "Palm v. Pocket PC", Wireless Computing, vol. 8, Issue 5, 2002, 10-12.
Smith, Steven, "PDA Apps to Go", Wireless Computing, vol. 8, Issue 5, 2002, 59-60.

* cited by examiner

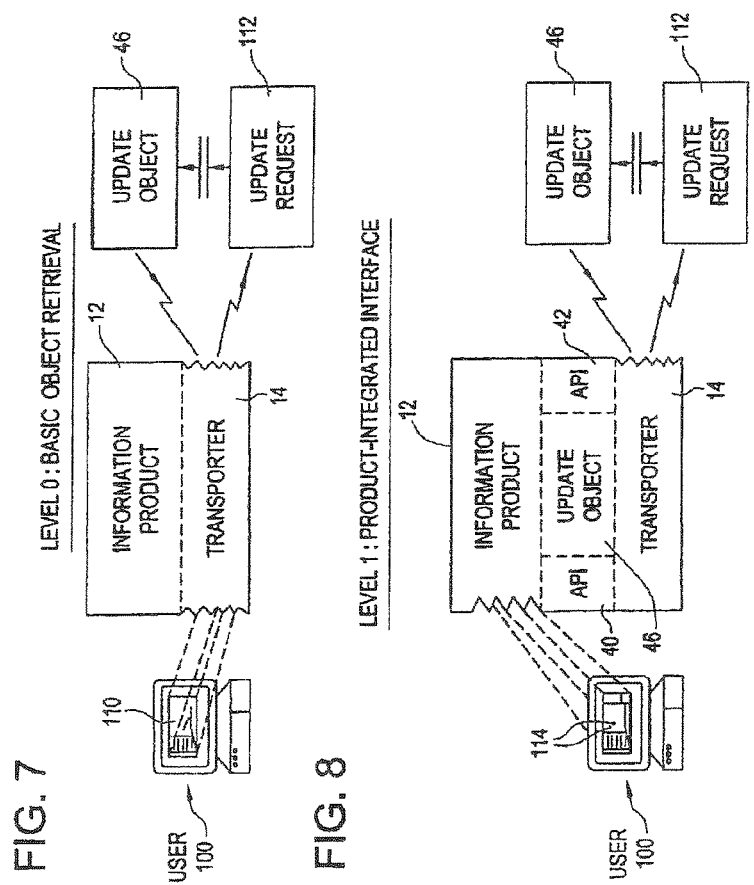

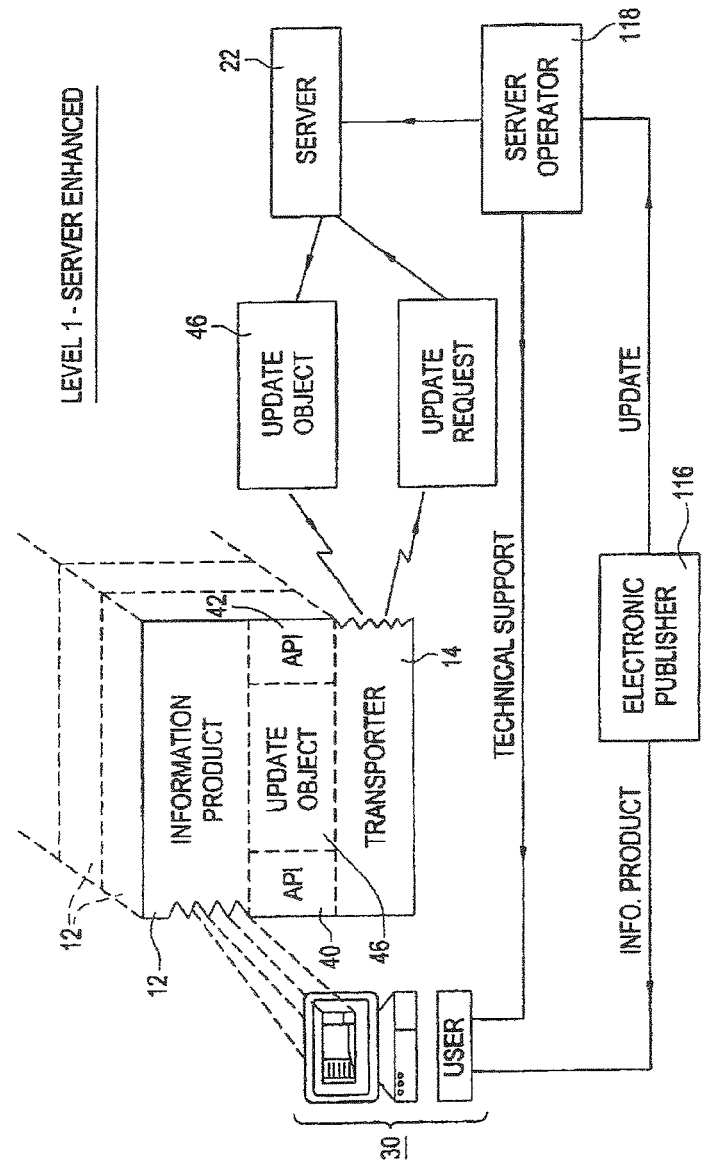

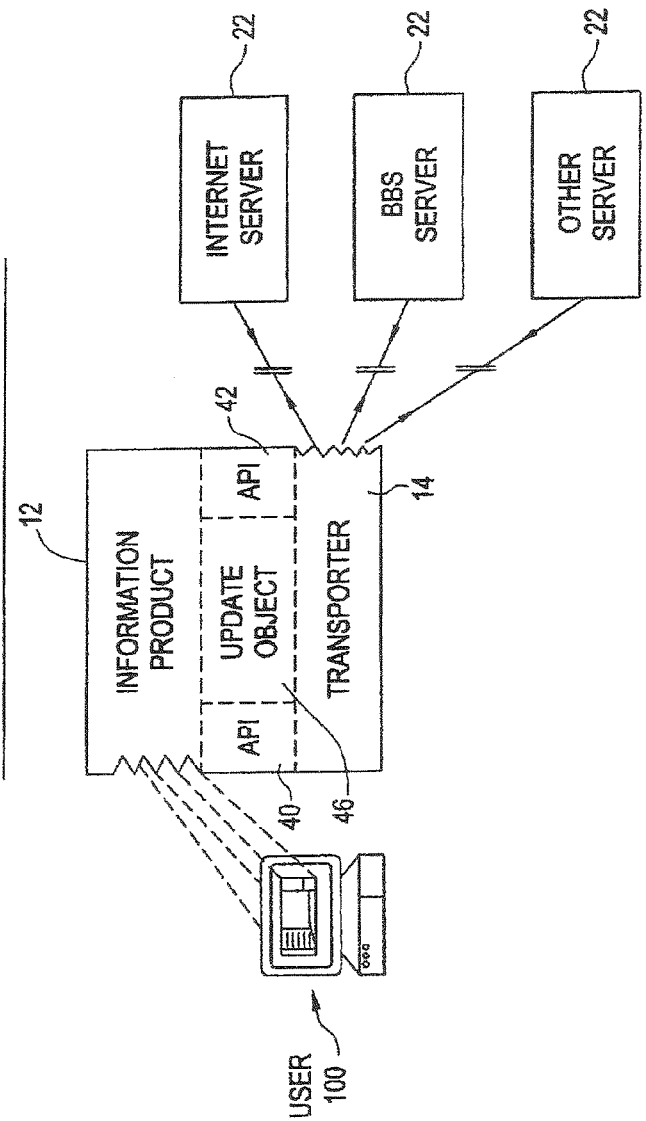

LEVEL 3 : MULTIPLE SERVICE ROUTES

PROVIDING SERVICES FROM A REMOTE COMPUTER SYSTEM TO A USER STATION OVER A COMMUNICATIONS NETWORK

CROSS REFERENCE TO RELATED APPLICATIONS

This application is a Continuation of co-pending U.S. patent application Ser. No. 12/603,229 filed on Oct. 21, 2009 by REISMAN, Richard R. which is a Divisional of U.S. patent application Ser. No. 11/513,329 entitled PROVIDING SERVICES FROM A REMOTE COMPUTER SYSTEM TO A USER STATION OVER A COMMUNICATIONS NETWORK filed on Aug. 31, 2006 (pending) by REISMAN, Richard R. which is a Continuation of U.S. patent application Ser. No. 09/556,062, filed on Apr. 20, 2000 (pending), which is a Continuation-In-Part of U.S. patent application Ser. No. 08/982,157, filed Dec. 1, 1997 (U.S. Pat. No. 6,125,388), and Ser. No. 08/641,010, filed Apr. 29, 1996 (U.S. Pat. No. 6,594,692), both of which claim priority to U.S. patent application Ser. No. 08/251,724, filed May 31, 1994 (U.S. Pat. No. 5,694,546), all of which are incorporated by herein by reference in their entireties and for which priority is claimed under 37 C.F.R. §120.

BACKGROUND OF THE INVENTION

1. Field of the Invention

The present invention relates to providing services from a remote computer system to a user station over a communications network and, more particularly, to automated identification of users.

2. Background Art

Electronic publication is an exploding industry in which thousands of new products including magazines and periodicals, software applications and utilities, video games, business, legal and financial information and databases, encyclopedias and dictionaries are purchased by millions of customers. Commonly, such information products are replicated in computer-readable form on magnetic or optical storage diskettes and are box-packaged with printed manuals for distribution to retail stores and direct mail sales. These marketing practices are relatively expensive and involve a significant time lag of at least days or weeks to get a product into a consumer's hands once it is created.

Such costs and delays are generally acceptable for original, high value products such as collections of publications or software application, of which some examples are NEWSWEEK®. Interactive CD-ROM, or disks, which provides a searchable audio-visual library of issues of NEWSWEEK magazine and CINEMANIA®. CD-ROM which provides reviews and other information on newly released films. For time-sensitive, low-value updates, for example, the latest issue of Newsweek or last week's movie reviews, distribution in stored form, on physical media, is slow and the cost may exceed the value of the information in the product.

Thus, electronic transfer from a central computer server to a subscriber's computer over common carriers or wide area networks is an attractive proposition. Similar considerations apply to the distribution of software program updates, although cost and frequency of issue are not such serious constraints. A problem faced in both situations is that of incorporating the received material with the original material so that a fully integrated publication, information database or software program is obtained by the user.

Another class of electronically distributed information product comprises home shopping catalogues of mail order products distributed on optical or other digital data storage disks which may contain text, sound and images from printed catalogues or uniquely created material, for example software application demos. To applicant's knowledge and belief, available products lack any computer order placement capability, requiring orders to be placed by voice call.

Communication between remote computers, not directly interconnected by umbilical cable or a wired network, is enabled by a wide range of hardware devices and software drivers, utilities, applications and application modules. Telephone modems that couple a computer with the telephone network are familiar devices. RF modems that couple computers into wireless networks are less familiar but are beginning to appear in consumer devices known broadly as personal information communicators (PIC's) of which personal digital assistants (PDA's) such as Apple Corp.'s NEWTON® product are a first generation. New kinds of digital communications devices can be expected to emerge as digital technology replaces analog transmission.

General-purpose, online, modem-accessed, electronic information services, such as PRODIGY, COMPUSERVE and AMERICA ONLINE (trademarks), and some Internet services, provide wide access to timely information products from a central server, but are limited and complex. They provide no means for the integration of downloaded information with information products offered on disk or CD, and provide only rudimentary facilities for local viewing and search of downloaded files.

Such online information services provide their own user interface which is generally unlike that of a disk or CD-based information product, and can be customized very little, if at all, by a publisher using the service for product distribution.

Online services are oriented to extended online sessions which require complex user interaction to navigate and find desired information objects. Initial setup and use is rendered complex by requirements related to extended session use of data networks and the frequent need to navigate across the network, and through massive data collections, to locate desired data items. General-purpose online information services do not provide a suitable medium for electronic information publishers to distribute updates, and the like, because of limited interface flexibility, because a publisher cannot expect all their customer base to be service subscribers, and because of cost and payment difficulties. Such services are centered on monolithic processes intended for national use by millions of subscribers which processes are not readily adaptable.

Online service charging mechanisms are also inflexible and inappropriate for most individual information products, requiring monthly subscription fees of $5-10 or more, plus time charges for extended use, which are billed directly to users, after a user sign-up and credit acceptance process. Such cost mechanisms are too expensive and too complex for distribution of many products such as magazine and other low cost update products. They do not presently permit a publisher to build an access fee into a purchase price or a product subscription.

Recent press announcements from corporations such as AT&T, Lotus, Microsoft and MCI describe plans for new online services providing what are called "groupware" services to offer rich electronic mail and group collaboration functions, primarily for business organizations. Although offering multiple electronic object transport operations such services are believed to have complex setup procedures and software requirements and complex message routing features and protocols, and to lack interface flexibility. Accordingly, they are not suitable for mass distribution of low cost electronic information update products.

Communications Products

Many software products exist that enable one computer to communicate with another over a remote link such as a telephone cable or the air waves, but none enables a vendor substantially to automate common carrier mass distribution of an electronic information product to a customer base employing multiple heterogeneous systems with indeterminate hardware and software configurations. Two examples of popular such software products are Datastorm Technologies, Inc.'s PROCOMM (trademark) and CENTRAL POINT COMMUTE (trademark) from Central Point Software, Inc. which are commonly used to provide a variety of functions, including file transfers between, interactive sessions from, host-mode services from, and remote computer management of, modem-equipped personal computers wired into the telephone network.

Counterpoint Publishing's Federal Register Publications

Counterpoint Publishing, (Cambridge Mass.) in brochures available to the applicant in November 1993 offered electronic information products entitled "Daily Federal Register" and "CD Federal Register"." "Daily Federal Register" includes communications software and a high-speed modem. Apparently, the communications software is a standard general purpose communications package with dialing scripts that are customized to the needs of the Federal Register products. Accordingly, the cost of a communications package license which may be as high as about $100 at retail must be included within the product cost. Also, Counterpoint Publishing avoids the difficulties of supporting various modems by providing its own standard modem, with the product, building in a cost (about $100-200) which renders this approach quite unsuitable for mass-market distribution of low cost electronic information update products. The resulting product is not seamless either in its appearance or its operation because the communications software is separately invoked and used, and has its own disparate look and feel to the user.

The "CD Federal Register" provides the Federal Register on CD-ROM at weekly intervals for $1,950.00 and CD-ROM disks are shipped to customers as they become available. Back issues are $125 each. Updates are provided by shipping a disk. The Federal Register is a high-value product intended for specialist, business, academic and governmental users. Distribution of updates on CD-ROM, as utilized by Counterpoint Publishing, is not a suitable method for lower value products such as a weekly news magazine, because of the associated costs. Shipping delays are a further drawback.

While the two product "CD Federal Register" and "Daily Federal Register" might be used together, at an additive cost, to provide a combination of archives on CD-ROM plus daily updates obtained and stored until replaced by a new CD-ROM, based on information available to the present inventor it appears that the two products must be used separately. Thus they must apparently be viewed, searched, and managed as two or more separate collections, requiring multiple steps to perform a complete search across both collections, and requiring manual management and purging of the current collection on hard disk by the user.

Xcellenet's "REMOTEWARE®"

Xcellenet Inc. in product brochures copyrighted 1992 and a price list dated Aug. 16, 1993, for a "REMOTEWARE®" product line, offers a range of REMOTEWARE® software-only products providing electronic information distribution to and from remote nodes of a proprietary REMOTEWARE® computer network intended for use within an organized, corporate or institutional data processing or management information system. The system is primarily server directed, rather than user initiated and requires an expensive program (priced at $220.00) to run at the user's node whereas the present invention addresses consumer uses which will support costs of no more than a few dollars per node.

Furthermore, REMOTEWARE® is primarily intended to be used with other REMOTEWARE® products at the node which other products provide a range of user interface and data management functions, at significant additional cost, each with their own separate user interface presenting a standard REMOTEWARE® look and feel. In addition, the nodes require a sophisticated central support and operations function to be provided, which may be difficult for an electronic information publisher to accomplish and add unacceptable expense.

REMOTEWARE® is overly elaborate to serve the simpler objectives of the present invention. Designed for the demanding needs of enterprise-wide data processing communications, the client or node package provides many functions such as background operation, ability to receive calls from the server at any time, ability to work under control of the central server to survey and update system software and files and an ability to support interactive sessions, which abilities are not needed to carry out the simpler information transport operations desired by the present invention. Such capabilities may be desirable in an enterprise MIS environment, but are not appropriate to a consumer or open commercial environment, and bring the drawbacks of complexity, cost, and program size, which may put undesirable operational constraints on the user (and perhaps even compromise the user's privacy). REMOTEWARE® is too costly and complex for mass distribution of updates to periodicals, cannot be shipped invisibly with an electronic information product and requires specialized server software and operations support that would challenge all but the largest and most technically sophisticated publishers. Accordingly, REMOTEWARE® is unsuitable for widespread use as an economical means of distributing updates for a variety of electronic information products.

Although it has wider applications, a significant problem addressed by the invention is the problem of economically distributing updates of electronic information products to a wide customer base that may number tens or hundreds of thousands, and in some cases, millions of consumers. At the date of this invention, such a customer base will normally include an extensive variety of computers, operating systems and communications devices, if the latter are present, all of which may have their own protocols and configuration requirements.

While an electronic information product vendor might consider licensing or purchasing an existing commercial communications product for distribution with their publication product to enable remote, diskless updating, the high cost of such a solution would generally be unacceptable because a communication package includes a broad range of functionalities not required for the vendor's particular purpose, for example, remote keyboarding. Significantly, a commercial communications package is not susceptible to customization of its user interface and may have its own configuration requirements and installation requirements, with regard to directories, device drivers and the like, which are incompatible with other vendor or user requirements or are simply a nuisance to the user. Thus, a commercial communications product in addition to its cost, cannot be satisfactorily integrated with an information product.

There is accordingly a need for computer-implementable information transport software to enable simple, economical and prompt mass distribution of electronic information products.

BRIEF SUMMARY OF THE INVENTION

The following summary provides an understanding of at least some aspects of the invention. The summary is not an extensive overview of the invention. It is not intended to identify key or critical elements of the invention nor is it intended to delineate the scope of the invention. Its sole purpose is to present some concepts of the invention in a simplified form as a prelude to the more detailed description that is presented later.

Methods, systems, and computer program products for providing services from a remote computer system to a user station over a communications network include automated identification of users.

During a first communication session between a user station and a remote computer system, the user station provides first user identification information to the remote computer system. The remote computer system uses the first user identification information in transaction during the first communication session.

The remote computer system also stores at least a portion of the first user identification information. The remote computer system also provides second user identification information to the user station, which is stored at the user station. The remote computer system also generates an association between the stored first user identification information and the second user identification information.

During subsequent communication sessions between the user station and the remote computer system, the user station automatically provides the stored second user identification information to the remote computer system, that is, without user-prompting. The remote computer system uses the received second user identification information and the association, during the subsequent communication session, to identify and retrieve the stored first user identification information. The remote computer system then uses the retrieved first user identification information in the subsequent transaction.

Further embodiments, features, and advantages of the present invention, as well as the structure and operation of the various embodiments of the present invention, are described in detail below with reference to the accompanying drawings. These aspects are indicative of but a few of the various ways in which the principles of the invention may be employed, and the present invention is intended to include all such aspects and their equivalents. Further features and advantages will be apparent to a person skilled in the art based on the description set forth herein and/or may be learned by practice of the invention.

It is to be understood that both the foregoing summary and the following detailed description are exemplary and explanatory and are intended to provide further explanation of embodiments of the invention as claimed.

BRIEF DESCRIPTION OF THE DRAWINGS/FIGURES

The accompanying drawings, which are incorporated herein and form part of the specification, illustrate aspects of the present invention and, together with the description, further serve to explain principles of the invention and to enable a person skilled in the pertinent art to make and use the invention.

FIG. 7 is a schematic diagram of a basic object retrieval embodiment of the invention.

FIG. 8 is a schematic diagram of a product-integrated interface embodiment of the invention.

FIG. 9 is a schematic diagram of a server-enhanced embodiment of the invention.

FIG. 10 is a schematic diagram of an embodiment of the invention providing update objects via a commercial service.

DETAILED DESCRIPTION OF THE INVENTION

The present invention now will be described more fully hereinafter with reference to the accompanying drawings, in which embodiments of the invention are illustrated. The invention may, however, be embodied in many different forms and should not be construed as limited to the embodiments set forth herein. Rather, these embodiments are provided so that this disclosure will be thorough and complete, and will fully convey the invention to those skilled in the art.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
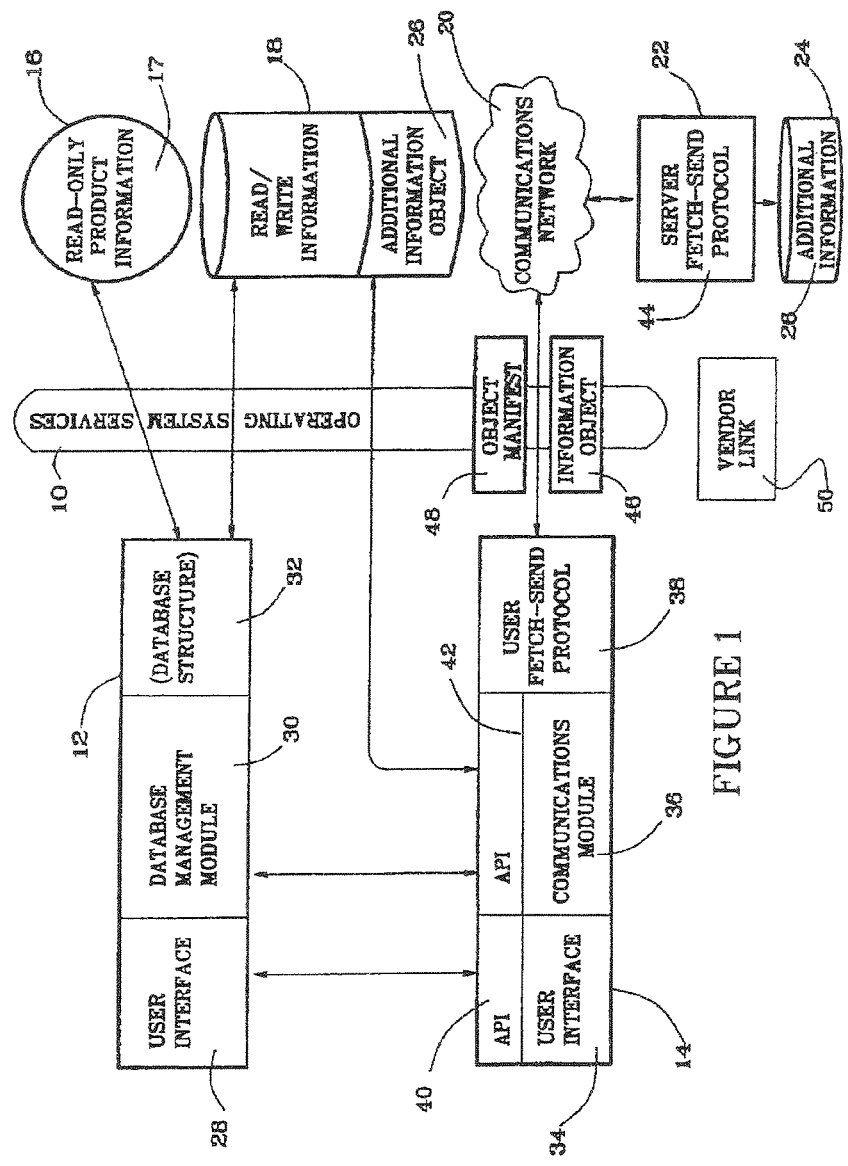
FIG. 1 is a schematic diagram an information transport software component installed in a computer workstation and communicating with a complementary server-resident software module for distribution of electronic information objects.

Referring to FIG. 1, the inventive software component is schematically shown in operative mode installed at a user's computer workstation. The workstation is communications-equipped for communication with remote services, for example by modem, which services are also shown schematically. Only relevant software and hardware components of the system are shown.

Relevant components at the workstation comprise operating system services 10, a containing information product 12, an information transport component or module 14, herein also referenced as a "transporter" which may be a stand-alone product or, in preferred embodiments is embedded or contained in the containing information product 12. Information transport component 14 provides a general purpose facility for sending and fetching information objects between an end user's computer (the client) and a central server. Information transport component 14 is not customized to the containing information product 12, but is intended to be used in conjunction with any of a wide range of electronic information products.

Operating system services 10 provide capabilities for the containing information product 12 and the information transport component 14 to access a readable information storage device 16 which may, for example, be an optical disk drive such as a read-only CD-ROM where product information 17 is stored. In addition, a read/write information storage device 18, for example, a conventional hard disk is accessed via the operating system services 10 for storage of a fetched additional information object 26. The storage media used for hard disks and the like are often described as nonvolatile and the type of storage is frequently referenced as "permanent." however, the more recently used term "persistent storage," which references the manner of storage as well as the physical storage media and distinguishes from transient storage where objects may be automatically erased after some interval, or event, without supervisory control or awareness of the erasure, is a more suitable descriptive term for the purposes of the present invention.

As necessary, different, or modified, information transporter components 14 can be supplied for users of different operating systems or system families, notably DOS (available in several versions, for example from Microsoft Corp, IBM Corporation, Novell, Inc.) Windows (trademark, Microsoft Corp.), Apple Computer Corp.'s operating systems, possibly IBM Corporation's OS/2 (trademark), and any distinct operating systems developed for personal digital assistants, pen-based computers and the like.

Information transport component 14 also uses operating system services 10 for external communication with a communications network 20 through which the information transport component 14 can access a remote server 22, or server-client network, supporting a data storage device 24 where desired additional information object 26 is located.

Communications network 20 can be any electronic distribution system suitable for transporting information objects 26 including wired and wireless common carriers such as telephone networks, cable television systems or networks and mobile telecommunications or data communications networks and extends also to emerging and future systems of providing electronic communication between users of diversified equipment. The term "common carrier" is used herein to embrace all such data communication systems as will reasonably meet the purposes of the invention. The term "modem" is used herein to embrace any network interface device enabling a user station to communicate on such a communications network 20.

While the containing information product 12 can take many different forms, as described herein, and as will also be apparent to those skilled in the art, a preferred embodiment is that of a periodically issuing publication or publications, for example, a news magazine or a collection of patents. Again, the additional information object 26 could be any information of interest to the user, having some relevance to the containing information product 12, but the invention and its unique capabilities enable the additional information object 26 to be fully integrated with the containing product 12 in a manner that can be automated to be transparent to the user.

The inventive information transport component 14 is designed to require a minimum of user input. A bare minimum will be a user's ID which can be entered by the user in a product setup and automatically accessed for information transport, or could by pre-loaded by the vendor from data supplied by the user at purchase.

A product ID is preferably pre-loaded into the containing information product 12 by the information product vendor or publisher to be available for use by the information transport component 14. However, even this may not be required. In an alternative embodiment, the product ID can be automatically incorporated into the product in a product replication process that permits individualized coding of unique ID's. In most cases, a user-actuated menu selection is provided in the containing information product 12 after integration with the inventive information transport component 14 to activate transport of an additional information object, and preferably, selection of transport activation drops down a menu of transport choices such as "FETCH UPDATE", "FETCH CATALOG OF UPDATES", "SEND DATA" and the like, each of which then runs automatically upon selection.

Updating can also be totally automatic, and other than an obviously desirable user notification, be completely invisible to or transparent to the user, running in background on their system, while the user's screen is available for other processing such as running the containing information product 12. Where updates are made available on a known schedule, a totally automated product can be provided that fetches an update without any user intervention, on the specified release date, or as soon thereafter as the user's system, or the containing information product 12, is activated. In practice, most users will probably prefer an opportunity to confirm that the fetch transaction should proceed. A preferred embodiment monitors the user's system clock and alerts a user to the arrival of an update release date and asks the user to confirm that the system should seek and fetch the scheduled update, if available.

Thus, the invention is particularly suitable for importing updates of information or information processing products, such as periodically issuing literature, or software upgrades. Accordingly, additional information object 26 preferably comprises updates which can be integrated with the information product 12 to provide, for example, a coherent body or continuous sequence of materials that can be commonly searched and indexed preferably in a manner giving the user the appearance of a common logical file formed from physically distinct files. The appearance of integration can be achieved by searching new and then old indexes in series and making the search and navigation logic of the containing product smart enough to combine new and old information. For example a new object can have an index file similar to that for the original information product 12. A search engine can first search the new index, then the old one, and then produce a combined set of results. Preferably, the files are not actually merged or otherwise combined as to do so could be unduly complex.

As shown in FIG. 1, the containing information product 12 comprises a user interface 28 enabling the user to view, search, excerpt and print or otherwise export or process selected information items from product information 17.

The user interface 28 provides standard information product features, as conventionally supplied by the product publisher, supplemented by appropriate fetch or send options to activate the features of the inventive information transport component 14.

Also shown in FIG. 1 are a database management module 30 and a data structure definition module 32. Database management module 30 provides retrieval-oriented database processing of the information product including indexed searching and selective retrieval capabilities using one or more index keys such as an issue or item number, or full text searching, and may provide hypertext and hypermedia linkages. The data structure definition 32 provides the database structure of relevant files as classified by field or element, name, type, size and the like. After successful completion of a fetch operation, control is returned to containing information product 12 to process the new information in essentially the same manner as the original information, or in any other manner for which it has been equipped.

Major modules comprised in the inventive information transport component 14 are a user interface 34, a communications module 36 and fetch-send protocol 38. In addition, the information transport component 14 preferably comprises its own built-in application programming interfaces (APIs) such as a user interface API 40 and a communications API 42, enabling the information transport component 14's user interface and communications modules respectively, readily to be incorporated with, or plugged into a wide range of containing information products 12. Such incorporation, in the currently best known embodiment of the invention, is effected by software engineers familiar with and having access to the containing information product 12, but future developments may enable the incorporation process to be effected by skilled users.

References herein to an applications programming interface (API) will be understood to embrace any program interconnection technique which supports direct, seamless interaction between one program and another, including procedural calls, object encapsulation, or emerging techniques like Microsoft Corp.'s Object Linking and Embedding (OLE) or Apple Computer's Open Doc.

API 40 is responsible for providing means for the user to interact with the information transport functions of the invention and interface as seen by the user and API 42 is responsible for handling internal processes of communications and data management.

The APIs 40 and 42 are intended to enable the information transport component 14 to be used by a range of product programs controlling a variety of information products and to enable each API 40 and 42 to be free to exercise flexibility and creativity in extending its associated user interface 28, data management module 30 and database structure 32 to fully address the provision of transport functions for the purposes described herein.

API 42 operates on a transport function level involving high level interactions between the containing product 12 or the user (or the optional user interface) and the transporter 14 before and after communications while the detailed low-level interactions between the transporter client and the server during communications are handled by fetch-send protocol 38, without involvement of the containing product 12 or the user. "High level" is used to refer to a level at which software interacts with a user, typically in simple, readily comprehensible, function-oriented, graphic or everyday language terms, while "low-level" refers to a level of detailed procedural interaction with an operating system, or device (modem, port etc.) in obscure program or machine language terms incomprehensible to most users.

Fetch-send protocol 38 is, in the preferred embodiment shown, a component of a novel client-server communications procedure designed to manage the transaction-oriented transmissions required to achieve satisfactory transport of desired server stored information objects, and optionally, central reporting of user information in a predetermined format. Alternatively, one or more existing protocols could be used.

Preferably, the API's 40 and 42 and the fetch-send protocol 38 are structured to use a manifest list to control the exchange of information objects. The manifest list can be provided in fetch-send protocol 38, and can be forwarded to remote server 22 to provide better efficiency, error control, and management of the operation. Alternatively the manifest list may remain resident at the user's station. The manifest is valuable operating at the client station, at the API level, to specify the actions required during a transport session and can in one embodiment comprise a list of send and fetch operations which are individually controlled.

This software mechanism, employing novel communications procedures and applications interfaces that reference an object manifest, provides a new way for performing a wide variety of information exchange functions in a simple, standardized and economical manner.

API Functions:

(1) Product Setup

In preferred embodiments, API 40 and API 42 include a product setup routine of an application-specific configuration, which is used by the publisher or product developer, prior to publication, to establish seamless compatibility between the containing information product 12 and the information transport component 14 for smooth execution of desired transport functions. A completion status code is also specified.

The application-specific configuration posts user and product ID information, as needed to process password or other access code authentication and posts files information, including designation of an application work directory and a transporter work directory for performing the transporter functions of information transport component 14.

Additionally, the application-specific configuration sets up an appropriate decompression (or compression for send objects) technique according to the expected format and condition of fetched information objects 46, which information is pre-coded into communications component 36.

The application-specific configuration established through API 40 selects either a standard user interface, as furnished with information transport component 14, or an application-controlled user interface. Control settings are established for connection problem handling, disk error handling, abort and server condition handling, access denial, unavailability of information object files and any other error situations which may occur during transport.

If desired, optional, advanced controls for scheduled automatic calling can be included in the application-specific configuration used in preparing the containing information product 12 for publication.

Preparation of containing information product 12 and incorporation of information transport component 14 therein, with an application specific configuration, as described is carried out prior to publication to build a customized, ready to run version of the product with automated update capability.

Communications API 42 establishes a product-specific transport method choice list for selection of an appropriate file transfer protocol as between direct dial, data network dial, and other modes of transport. Communications protocols specify necessary connection parameters such as access number and network addressing or other routing information. Optional script choices can provide for different modes of transport.

These product-specific configurations and protocols enable information transport component 14 to be packaged in executable form with containing information product 12, with all necessary product-specific components and settings, including a standard user interface if selected, ready for inclusion in the product package.

If desired, at the option of the information product publisher, a standard user interface may be included. Such an optional standard user interface can have all facilities needed to select transportable objects from a predefined list, perform all user setup functions, and invoke information object transport.

Additional options are standard software that would allow the user to search, view and print the transported objects totally independently of the user interface and database search components of the containing product. Both such options enable a publisher to exploit the inventive transport product for efficiently and economically providing updates without having to make changes to the publisher's containing product, simply by configuring the transporter or information transport component 14 and physically including it, and the optional components, within the containing product.

A standard viewer might handle only ASCII text, but it preferably could provide for other useful formats such as standard word processor, spreadsheet or database formats, or multimedia formats such as video, sound and HTML (hypertext markup language), a format becoming popular on the Internet and which provides the ubiquitous Web pages for the Internet's World Wide Web.

API Functions:
(2) User Setup

Compatibility with the user's system is effected by API 40 establishing a user-specific configuration, and creating or updating the necessary control files.

Parameters established in the user-specific configuration include a setup ID number to permit use of multiple setups, for example, for different transport options, and a product ID number.

The user-specific configuration posts user ID information and a password or other access code authentication and posts files information, including disk and drive designation for work and data directories. Autocall options and a completion status code are also specified.

API 40 provides information for communications module 36, specifying a user communications protocol for the user's hardware, operating system, line configuration, and so on. Thus, for a standard telephone connection, comm port, speed (baud rate), interrupt settings, modem type and control strings, dial prefix, dial 9, pulse or tone, call waiting shut-off, and the like are specified, as appropriate. Additionally, the user communications protocol includes access number and connection parameters, optionally with script selection for routing choices via data networks, and so on.

The resultant user-specific configuration and communications protocols generated through API 40 create a setup ready to call and places it in the designated transporter work area.

A validation procedure checks entries and reports obvious errors in parameter settings.

Preferably, multiple product ID setups are provided to enable multiple information products to use the transporter with an appropriate, compatible transporter version. Preferably also, the user-specific configuration accommodates shared use of the transporter work areas by multiple information product applications resident on the same user's system.

Mechanism of Fetch-Send Protocols 38 (User) and 44 (Server)

User fetch-send protocol 38 working in cooperation with server fetch-send protocol 44 controls the desired information object transport function, calling remote server 22 and exchanging data objects. It performs or supervises communications between the user's system and remote server 22.

Communications module 36 uses a setup ID number specified through API 40 or 42, selects which setup to use for a call, calls remote server 22 using protocol 38, and in a preferred embodiment, sends an object manifest comprising a send object list, a fetch object list or both. Such manifest is created under control of user interface 28 from a pre-existing set of choices supplied with the product or obtained during previous update operations, or both.

Alternatively fetch-send protocol 38 may refer to a pre-existing manifest list stored at the user's station, or may be directed by remote server 22 to select one of multiple pre-existing manifest lists stored at the user's station. As another alternative, although it is convenient and advantageous to transmit the manifest list to the server 22, the relevant status and management information can simply be used locally by communications module 36 and be integrated into the individual fetch and send protocols.

A send object list comprises object action codes specifying the type of server action required, if any, object names, object sizes and response object size, if any. A fetch object list comprises object names, object sizes and an object availability date.

A completed object manifest is employed to convey the status of the transport operation and to provide for additional information transport, if desired. The completed object manifest adds the following to the request object manifest: send object additional information; object acceptance codes returned by server 22; time of acceptance; and a response object name, if called for by the object action code.

For a fetch operation, the completed object manifest adds the following to the request object manifest: fetch object additional information; a fetch confirmation or failure code; the time of completion or failure and a revised availability date if the requested fetch object was unavailable.

If a scheduled update or polling option is present and selected, a scheduling or polling indicator is included, and a completion of processing or import function to call through API 42 is specified.

A completion status code terminates the fetch or send operation and returns control to the information product application or the provided user interface.

Information Transport Using Communications Module 36

Communications module 36 employing the described fetch-send mechanism comprised by cooperating protocols 38 and 44 performs the functions necessary to complete an information transport operation, as described herein, under a variety of circumstances, with tolerance for a common range of error conditions, open drives, inadequate disk space, lost line connections and the like, without losing control of the user's system. Using correct, verified ID, naming and routing information, the information transport operation employing the inventive information transport component 14 is less error-prone than many computer users would be were they effecting the transport operation with conventional technology requiring them to enter routing and storage information and the like, manually.

Communications module 36 verifies that all send objects are as specified, that all fetch objects are scheduled to be available, verifies that sufficient disk space is available for all fetch objects and for compressed transmission copies of all objects, and returns an error report if any of these requirements is not fulfilled.

Communications module 36 performs communications, then returns a completed object manifest, and logs all activity in a transporter log file. If an optional scheduling/polling feature is selected, the communication is deferred until the scheduled time.

These general objectives are achieved by carrying out the following process steps after an application (or optionally a transporter user interface) requests a transport function:
1) Local validation of the request returning a failure code if the request is improperly specified.
2) Compression of all send objects for transmission and placing them in the designated transporter work area.
3) Connection attempts to remote server 22, returning a failure code if necessary. Connections are made via phone line or network. The system handshakes and identifies the call to the server.
4) Presentation of the object manifest, if utilized, for validation and action.
5) On receiving a go-ahead, transport of each send object, logging each as sent, and receipt of object acceptance codes from the server and logs them, when received.
6) Receipt of all fetch objects from the server, placing them in the transporter work area, and logs them as received. Fetch object names may be precise, or generic or alias names may be used to request a latest installment.
7) Receipt and logging of a completed object manifest from the server. (If receipt of response objects is implied by the action codes, first receives a revised object manifest, and fetches the response objects, then receives the completed object manifest.)
8) Disconnection from server.
9) Decompression and unpacking of all fetch objects into application work area, and logs completion status.
10) Returns control to the application (or optional transporter user interface).

The product checks the completion code, and completed object manifest to deal with any error conditions. The application performs any required import processing on fetched objects to integrate the data and indexes with prior data, as desired, to enable seamless use. If desired, import processing can include, or offer as a user selection, file maintenance functions relevant to the information product including, for example, file purging to remove obsolete information files and preserve the user's storage space. Specifications of files to be deleted can be included with the original product or with a fetch object. In either event the responsibility for accurate specification is passed to the vendor, relieving the user of the risk of making erroneous deletions and anxiety attendant thereon. After such import processing the containing information product (or the optional separate user interface) then returns control to the user for use of the received data.

Those skilled in the art will appreciate that the identification of files in the object manifest, or for file maintenance functions as the user station, or for any other purpose of the invention, can be effected generically, for example by using wild card characters, as is customary in file specification, and which effectively permits multiple objects to be specified as a class related by file name characteristics, or related individually, thereby providing options for specifying of such class of multiple objects to proceed at one time or in a series of transports over time. Other algebraical identification methods can be used which may reference object versions in series or comparable characteristics.

Figure 2:
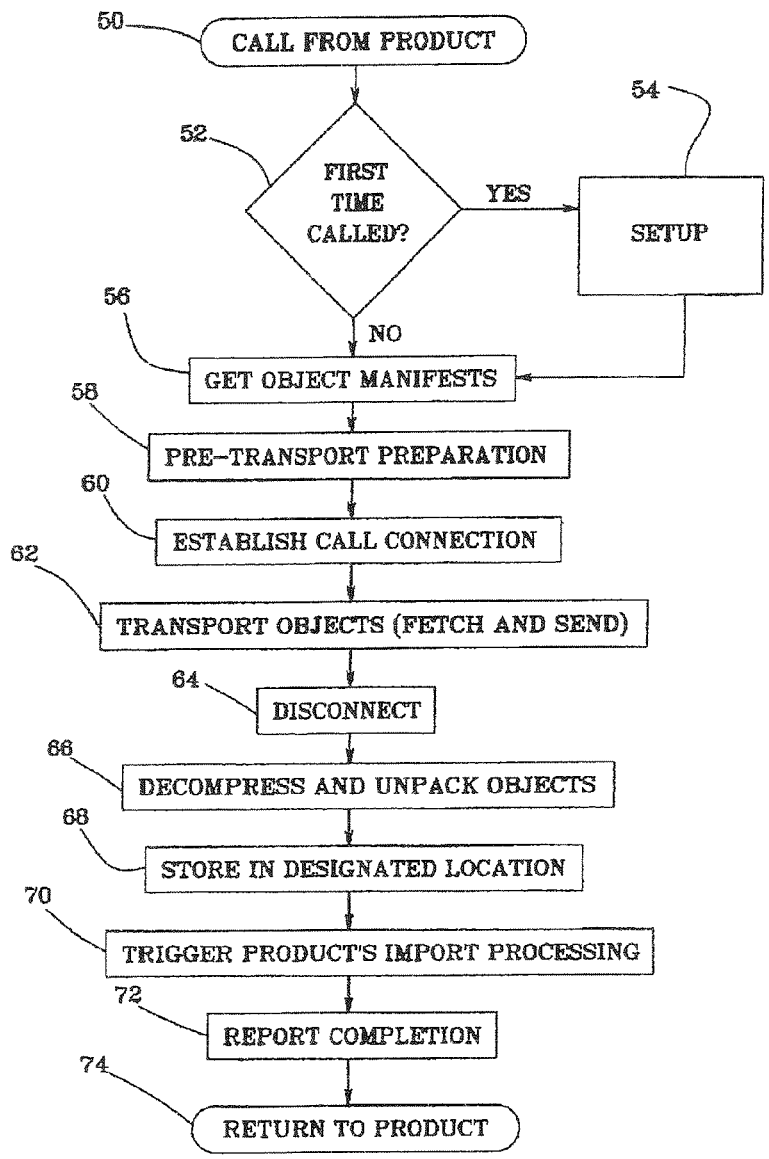
FIG. 2 is a flow chart of an information transport operation performed by the software component and module of the embodiment of FIG. 1.

The foregoing steps are illustrated in the flow block diagram of FIG. 2. When containing information product 12 issues an information transport call 50,51, setup filter 52 runs setup routine 54 if this is a first call and no information transport setup was run on installation of containing information product 12. At block 56, an object manifest is retrieved for pre-transport preparation at block 58. After prepping, a call to server 22 is established at block 60 and when the connection is made, and a handshake performed, one or more objects is transported at block 62.

After completion of transport and receipt of a completion manifest, server 22 is disconnected at block 64, received objects are decompressed and unpacked at block 66 and stored in a designated disk storage location at block 68. Object storage triggers containing information product 12's import processing to assimilate the information update with the original information product at block 70, following which a completion report is issued at 72 and control is returned to the containing information product 12 at 74.

Optional Schedule Function

An optional transport function module for scheduled or poll-responsive information object transport can be provided to defer the fetching of an update or to defer another information transport operation to a specified later time, or until called by the server.

The optional transport function schedules a request, waits, then automatically performs the transport operation at the scheduled time. In polling mode, it activates (and, if necessary, interrupts and then reactivates) the user station's ability to receive calls.

Mechanics of the optional transport function include a request for an ID number, an indicator for calling or polling mode and a schedule iterating a call time, a retry protocol, call activation and timing, along with an authentication procedure for the server and a completion status code.

Client-Server Communications Protocol

Communications between the information transport component 14, functioning as a client, and the server 22 follow a predefined communications procedure having cooperative user components comprising user fetch-send protocol 38 and server fetch-send protocol 44.

Server-client intercommunication can be broken down into five steps, a) login, b) manifest transmission, c) send operation, d) fetch operation and e) logout, as described in more detail below.

a) Login

Login establishes a session with an authorized client. A handshake process between user protocol 38 and server protocol 44 identifies the user's transporter client system to remote server 22 by product ID and user ID, and a password or other authentication code. A failure reason code is given to rejected clients.

b) Manifest Transmission

Preferably, via user protocol 38, the user system issues an information object transport request manifest to server 22. Server 22 verifies its ability to meet the request by returning a manifest acknowledgment specifying which elements will be processed and provides reason codes for declined elements. Alternatively, as stated previously, manifest functions can be listed in individual send and fetch protocols.

c) Send Operation

If the user system outputs a send object, through information transport component 14 and protocol 38, server 22 receives and accepts the send objects and stores them, identified by product ID and user ID. Error control and retry mechanisms are employed and successful receipt of the send object is acknowledged and logged.

If the action code calls for a response object, the server obtains necessary processing from a pre-designated external source (corresponding to the product ID and action code) and returns the response as a fetch object, called a response object.

d) Fetch Operation

The server obtains requested fetch objects by product ID and object name and forwards them to the transporter at the user. Error control and retry mechanisms are employed and successful transmissions are acknowledged and logged.

e) Logout

The server transmits the completed object manifest to the transporter, confirms and logs receipt, and ends the session.

The Inventive Transporter Compared with a Conventional Communications Product

Figure 5:
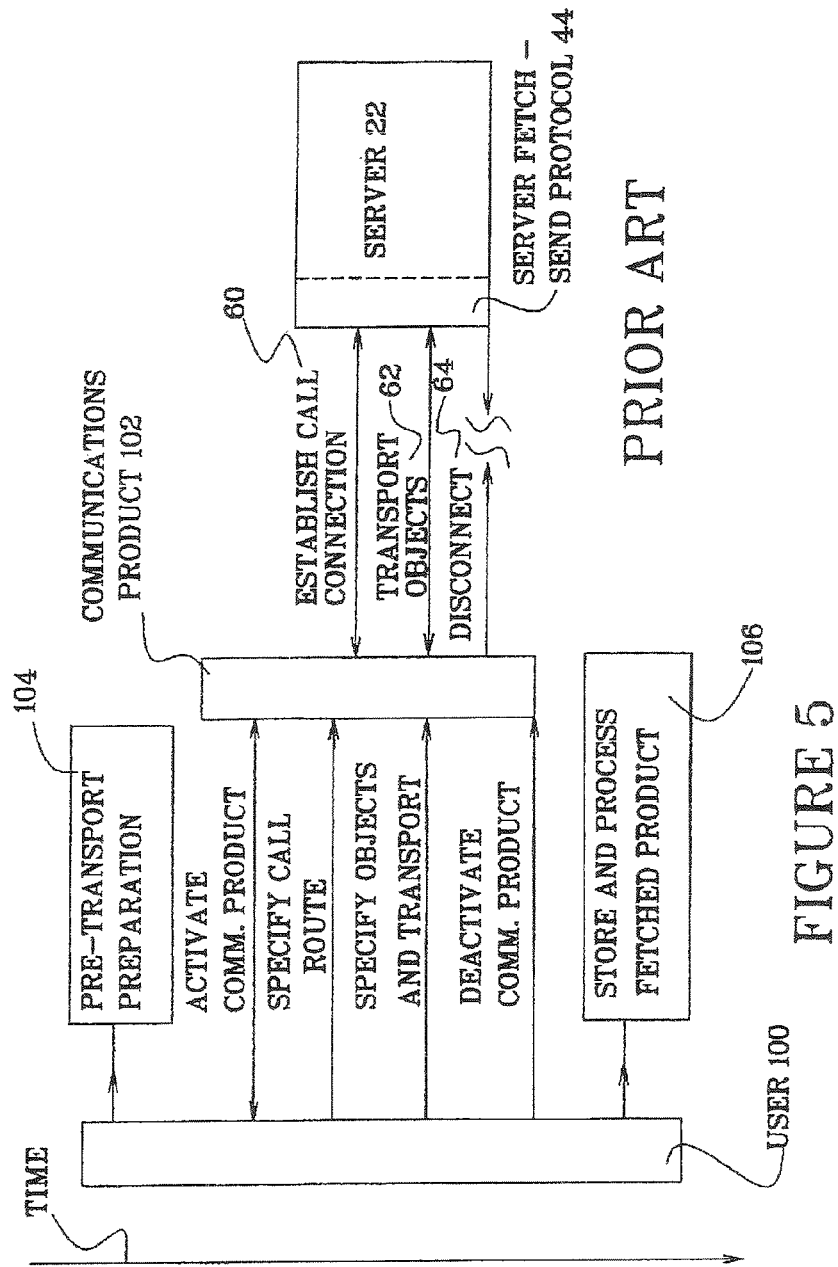
FIG. 5 is a schematic diagram of a conventional communications product employed to transport an information object between a user and a remote server.
Figure 6:
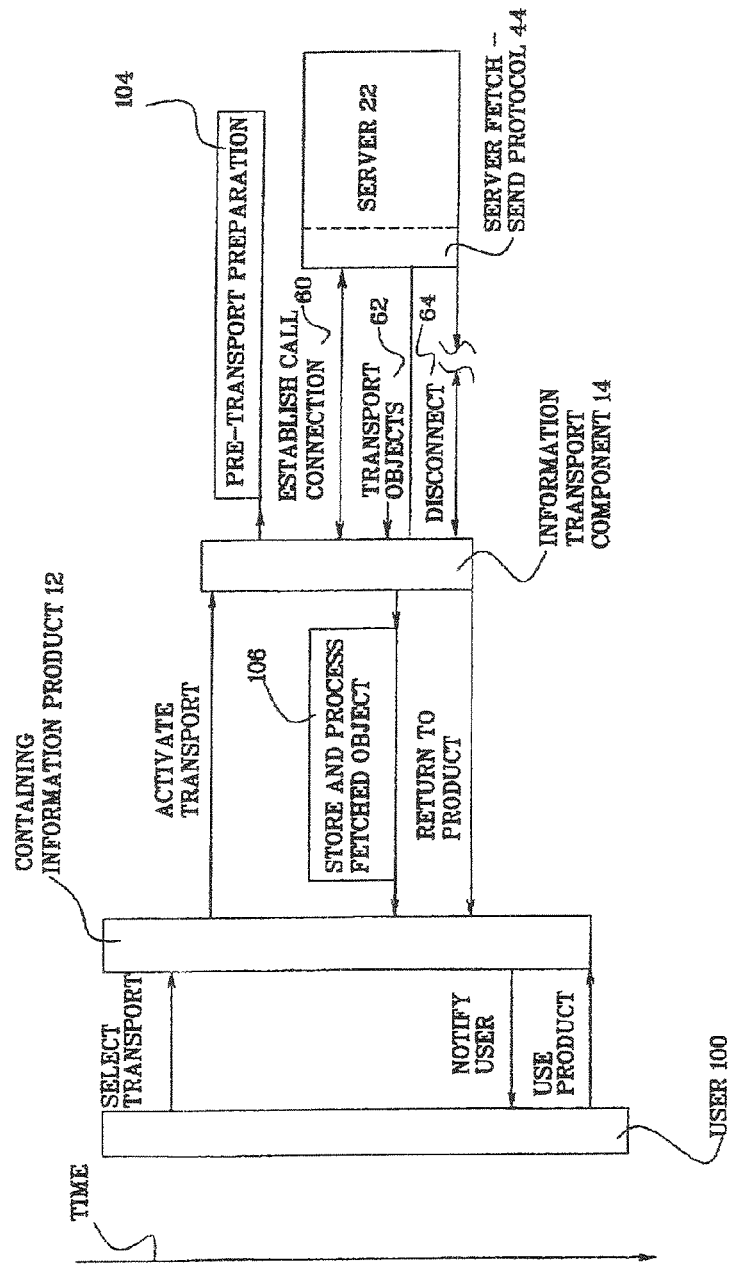
FIG. 6 is a schematic diagram similar to FIG. 5 showing, in a comparative manner, some of the benefits that can flow to a user when an information transport software component, such as that described with reference to FIG. 1, is used for a similar transport operation.

FIGS. 5 and 6 illustrate schematically the simplicity and ease-of-use benefits the invention provides FIG. 6 to a user 100 in fetching an information object from a remote server 22 as compared with the use of a conventional communications product (FIG. 5), such, for example, as CENTRAL POINT COMMUTE (trademark) or PROCOM (trademark).

In the prior art embodiment of FIG. 5, many operations require active participation by the user who, for example, must at least initiate any pre-transport preparation 104 of the information object, such as checking the specifications, checking work space available to store a fetched object and conducting any other preliminary checks. The user has to activate a communications product 102, specify a call route, and after the call connection is established, specify the objects and initiate a transport operation. Communications product 102, operating in a cooperative manner with remote server 22, will execute establish call connection 60 after the call route (phone number) has been specified and will execute transport objects 62 after the objects to be transported are specified by the user. Disconnection 64 is usually effected by a user executing a call termination command, which if the user is inattentive, or inefficient, may be delayed longer than necessary to complete the transport operation, running up unnecessary line or air time charges.

After completion of the transport operations, user 100 has to deactivate the communications product 102 and then initiate any required storing and processing of the fetched product 106. While some of these steps may be automated via one or more batch files, scripts or macros, a vendor of a containing information product 12 has great difficulty in furnishing such a batch file or macro for a mass market distribution because of the different systems and communications products encountered in a mass market, which systems and products have a variety of different specifications, performance characteristics and unique, incompatible scripting languages.

Equally, while some more skilled users 100 might be able to write their own batch files without undue difficulty to automate some of these steps. Many users will lack the ability or the inclination to do so. Also the effort would not be justified for a single transport operation. Nor is the result of such efforts likely to match the ease and simplicity of the results achieved by the present invention which enables even a first update to be obtained effortlessly with the software running in unattended mode, after initiation.

FIG. 6 clearly shows how the inventive information transport component 14 relieves user 100 of many tedious communication functions such as activating a communications product, specifying a call route, specifying the objects to be transported and deactivating the communications product. In addition, preferred embodiments of the invention also relieve the user of optional pre-transport preparation 104 and execution of store-and-process-fetched-product 106 if these functions are appropriate to the containing information product.

Referring to FIG. 6, user 100 selects a transport operation from a user interface screen in containing information product 12, whereupon the latter calls information transport component 14 to activate transport. Information transport component 14 implements any necessary pre-transport preparation 104 and then, employing its own communications module 36, and server fetch-send protocol 44, proceeds in unattended mode, without requiring user intervention to establish call connection 60, to execute transport object 62 and automatically perform a disconnect 64, as described herein.

Automatic transport control and disconnection is a useful feature of the invention providing economy of line or air time charges and reducing congestion on the communications carrier. Using conventional communications products, (especially with online services) the duration of the connection may be unnecessarily extended by the delays and potential errors inherent in user control, resulting in increased communications costs and failures. The inventive transporter 14 provides software control of the connection duration, enabling it to be confined to a period sufficient to effect said unattended object transfer, enhancing efficient use of the communications medium.

Also as described, the operation can be monitored or controlled by employing an object manifest and is facilitated by the use of pre-specified addresses and transport characteristics. After satisfactorily completing the transport, the information transport component 14 automatically deactivates and returns control to containing information product 12, preferably with a satisfactory completion report which containing information product 12 notifies to user 100 through the containing information product 12 user interface.

If the transport object 62 was a product update, optionally a store-and-process-of-fetched-object 106 is initiated by information transport component 14 and execution of the store and process operation may be passed to the containing information product 12. The user can now use the updated product.

As FIG. 6 shows, when read, in comparison with FIG. 5, the invention enables a user 100 to be relieved of all duties save for minimal selection and notification functions, while no complex added functionality is demanded of containing information product 12. Optional store-and-process-or processor-fetched-object 106 is contemplated as requiring only minimal modification of existing containing information product 12 functions while other more complex procedural and detailed transport related functions are handled by the information transport component 14.

Some non-limiting examples illustrative of practical commercial and industrial applications of the invention will now be described.

EXAMPLE 1

A News Magazine Distributed on CD-ROM

Some weekly news magazines offer subscriptions to a quarterly CD-ROM which contains multimedia material plus a searchable full-text database of the most recent quarter's weekly magazine issues and enabling application software. Newer issues are not provided until the next quarterly disc is mailed. Accordingly the CD-ROM electronic magazine product steadily becomes out of date and its value lessens.

The invention incorporates an information transport component 14 with a news magazine product stored on a CD-ROM 16, to enable a user to fetch an information object 46 in the form of new issues (and their associated search indexes) from a remote server 22, as they become available, for example weekly. The fetched updates are stored on a consumer's computer hard disk storage device 24. Because of the size of rich content multimedia files, the updates are limited to text material including full texts of interim issues and associated files such as indexes. Because it knows the storage location of the updates, the next CD-ROM issue can include, as an install option, or upon first access, a request to delete the old now-outdated updates from hard disk 24, creating space for new updates.

User interface 28 in conjunction with user interface 34 contains code providing a menu selection enabling a user to activate the update fetch operation and then to provide integrated or seamless access to the combined data, searching both the hard disk storage device 24 and the CD, using both sets of indexes, so that the contents are viewable as a single collection, although an additional independent searching/viewing function for the updates could be provided, if desired.

A product setup routine adapts the information transport component 14 to work with the news magazine CD-ROM's existing software for creation of a user interface, searching and viewing. Communications options may be limited to direct telephone dial only. A simple user interface addition controls a setup process allowing the user to enter a unique user ID, provided with each copy of the CD-ROM distribution disk, and to create predetermined work areas on the user's hard disk.

A schedule of updates with names, dates, and files sizes is provided in the containing news magazine product on the CD-ROM and is accessed via user interface 28 in conjunction with user interface 34 to create a fetch object manifest 48.

Optionally, user interface 28 in conjunction with user interface 34 creates a send object manifest 48 to control transport of user demographics for market analysis or for renewals, or the like, in the opposite direction from the user to the server, with the send operation being triggered whenever the next transport operation is activated, or optionally, by allowing by allowing the user to trigger it.

A fetched information object 46, such as an update, is automatically decompressed and stored on hard disk storage device 18 as additional information object 26 for integration with the original CD-ROM product so that the user can view both the update and the original issues, and run searches across the entire collection.

Optionally, initial location of additional information object 26 may be an application work area location on storage device 18, and communications component 36 may be pre-set to pass control via API 42 to database management module 30 which will do further processing to integrate additional objects in accordance with the existing database structure 32 to provide a more complete level of integration permitting, for example, viewing of combined menus, nullification of obsoleted items, and cross-linking of hypertext elements.

If a send object has been prepared and included in the object manifest, such as a send object containing user information entered during the install process, or subscription request information obtained from the user, it is sent to server 22 to be stored and identified by product and user ID for appropriate action in due course. Acknowledgment of receipt of the send object is noted by communications component 36 and passed back to the user if such provision is made in user interface 28.

Both the fetch and send operations are closed ended in the sense of being operations that are pre-described in the original information product and once triggered, can be completed without human intervention of any kind To service the automated update facility running at the user's workstation, remote server 22 is set up to accept calls from valid user ID's, and is loaded with new issue text and index files, in the form of update information object 46, according to a publication schedule.

EXAMPLE 2

Open Ended Fetch of a Supplementary News Magazine Object

Open-ended access to supplemental information objects not described in the original information product can be obtained by providing in the original product means to fetch a directory of added features. This can be used, for example, by a news magazine publisher to provide special news features on an unplanned basis, or each weekly issue could be packaged with a directory of additional features available. The user first specifies a fetch of the new directory, or receives it along with a fetched update they have specified from a user interface menu, and then views the fetched additional features directory and initiates a fetch of a selected additional item or items in a second information object transport operation, using an information object manifest built from the new features directory.

The original, containing product news magazine CD-ROM user interface 28 preferably has provision for importing and viewing any information objects listed on a completed fetch manifest and delivered by the information transport component 14 into the designated work areas. Alternatively, a standard information transport component 14 user interface 34 can be used to provide this function in a less integrated form.

EXAMPLE 3

Retail Catalog on CD-ROM with Merchandise Order Entry at the Server

Multimedia product catalogs with 800 ordering numbers are now available on CD-ROM and also with pre-installed software packages on new computer hard disks. In this example, the multimedia (or text and graphic) product catalog is a read-only information product 17 which can be furnished with an information transport component 14 according to the invention, to facilitate order placement from such electronic product catalogs providing an easier order placing process than has heretofore been possible. Employing the inventive information transport component 14, a catalog vendor can enable a customer to place the order directly, via modem, without requiring a voice call and ensuing verbal product identification, by pointing and clicking a "Place Order" or "Mark for Order" button on the user's computer screen. The order is transported to remote server 22 using the novel information transport component 14. Preferably a verification routine is included, requiring order confirmation with a user-supplied password, and possibly keying of the total amount to prevent unauthorized or inadvertent product ordering, for example by children.

Order fulfillment is effected by processing of the information in due course after receipt by the remote server 22 and any additional information required centrally is collected during product setup and held locally for transmission with an order. For example, setup can capture the user's charge card information, shipping address, and the like and create a header for an electronic order form.

When the user clicks the "Mark Order" button, procedures supplied with the user interface 28, as modified through user interface API 40, add order item identification information to an electronic order form. When the user clicks the "Place Order" button, user interface 28 triggers a transport request to server 22, to include the order form as a send information object 46. Transport of the send object, including the order form, from the user's station to the server is executed employing an object manifest 48, as described herein.

If not located at a vendor's or merchant's premises, server 22 can forward received electronic orders to the merchant for fulfillment, at appropriate intervals, via a vendor link 50.

This simple, low cost mechanism for automated order placement, can complement telephone ordering but lacks the credit-checking and inventory status capabilities that are frequently provided by phone. However, such a catalog application could allow the user to request the fetching of an inventory and price update object for use prior to the preparation of an order.

EXAMPLE 4

Merchandise Order Processing and Confirmation Retail Catalog on CD-ROM

A powerful electronic merchandising tool can be provided by providing the user with a full-function order generating capability and employing transporter 14 to transmit a user-created merchandise order, effortlessly and seamlessly, to a remote order-processing server. To this end, server 22 should be interfaced to the necessary merchant processing services for checking and reporting credit and inventory status.

An additional valuable option enables the system to apply pre-specified user instructions, previously obtained through user interface 28, to determine whether out-of-stock items are to be dropped, back-ordered, or substituted in color or other aspect. This information can be added to the electronic order form object, listed in object manifest 48 and become the subject of a further transport dialog between the user's station and server 22. In this manner a sophisticated purchase transaction is completed in a substantially unattended manner (save for deciding about back orders off-line), in as much as the customer does not have to maintain a phone conversation, while fully achieving the capabilities of telephone order placement. A further user benefit can be obtained by the providing a permanent record of the transaction (a stored electronic file) without user intervention. This not possible with telephone ordering.

This novel, automated, modem driven, order placement system effectively shields a merchant from having to deal with the problems of establishing communications with a mass of unknown end user computer systems, while automating the process and relieving the merchant of the costs of telephone sales staff. This aspect of the invention is valuable in avoiding troublesome, support intensive, communications which are subject to rapid technical change as new products are absorbed into the marketplace. In contrast, the merchant's special purpose vendor link 50 to the server 22, can remain relatively stable, while the customer interface at server 22, depending upon the sophistication and universality of the API's 40 and 42, and also upon any emergent communications standards, can be adapted to accommodate a range of future products.

EXAMPLE 5

Further Applications of the Invention: Locked Information Products

As discussed in the "BACKGROUND OF THE INVENTION" hereinabove, some vendors, for example Microsoft Corporation, distribute information products in locked, inaccessible form, accompanied by (user-accessible) promotional information and demo versions. The prospective purchaser then calls an 800 number to order the product and is given a code which is entered to unlock the item for use. The inventive information transport component 14 and cooperative server component 22, can be used to simplify this process, and eliminate the voice call.

The information transport component 14 is used to place the order and as a subsequent step concomitant with satisfaction of the merchants purchase requirements (payment, etc.) can, employing a suitable line entry or entries in the object manifest 48, fetch the access code, as an information object 46, in the same way as an order acknowledgment or other information update. The user interface and data management components of the distribution CD, or original information product, can be programmed automatically to use the code to unlock the product.

Employing the novel, digital, modem-enabled communications products of the invention, more sophisticated access codes than are suitable for verbalizing to a caller, can be used, and may include small programs or decompression utilities (although these would better be stored in the locked product), or customer-specific coding employing user-derived information. Thus, as a safeguard against fraud, being equipped with specific user or user product information, the access code can be a key or product uniquely matched to the user's locked product copy.

Computer Software Updates: For distribution of updates to software products, the original distribution version of the software product can provide registered users with an appropriate ID code and update schedule. Should the revision be delayed, a revised schedule can be fetched.

Tax or other governmental filings and exchanges: An example of the generality of the inventive information transport system for sending and fetching well-defined information objects of many kinds is in the filing of tax returns. A send information object can be created and manifested to submit electronic tax filings to the IRS, as described above, for electronic product order forms. A fetch object can be created to obtain updated tax forms and the program logic relating to them, and to get information on new regulations. Analogous uses will be apparent to those skilled in the relevant arts of, for example, financial planning and portfolio management systems, to obtain current statistics, place orders, and the like.

Packaging of Transporter with User Interface/Database Search Software Facilities In a modified embodiment, the inventive information transport component 14 is integrated with a general purpose user interface/database search (UI/DB) software package and tools. Such packages and tools, sometimes referred to as "authoring packages", are now used to produce CD-ROM's and similar information products. Thus a single UI/DB product may contain the inventive information transport component 14, and be supplied to publishers to be used to develop a family or diversity of information products, as a standard tool box.

A combination of the inventive information transporter product with such UI/DB products could facilitate development of applications by allowing much of the work of integrating a containing product's user interface 28 and database functions 30 and 32 (which could be controlled through the UI/DB product) with the inventive information transport component 14 to be performed once, in advance, by a UI/DB software vendor's skilled specialists, for use in a diverse range of products using that vendor's software. Such integrated offering would be advantageous to both the software vendor (by enriching its offering) and to the software vendor's publisher-customers by facilitating the desired function.

Electronic Product Distribution Service

In a valuable application of the novel electronic information transport products of the invention, remote server 22 can be operated to provide an electronic data product distribution service for multiple containing information products 12, each equipped with an information transport component 14, the whole facility providing a complete network distribution service, including network, technical and end-user support. Provision of such a distribution service is greatly facilitated by the novel transporter 14, described herein, the use of which for each vended product greatly simplifies the problems of handling updates to multiple products. However, such a novel service could also be operated with conventional software communications products by relying upon users of each to execute an appropriate sequence of menu selection and command line instructions to obtain an update by modem via their own pre-existing communications software. Similarly, While special advantages of seamless user adoption and integration into an original product accrue from the use of the inventive transporter to distribute product updates, such a distribution service can be used with advantage to distribute any type of electronic information product.

For many publishers (and for providers of UI/DB authoring software) the task of operating a publicly available server 22, and of supplying associated technical support to a wide base of customers using a diversity of communications products, even with the simplification benefits provided by the inventive transport product, is a task requiring specialized skills and staffing that a publisher, even one experienced in electronic publishing, will generally lack. Such a specialist capability is intimidating to provide and difficult to cost-justify for the limited number of information products that one publisher can supply.

By providing a new turnkey service or service bureau a specializing, skilled vendor would enable the publisher to avoid such burden. A provider of such a novel service can spread the costs of such operational activities and skilled staff across a large number of publishers and information products, achieving economies of scale and specialization.

The inventive information transport products extend to software implemented at server 22, or at one or more clients or satellite servers, of a network served by server 22, to provide the server-location functions of such an electronic product distribution service. Such distribution software can be separately marketed to publishers or UI/DB vendors who wish to operate such a service.

Gatewayed, "Open" Server

Example 4, above, shows how information transporter 14, as well as server 22 can remain simple yet provide a highly general and extensible service. In that example, server 22 provides the functionality of a general-purpose transaction gateway or interface to an external function processor. In this particular case, the external function processor gatewayed by server 22 via vendor link 50, is the merchant's order processing system, which receives the order, determines its disposition, and responds with order status information which is relayed back to server 22 for return to the customer as a response object in accord with protocols 38 and 44. The user need not be aware of such complexities, nor do the client transport components 14 of the inventive product need to be aware of, or provide information for remote routing via vendor link 50. Only the server 22 needs this information, and server 22 needs only to know that send objects with names that fall within a specified class for a specified product ID, must be forwarded to a specified external processor, and that the corresponding responses from that processor must be routed back to an originating client as response objects. Thus the inventive information transport component 14, by virtue of its simplicity has general applicability and many uses, as described herein and as will further be apparent to those skilled in the art.

In implementing an ordering service using the inventive information transport component 14, order and response objects are preferably formatted by the containing information product 12 to be consistent with existing or future electronic data interchange (EDI) standards which define protocols and formats for data interchange between customers and vendors. The information transport component 14 and the server protocol 44 provide the low-level EDI transport functions and are independent of object content defined by higher layers of the EDI protocol. Preferably, the server has added routing layer information to move objects to and from the external processor.

To provide a suitable EDI-compatible function, server 22 can be programmed with such higher layer EDI routing data for its exchanges with the merchant's external processor. Employing such a gatewayed system, a single EDI network connection can be used to connect the server 22 to a large number of different merchant processors anywhere in the world, across wide area networks and links between same, for example Internet.

This concept of an "open" server, providing a gatewayed pathway for information objects to travel between a wide base of users and one or more remote vendors or other object sources is greatly facilitated, or enabled, by employment of the inventive transporter 14 which effectively provides a protocol translation function enabling a simple information transport service to be offered which is easy and economical to use, both for the end user and the vendor or information supplier. Such a transport service compares favorably, for its intended information transport purposes with broader function and more complex of full online services, such as COMPUSERVE (trademark), and the like, described hereinabove.

Further Embodiments with Broadcast, Subscription Delivery and On-Demand Capabilities Receipt of broadcast data: As an alternative to modem-based wireline or wireless calling to a server and requesting data objects, the information transporter system of this invention can be beneficially employed in a broadcast information distribution system wherein data information objects are contained within a broadcast data stream with recipient communications devices tuned to identify and receive from the broadcast specific data elements to which they are entitled. On the Internet, such broadcasting to a selected group of recipients is called "multicasting."

Broadcasting can be airwave broadcasting via satellite, FM, or TV subchannels in the manner, for example, used by Mainstream Data Ltd. for the broadcast of news wires. Alternatively, the broadcast data stream may be cable or line transmitted, for example, over cable television systems. Minor extensions to API's 40 and 42 could accommodate such a facility. A modified setup function could alert a user's receiving communications device to watch for receipt of data objects identified as relating to the original or containing information product, and to capture and hold identified objects in temporary storage. A schedule transport function can then be set to fetch the received data objects from temporary storage and prepare them for use.

Subscription delivery: Although the invention has been described as being particularly applicable to the solution of problems arising in distributing updates of original or previously purchased or delivered electronic information products, those skilled in the art will appreciate that, many of the benefits of the invention can be obtained, without any initial information content being delivered to the user, with the original product. The user could simply receive the information transporter 14 and all product information could be received subsequently, after installing the information transporter 14, in the form of fetch objects transmitted from a remote server or other suitable source. For example, a newsletter service could provide a disk with the transporter and a user interface, but with no initial information content. As the transporter 14, operating at the user stations, automatically fetches new issues according to the newsletter schedule, the information is, in effect, pushed down a channel from the distribution server for delivery to the base of subscribing users.

Information-on-demand services: In another embodiment, providing an information product on demand service, vendors can freely distribute a novel electronic marketing product comprising a transporter on diskette, along with a simple user interface and a catalog of information product items available from the vendor, without including the products themselves. Such an electronic marketing product could be distributed through the mail, as a magazine insert giveaway, on or through any other suitable marketing medium. The transporter could be activated at any time by the user to call in and fetch a cataloged product, as well as a current catalog, possibly after sending a credit card order form, or the product price could be paid to the vendor by obtaining the product from a 900 number providing vendor reimbursement from the telephone network.

Open Architecture Online Service Access

In a further aspect, the invention provides an information transport component 14 that functions as universal or generic client interface software, enabling a user client to work with any one or more of many online server-based information distribution services.

Many online information distribution services used to disseminate electronic publications comprise intelligent user interfaces which employ a client component running on a customer's personal computer (PC) to communicate with a central server facility operated by the online service, by means of a proprietary protocol. The client interface packages are proprietary to a particular online service.

Prospective publishers wishing to offer electronic products online, contract with online service providers to enable customers to use the online service's client software to access the publisher's material and related online communications services (bulletin boards, etc.) on the services' servers. The publisher is limited to using the presentation facilities provided by the user interface in the online service's client software. This limitation impedes migration of publisher offerings and makes it difficult for either a customer or a publisher to swing information transport component 14 access from one service provider to another because each service requires its own software package.

Third party interface developers cannot contribute to such online interfaces for a publisher without the cooperation of the online service provider which may be difficult or impossible to obtain. Accordingly, only limited user interfaces with moderate sophistication and variety can be offered.

Accordingly in another aspect, to provide open architecture online service communication, the inventive information transport component 14 can be embodied as a flexible client interface which can be actuated to operate with any one of a number of online services by providing a generic client interface foundation API (application program interface) combined with a set of translators and protocol drivers capable of communicating the user's functional requests to any one of a set of online services, using their corresponding proprietary protocols.

In this aspect the invention permits publishers to develop highly sophisticated and individualized user interfaces independently of the limitations of the online service providers' capabilities. Such enhanced user interfaces are attractive to publishers seeking differentiation of their products by providing an appealing individualized interface with a signature look and feel. In contrast, online service providers seeking to economically carry content from many publishers provide generic interfaces acceptable to all.

By incorporating operational translators for a number of online service protocols, which translators fully adhere to the detailed specifications of each protocol, a multi-service capability can be provided.

Online services generally provide similar types of services with nearly standard functions and similar user interfaces. Major service types include bulletin board, chat, electronic mail, document browsing, and database search. Use of creative typography, layout, graphics, and other artistic elements to offer the presentation quality and variety typical of print media is desired by publishers using this medium.

The invention facilitates this end by providing open development platforms for development of advanced interfaces while shielding developers from the complex details of communication with an online server. The shielding is accomplished by providing an API which supports communications service requests at a simple functional request level.

Figure 3:
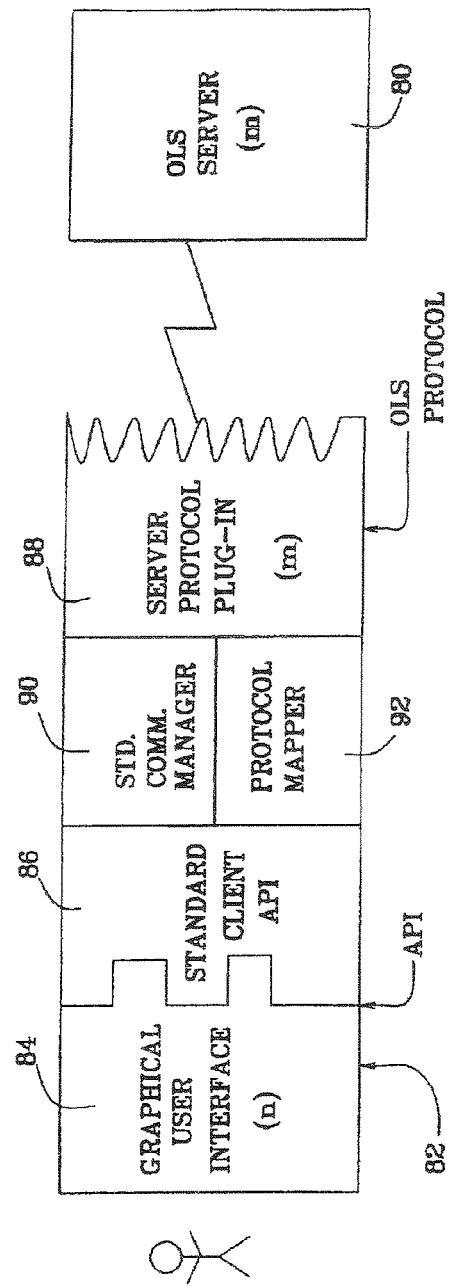
FIG. 3 is a schematic diagram of a server-based electronic distribution service employing an information transport software component.

Referring to FIG. 3, multiple targeted online services 80, can be accessed by a client interface 82 comprising any of multiple graphical user interfaces 84 driving a generic API 86 which works with plug-in translator/communicator modules 88 which are provided to communicate one to each targeted online service 80. Modules 88 mimic the online service's protocols, so as to be essentially indistinguishable from the proprietary interfaces normally used. A communications manager 90 receives input from API 86 and outputs through protocol mapper 92 which selects the appropriate protocol.

In this embodiment, for use with full-function online services, the functions of API 86 and protocol 88 are extended to support extended, open-ended interactive sessions and the more varied client-server interaction needs of session-oriented interactive online applications such as bulletin board posting and browsing, online chat, electronic mail, database and menu browsing, and database search.

Similarly, in the aspect shown in FIG. 3, the invention can be provided with the same kind of additional flexibility with regard to the user's connection to server 22 as the invention can provide for more basic fetch and send functions. While the inventive client server protocol 38 and 44 is particularly suited to the functions described, other existing or future services and corresponding protocols could be used, if necessary with adaptation, to provide workable services for use in conjunction with transport component 14. Such use may require modification of communications module 36 and protocol 38 by the addition of a protocol mapper 92 and appropriate server protocol plug-in 88 to communicate to an alternative server.

In either case, such added flexibility in use of the inventive product increases a publisher's choices in selecting server and network facilities through which to distribute information products, and enables the publisher to offer fully customized user interfaces for use with multiple, or any one of multiple server and network services which do not provide for such customization. In this embodiment of the inventive transport component, a containing product can offer a unique custom interface and provide for access to additional information products from such varied source facilities as the Internet, full function online services, emerging groupware network services, conventional bulletin board systems, and future network services using wireless or cable television technology.

While the invention can provide a flexible, generic API, in some circumstances, an existing third-party API designed for use with a single specific online service can be combined with an embedded transporter and server protocol mapper to allow products designed to use the third-party API to employ any of multiple servers for distribution, avoiding commercial distribution restraints associated with that API, for example use of a particular server.

The inventive protocol mapper 92 can insulate a containing information product from the variations among such services, and can allow a single such information product to be transported through a variety of such services, and to later be moved to other such services by simply selecting an alternative protocol mapper. Multiple such protocol mappers can be packaged within a given information product to permit alternatives to be selected by the end-user from a list. Thus the invention further permits information products and related UI/DB authoring tools to be service-independent and neutral.

Figure 4:
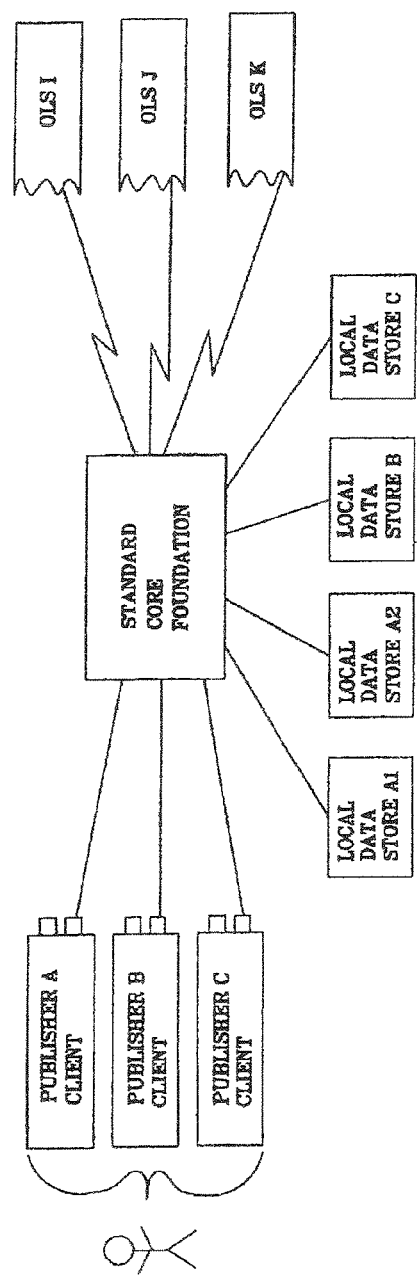
FIG. 4 is a further schematic diagram of the service illustrated in FIG. 3.

FIG. 4 provides an overview of the use of the inventive client interface accessing multiple publications via multiple remote online services, as well as multiple locally mounted data sources and storing additional retrieved data locally.

Enhancements can enable a publisher's service to provide integrated, seamless access to content distributed over several different online services; to seamlessly combine access to both online and local CD-ROM-based content; and to coexist with and share resources with other publishers' services on the user's PC.

In summary, the invention provides, in this aspect, a simple, easy-to-use multi-protocol capability that enables an electronic information object to be transported from a publisher to a wide base of users by any one of a number of online services, without sacrificing individual product identity.

Recursive Updating of the Transporter

Another application of the inventive information transport product, or transporter, is a recursive use to update itself, in the same manner that the transporter can update a containing information product. This method can be useful in a variety of ways, including to upgrade the transporter by the addition of new protocol components, new compression techniques, or new network access methods.

An important class of such self-updates is to provide added flexibility in specifying network access procedures. For example, the user setup routine could be extended into a two stage process. In a first stage, each user's transporter calls in to a common pre-set phone number, in order to fetch a second phone number selected according to the user's particular product, location, or some other parameter. The second phone number, or other address, can then placed in the setup as an update, to be used in subsequent transport operations.

This two-stage method can provide efficient use of a single pre-set toll-free 800 number for an initial call from any number of different products, which initial call yields a second number corresponding to a specific Product ID, which number is used for subsequent calls.

In an advantageous embodiment, the second number is not toll free and may include vendor charges, in the manner of a 900 number. This arrangement enables a system in which users do not pay for initial setup calls (and any failed connections which might result from initial setup problems), but do pay long-distance toll charges, and per call vendor fees if the publisher so desires, for subsequent product information transport from the second number. This two-number process can be carried out without requiring any phone number entry or selection by the user. Additionally, the second number can readily be changed whenever desired by the publisher, even after product discs have been shipped.

User's Station

References herein to a user's station, workstation, computer or terminal will be understood to embrace any "information appliance" or intelligent device having the basic computer-like functions of programmed logic, storage and presentation, or having the ability to support an operating system for managing user input-output with a processor, including intelligent cable television controllers, video game players, information kiosks, wired and wireless personal communicators, and even system controllers such as automotive computers.

Benefits Provided by the Invention

Employing the novel information transport component 14 interacting with remote server 22 through communications protocols 38 and 44, the invention enables the following advantageous objectives and other benefits to be achieved:

i) simple and easy execution of one or more fetch or send transactions to or from a remote server, by an ordinary, unskilled user with no human interaction at either end being necessary after initiation;

ii) automated transport of predefined information objects between client and server in a closed-ended fashion, without burdening a client-based user with complex routing logic; and iii) creation of an economic, easy-to-use, function-specific, self-contained information transport component 14 software module suitable for mass distribution in a containing information product.

The preferred use of an object manifest in a transport control mechanism which includes transporting the object manifest between client user and server, and referencing the object manifest by user fetch-send protocol 38 and server fetch-send protocol 44 facilitates achievement of the following additional objectives:

iv) simple, tight-knit control of the communication process and of error handling; and v) creation of a transport control mechanism, and thence of an information transport component 14, which operates smoothly and transparently to the user and independently of the information object content or of the nature of the application.

The invention thus provides an information transport software component which can be employed to transport a wide variety of data objects or applications and can be easily incorporated in many different information products to provide multiple novel containing information products 12 with built-in automated updatability or upgradability executable at an appropriate time by simple, user-menu selection or automatically.

Further Benefits

In addition to the benefits of a powerful and efficient information transport method, use of a standard, formalized transporter, its API, and client-server protocol, pursuant to the teachings of the invention disclosed herein, can provide any or all of the following significant benefits to users, information product vendors, application vendors, service providers, tool vendors or others:

vi) use of a standardized facility to perform a well-defined function in a known way (with available implementations for a varied and expanding set of hardware and software platforms);

vii) reliance on a standardized facility that can be extensively tested and proven reliable across a wide variety of equipment and conditions;

viii) reduced need for information product developers (and users, and user interface/database search software vendors) to know and understand the complexities (and rapid evolution) of data communications;

ix) ability to build a single functional interface that can smoothly employ a dynamically expanding variety of communications facilities and technologies;

x) ability to obtain operations and user support services relating to the difficult task of managing a server and its communications with large numbers of end-users;

xi) user-recognition of the novel information transport facility across a range of unrelated products, establishing a positive brand cachet benefiting users and vendors alike;

xii) ability to package the transporter facility with other tools, such as a UI (user interface) and database search capability to extend the value of those tools economically and with the ability to gain the benefits described above; and xiii) control of communications costs and failures by elimination of human intervention, with its attendant time-consuming delays and errors, from the period during which the user's station is connected in real time communication with remote server 22.

Stated succinctly, by having the novel information transport component rely entirely on a containing information product for all user interface and information presentation functions, there need be no restrictions on the creativity of the containing product imposed by the needs of a third party communications product. Thus the containing information product can present transport functions with any desired look and feel.

Another advantage of the information transport system of the invention is the avoidance of difficult or complex navigation tasks, and the use of simple direct dial communications which are suitable for sessions that are short and infrequent. The inventive information transport products described herein are consistent with or readily adaptable to the needs of many publishers of a diversity of materials, which needs are commonly centered on discrete products and content.

A further advantage of the invention, from the point of view of publishers, is that because the call is customer initiated, the customer pays transport costs (telephone line charges), simplifying costing for the publisher who avoids having to figure shipment or other transportation costs before sale and build these costs into the price of the product or update.

The inventive approach to mass distribution of electronic information products described herein can also provide advantages in high-value environments such as those of Counterpoint Publishing's Federal Register products cited hereinabove, providing a more seamless integration of the fetching of updates received via modem (and selected and extracted by the user from the "Daily Federal Register") with the original product on CD-ROM, the "CD Federal Register". Product installation can be simplified, and a separate user invocation of, and interface to, a general-purpose communications package can be avoided. In addition, by employing the user's pre-existing modem and avoiding need for a general purpose communications product license, significant cost savings can be obtained.

The better to comprehend its possible applications and enhancements, embodiments of the invention can be grouped in four levels, as a follows.

Level Zero: A novel basic transport function embeddable in any of a range of electronic information products to provide economical unattended updates.

Level One Basic: Transporter 14 incorporating API's 40 and 42 adds a powerful new capability to be used with an electronic information product's custom user interface and, optionally enhanced with a database management facility for seamless integration of an update with an original product.

Other options can integrate with relevant third-party packages such as authoring packages.

Level One (Server enhanced): Adds server operation and user support features enabling publishers to outsource tasks which may be difficult or unfamiliar to them.

Level Two: Adds optional translation or use of alternative server protocols enabling an embeddable transporter product to work with many different servers or services including, for example, standard BBS's, Internet servers, and special transport services such as those offered or proposed by communications providers such as AT&T, MCI, Compuserve, America Online and cable television systems.

Level Three: Adds a full online service user interface API with correspondingly enhanced client-server protocols to provide for full-function online service sessions with user interface control, ability to work with a range of online services, providing a publisher with flexibility in their use of existing and emerging services.

These four levels of the invention are illustrated schematically in FIGS. 7-11. Referring to FIG. 7, depicting a basic Level 0 embodiment, user 100 employs generic onscreen interface 110 to initiate an update request 112 from a remote source (not shown), for an update object 46. After initiation, for example by clicking on a button in generic interface 110, communication with the remote server and retrieval of the update object 46 can proceed automatically, as described herein. Alternatively, although not shown, similar means could support submission of a send object to the remote server, both at the basic level 0 and in the cases of Levels 1-3.

In the Level 1 embodiment shown in FIG. 8, incorporation of APIs 40 and 42 in or with transporter 14 enables the containing information product 12's user interface 114 to be supplemented with object transportation functions. Also shown is a received update object 46 seamlessly integrated with information product 12 using a database management module (not shown) as described in the parent application.

When the Level 1 embodiment is enhanced with a database management module or with an authoring package a particularly valuable embodiment results, which may be described as a UI/DB-package-enhanced Level 1. In many possible applications, product 12 may not be created by original programming from scratch, but may be created by employing a standard software package which is then customized to integrate the desired publisher's information content with a standard software package or toolkit that provides the UI/DB functions. Such a UI/DB package or toolkit can use APIs 40 and 42 to provide a point of linkage to the transporter 14.

A programmer, developer or other software provider is thus by such an enhanced Level 1 embodiment to offer a software package which can easily be utilized by many different publishers to add whatever content they desire, and gain the advantages of automated, or managed information object transport, as described herein, while avoiding any need for the publisher to address the tedious and perhaps difficult mechanics of the transport operation.

The software provider can use the inventive transporter 14 as an optional element, or include it as part of his enabling product, thus offering added value to the publisher. In doing so the software provider can, if desired, set up a standard or readily customizable set of UI/DB elements to support the desired transporter functions, and provide all corresponding interfaces to APIs 40 and 42, thus relieving the publisher of the need directly to interface to the transporter via its APIs. Such an approach of integrating the inventive transporter with a more general UI/DB authoring package can also be used to include the inventive transporter component into a more broadly functional offering to publishers for the more advanced embodiments of Levels 2 and 3. It will be apparent that if a third party authoring package offers an API or system developer's interface for use with its product, the integration of the transporter with such package may be best accomplished by creating a special and novel interface module which links between that existing UI/DB package's API and the transporter APIs 40 and 42. Such an API interface module comprises an element of the invention.

The server-enhanced Level 1 embodiment depicted schematically in FIG. 9 shows how operation of a server 22 and technical support functions can be off-loaded by an electronic publisher 116 to a server operator 118. Electronic publisher 116 can distribute an information product 12, which may be complete with content, or may be merely an enabling shell, directly to users by whatever means is appropriate including distribution on physical media and electronic downloading. Updates are then furnished to server operator 118 to complete distribution of updates to appropriate users. As will be apparent, updates may embrace essentially any desired information or content, including original content intended to fill a previously distributed shell.

As shown, transporter 14 can be contained in each of a number of information products 12 distributed by one or more publishers to one or more sets of customers. Multiple information products 12 can be updated from a single server 22 or a server 22 may be dedicated to each individual product 12. The electronic publisher is thus relieved of the expense of replicating and distributing updates, or of the technical challenges of maintaining their own distribution server 22.

If desired, integration between a fetched object and original information product content can be effected by a separable content integration module for seamless viewing or processing by the user of combined local and remote content. The integration module can comprise the user interface and database integration tools, and may or may not contain the transporter 14. Such an integration module, with or without the transporter, may, subject to customization to meet the purposes of the invention, be obtainable from third parties.

The Level 2 embodiment depicted in FIG. 10 illustrates how the invention enables great communications flexibility to be easily included into their products by publishers or producers and, in turn, put in the hands of even novice users simply by equipping transporter 14 with multiple protocols enabling the user automatically to access any one of multiple servers 22 or other remote communications facilities (by including multiple protocol plug-ins, as illustrated in FIGS. 3 and 4 and described in the parent application page 78, line 12). Illustrated, by way of example, are an Internet server 22, or Internet point-of-presence, through which all or any server on the Internet may be accessed; a BBS server 22, or "bulletin board" server for access to low-cost direct-dial servers; and a third route to any other desired remote communications-equipped server, which may include commercial online services, is also shown. By channeling communications and remote data retrieval to the user via the containing information product 12, a seamless presentation through the information product 12's distinctive user interface 114 can be made. For example, a stock management product could access one remote server to update prices of the users stocks and a bulletin board to obtain current news items of the company whose stock has been updated.

Figure 11:
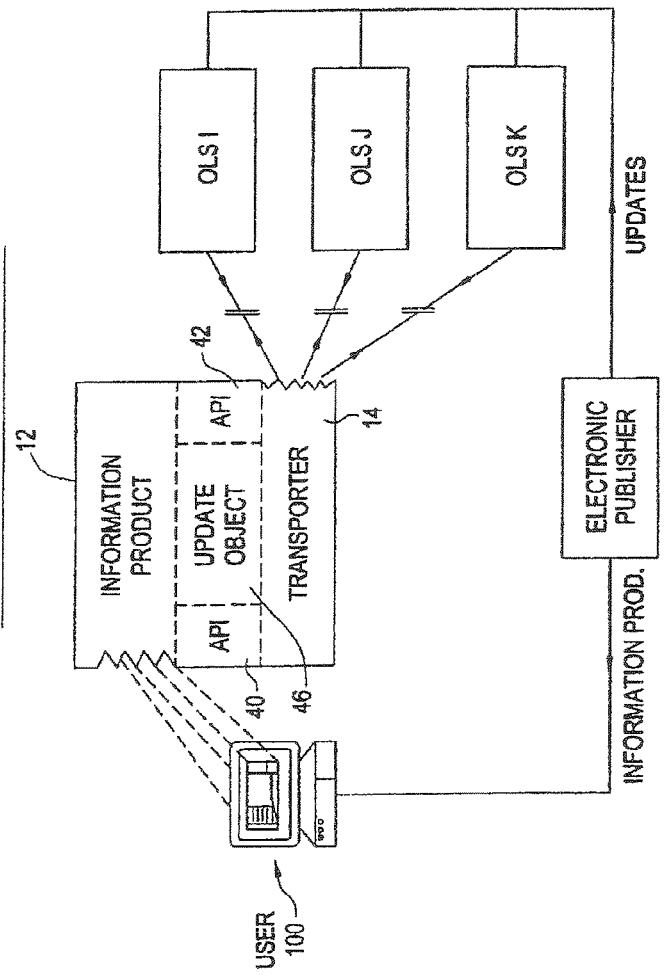
FIG. 11 is a schematic diagram of a multiple service routes embodiment of the invention.

In another application of this Level 2 embodiment depicted in FIG. 11, transporter 14 includes multiple client-server protocols enabling it to access any one of several online servers I, J and K. This embodiment enables a publisher to distribute product and permit the user to update or supplement it via whichever online service they happen to use, or subscribe to, thereby enabling a publisher to economize on the server function by using an established online service, yet reach the widest possible electronic consumer base by reaching users through any one of multiple services, e.g. CompuServe, America Online, Prodigy, Microsoft Network or other proprietary online service, or Internet access provider, each of which may have limited accessibility determined by market scope, geography or technology or the like.

The inventive transporter enables the publisher to accomplish this with a single, uniform interface to APIs 40 and 42, and thus without need to implement costly program interfaces specific to each online service. As described in the parent application, a preferred embodiment of the protocol plug-in maps the APIs 40 and 42 to any suitable pre-existing API available for use with a target online service, such as is offered by CompuServe for connection to its online service, or for use with an Internet server. (Alternatively, a converse translation could be effected: APIs 40 and 42 could be overlaid by a layer that simulates a pre-existing protocol used by a containing product 12 to communicate with a single online service I, thus allowing it to be retargeted to other online services J or K or other servers 22, without significant program change to the containing product.)

The Level 3 embodiment, as described in the parent application, can also be depicted using FIGS. 10 and 11, where in this case the connection protocols are enhanced to support full, continuing online session functions such as browsing, search, and chat.

Level 0 enables a user to retrieve remote information objects such as information product content or software updates, or send in information objects such as product registrations, or orders or inquiries, in an automatic, unattended manner after initiating the communications process with, for example, a single mouse click.

Level 1, by providing suitable API functionality, enables automated object retrieval (and send) functions to be integrated into the information product's own interface, a significant user and marketing advantage. Level 1, UI/DB-Package-Enhanced, integrates with authoring packages to simplify the information product producer's task even further. Level 1, Server Enhanced, by including server functionality, provides a complete service for a publisher.

Level 2 enables information objects to be fetched or retrieved, or to be furnished from pre-existing commercial services, with which the user may already have established communication channels, for example by subscription and enables a publisher to reach most or many users via a small number of pre-existing commercial online services. In addition, Level 2 enables a user to integrate local content, available from the user's local physical media, hard drive or optical disk for example, or locally created content with online content drawn from online sources or the Internet.

Level 3 enhancements of transporter 14, and especially of APIs 40 and 42 can permit tight-knit, seamless integration of appropriate content in fully online modes, giving the user an open-ended feeling of continuity between their own local resources and retrieved remote content. This facility is of particular value for sophisticated multimedia applications which may require content from multiple sources to be assembled into a coherent work such as a television commercial, a training video or "mini-movie", using moving video frames, text content, voice, photographs, special effects and so on, for highly interactive processes such as extended, free-flowing browsing and searching of relatively unbounded network content, and where dynamic contributions or interactions among multiple participants are to be accommodated, as in conferencing or real-time gaming applications involving interactions between multiple network users.

Equivalent Networks and Interface Devices

The invention described in the parent application addresses, inter alia, the problems of moving digital information objects across a telephone network between a remote source and a disparate body of users and provides a transporter which simplifies and automates transport enabling even novice users to exchange pre-specified objects with a remote source via the telephone network using modems or equivalents. It will be apparent to those skilled in the art that, unlike a local area network ("LAN"), a telephone network, the phone numbers of which may be regarded as network node addresses, nevertheless lacks a distributed file management system for simple transport of files between nodes. Functions such as verification of safe receipt of information objects are readily effected on a local area network, for example by executing a directory listing of a remote node address, and much more sophisticated transport management capabilities can and are readily provided by network operating systems, network utilities, network management applications and so on.

A fully functional distributed file management service, such as is provided by a local area network (sometimes called a distributed I/O service, "I/O being an abbreviation for "input/output") permits remote files to be manipulated and accessed via the user station's operating system's normal file I/O read/write and move/copy commands, much as if the file were on a locally attached device (once appropriate access permissions have been enabled), without the complicating need for special, supplementary remote file access protocols such as File Transfer Protocol (FTP). As explained in the parent application, LANs impose burdens including significant initial costs and setup requirements, homogeneity and complexity at the nodes, login difficulties and so on, which problems are not shared by the ubiquitous telephone network to which anyone may successfully connect with a diversity of computer and modem or equivalent equipment.

It will be apparent that the benefits of the invention are obtainable when using other mass-market communications networks equivalent to a traditional telephone network which equivalent networks lack basic file management capabilities. Some such equivalent networks, which may or may not include file management capabilities, and which may be deployed over telephone network hardware, or interface therewith, include ISDN, ATM and ASDL as well as off-air services such as cellular or CPCD and as well as, cable television networks for which computer connectivity is emerging in 1996 (as foreshadowed in the parent application). Such various networks will usually require their own interface device, for example an ISDN board or a cable modem, which for the purposes of the present invention, and to the extent that they are deployed on networks with a lack of distributed file management services (or where such services cannot be relied upon to be available to any given user whenever needed), will be equivalents of ordinary telephone modems. The Internet as well as proprietary online services or other wide area data networks, especially public networks such as those using the X.25 standard (as referenced in the parent application) also generally lack distributed file management services. References herein to "direct dial-up communication" and "telephone network" are intended to include such equivalent networks lacking distributed file management services, including the Internet, and references to a "modem" include such equivalent network interface devices.

Products with Multipath Hybrid Access to a Remote Source

The invention can provide an information product with multipath hybrid access to a remote source, enabling a user of the product to receive updates from, or otherwise communicate with a remote source. Pursuant to such a preferred embodiment, an electronic publisher, or other vendor, can combine, on a consistent basis in a single product, automated online access to the Internet, (or other data network with or without file management capabilities) with dial-up access to enable a user to connect with the publisher's server via whichever online service the user already employs for Internet access or else via direct dial-up access to the publisher's server, in the event that the user is not a subscriber to one of the online services for which a protocol is provided. The access path can either be user-selected or may be automatically software-selected according to what installed modules are found on the user's computer.

This embodiment is valuable for publishers desiring to reach a mass market of computer users with a product that is readily updated in the most practical way. As at early 1996, in spite of the immense publicity received by the Internet, the majority of modem-equipped computer users do not have Internet access, nor do a large percentage use any other online service, except where the context indicates that the specific, ordinary meaning is intended. This is particularly true of home and small business computer users, who constitute a desirable market for many publishers.

Internet Applications

Internet access is relatively complex for an inexperienced computer user to set up, and usually requires commitment to a monthly subscription, yet once set up it is easy to use. The multipath hybrid access embodiment of the invention has the advantage of enabling those users who have Internet access to enjoy the functionality, speed and economy of a network path via the Internet, while other users, a vast market, can simply use dial-up access via the telephone network: they are not required to go to the trouble and expense of establishing an Internet or online service capability. Some users may employ multipath access capabilities to use different access paths according to circumstance, for example, using a network access path from the home or office and direct dial-up on the road where their proprietary online service, or other network access route may not be available.

Since the Internet is not expected to reach the majority of such other users for some years this embodiment is particularly advantageous for publishers desiring to reach a mass market. Products that automate communications via an online service yet omit dial-up capabilities will exclude a large number of prospective customers. Technically, no special effort need be made to provide Internet access to users who do not have the capability: it is simply used if present on the user's computer. However, the addition of a facility to set-up a new Internet or online service subscriptions in a further expanded embodiment of the invention will be valuable to some users. Components for such new-user set-up are commercially available for example from Internet software and service vendors, and can be combined with suitable elements of the inventive transporter component to give the user added options.

Although at the date of this application the Internet is such a dominant world-wide communications force it is hard to contemplate alternatives networks, they may arise, and indeed local organizational equivalents embodying some of the advantages of the Internet's standardization and hypertext capabilities are emerging and have been dubbed "intranets". Equally, comparable or competitive wide area networks based on substantial new or existing infrastructure may emerge. Cable television networks might provide such an infrastructure base. In most cases, relevant aspects of the invention, as described herein in connection with the Internet will also be applicable to such alternative networks and intranets, to an extent that will be apparent to those skilled in the art. As described above under the heading "Equivalent Networks", like telephone-like switched point-to-point networks, unlike local area networks supported by a homogenous network operating system maintaining a shell at every node, more heterogeneous data networks such as intranets and the Internet do not generally support and provide full distributed file management systems enabling digitized files to be manipulated in the same way as local files, although they generally provide for more limited services using protocols such as FTP or HTTP (hypertext transport protocol) which permit files to be copied from one node to another with one or a few simple command line instructions. However, block transfer, for example to read one or more records from a database file, are either not, or not readily, accomplished. Nor can a remote program be executed.

Referring to their Internet origins and choosing to characterize them by important features of the World Wide Web (though other features might be used) the intranets and Internet-like networks described in the preceding paragraph can be termed webbed data networks and are notable for having multiple remote data servers supporting hyperlinked data resources. Such webbed data networks achieve much of their utility from employing a standardized object preparation language, e.g., HTML, and a standardized file transfer or access protocol for platform-independent transport and utilization of objects on the network.

Unless a different meaning is clearly required by the context, the term "web" is used herein to connote an array of hyperlinked information objects stored at one or many locations on a network.

Transporting Information Objects to and from Web Browsers

As described in the parent application, the inventive transporter component can be advantageously used to facilitate transport of information objects across the Internet to and from containing information products 12, by automating access to the Internet and to a predetermined Internet site or resource. It can also be used for transport across other network facilities, including direct-dial, and many different user interfaces and content formats can be accommodated. It will be apparent from that disclosure that one such particularly useful embodiment of the containing information product 12 is that of a web browser, as a UI/DB package which can incorporate transport component 14 to provide an alternative, dial-up route of access to Internet servers that also support dial-up access via a telephone or equivalent network, or whenever use of the transporter's short-burst mode of closed-loop communication session is desirable. Similarly, such access can be provided indirectly via a separate dial-up server which contains, or has access to, the content which is also accessible via a Web server, or equivalent content.

Some known web browsers are discussed in Rick Ayre et al., "Web Browsers", *PC Magazine*, Vol. 14, No. 3, (Feb. 7, 1995) pages 173 et seq. As reported at page 175, column 1, web browsers can be embodied as operating system components, for example OS/2 Warp (trademark, IBM) and Microsoft's Windows 95 (trademark). As operating system software expands and assimilates what were once freestanding, or separately marketed software utilities, for example, memory managers, disk compression utilities and backup programs, distinctions between what is operating system software, or a utility or small application, become more commercial or market-based than technical. Similarly, communications services provided by Web browsers (such as HTTP protocol access) and other similar Internet tools (such as for FTP protocol access) could also be useful as software facilities on which to build transporter protocol plug-ins, and it will be apparent that use of any such available software components is contemplated by the invention, for example, as comprehended in the discussion of protocol plug-ins in the parent application.

World Wide Web

Internet sites using the World Wide Web, "Web sites", present their resources via what are called Web pages, including top level pages called home pages and a linked network of other Web pages. Web pages may be accessed and viewed with a Web browser program which provides standard graphical user interface and data presentation functions to apply format controls coded into the Web page using a standard format to enable a visitor to the site to browse the site's resources via textual and graphic information, drop-down contents and catalog lists and via search windows with varying degrees of functionality.

Keys to the explosive growth of "the Web" are the use of standardized communications protocols ("HTTP", hypertext transport protocol) and data content and formatting coding language (e.g. hypertext markup language "HTML") to effect real time transfer of interactive images (Web pages and related content or services) across the Internet, using digital packet addressing. Sponsors or suppliers of Web material can use their Web pages as an interface to provide substantially any desired content.

In early 1996, today's format is HTML which is a currently popular embodiment of Standard Generalized Markup Language (SGML), a complex standard, adherence to which provides the widespread readability of Internet documents. HTML provides a format to describe the design of a document and its connection to other documents accessible via the Internet, using hypertext links, or "hyperlinks". Alternative content formats such as Adobe's ACROBAT (trademark) provide similar formatting for use with a suitably augmented browser, and other such formats may emerge and evolve. Adobe's ACROBAT is an example of an authoring system or application which creates information objects that are integrated with their own display or utilization, applets (mini-applications) or tools, for platform-independent viewing or playing of the objects.

Typically, Web pages contain both internal hyperlinks to site features and external hyperlinks to other sites and they may also permit activation or downloading of sound, multimedia or other more sophisticated content. Such hypertext links, or hyperlinks, provide immediate initiation of a connection to an information resource for retrieval of an image, in response to a mouse click or two. Hypertext links use uniform resource locators known by the acronym "URL" to find resources on the Internet. The URL identifies the location of a file on an Internet server by a server address such as http://www.uspto.gov and a more or less extended directory path to a filename for a specific page or tag within a page, if it is a Web site, or other data source.

Many thousands of commercial organizations use the Web for publishing, for customer service, for distributing product information via catalogs and the like, and for online sales. Content varies from a few simple text paragraphs to large and complex data suites providing multimedia presentations, games or other entertainments with audio, video and animation. New uses of the Web and methods of doing business are continually being invented.

A Web browser is an application running at the user's station which can access search engines, find and retrieve Web pages using URLs, and assemble the retrieved elements of text, graphics, sound and video, if present, into a coherent printable document or playable presentation. Typically, a Web browser also provides a variety of tools to make "hot lists" of the user's preferred sites, to effect various file and connection management functions, and so on.

Some drawbacks of the Web are that conventional Web access reaches only a small proportion of households with personal computers and modems, (a 1995 estimate is that only about 21 percent of 27 million households with personal computers had Internet access); that such access is generally available only by continuing subscription through an access provider service by paying a minimum monthly fee; that connection time can be expensive; and that Internet access is subject to congestion and interruptions, or loss of connection. For a commercial content provider desiring to reach a mass market, these are important limitations.

Information Object Distribution System for Webbed Networks

To overcome these and other problems, the invention provides an information object distribution system for webbed networks, such as the networks described above, which system comprises:
a) a web site server at a web site on the network and supporting hyperlinked information objects accessible to network users;
b) a web package server having an open-ended connection to a telephone network for data exchange with desiring ones of said network users directly via said telephone network and supporting one or more web packages comprising selected ones or sets of interrelated ones of said hyperlinked objects whereby said desiring network users can obtain said selected hyperlinked objects by direct dial-up connection to said web package server;
c) at least one web browser at least one of said user stations to retrieve and view information objects maintained locally or at said web sites on the network, said web browser being capable of following hyperlinks between objects locally or on the network; and
d) also at said one user station an information object transporter for automated retrieval of one or more of said selected information objects from said web package server by direct telephone connection, said transporter being operable in unattended mode after initiation to retrieve one or more pre-specified objects from said web package server to said user;
wherein link rationalization is provided to enable appropriate hyperlinks to be followed to retrieved information objects stored at said one user station;
whereby a user at said at least one user station can choose to retrieve one or more of said selected information objects either via said browser and said webbed network or via said transporter and said telephone network, and utilize said retrieved selected information object at said user station.

Offline Browser

In this aspect, the invention also provides a computer-implemented offline browser system for offline browsing of locally stored Web pages, which offline browser system is suitable for distribution to a mass market of users, (or to a small group) and for operation at a local computer station, and which comprises:
a) local content elements for at least one local Web page, said content elements being intended for storage at said local station;
b) an offline browser to access and present said content elements via said local Web page; and
c) a transporter, being an information transporter component, as described herein, initiatable from said local Web page, automatically to effect a dial-up connection, or its equivalent, to a desired remote information source and retrieve at least one preselected or pre-specified new content element to update or augment said local Web page;
whereby said offline browser can be utilized to access said new content elements via said local Web page and provides user interface function for such new content access. Preferably, the browser also includes conventional online browsing capabilities.

Such offline browsing in which hyperlinks may be actively pursued, may be termed "active" offline browsing to distinguish from mere passive viewing of the content, or web pages, wherein hyperlinks are either non-responsive, or yield errors.

At least some, if not all, of the local content elements are accessed from a Web page loaded, by the local Web browser, via active screen elements such as hyperlinks, search boxes, dialog boxes, selection buttons and the like. If the local Web page is a carbon copy of a Web site page, then some or all of these active screen elements will use URLs to locate desired content elements and these URLs may point to Internet addresses such as the originating server rather than to local storage at the local station, preventing the browser from operating in the desired offline mode.

To solve this problem, the invention also provides a link manager and relocator function to adjust the hyperlink coding as needed to enable the Web browser to retrieve Web page content elements from local storage. The link manager can be either static or dynamic. A static link manager can be embodied in preprocessed Web pages or content as a simple rewriting of the original URL to a suitable local path, and filename as well, if appropriate. Such a static locator device is appropriate for a shipped product supplied on physical storage media, and may be appropriate for updates supplied via direct modem-to-modem connection or equivalent, but a dynamic locator is more flexible and can be used for content elements or pages retrieved online from one or more Web sites especially for rapidly changing or complex content and advanced functions such as searching and transaction handling. Such a dynamic locator can work with pre-existing URLs, as found on the Web site and redirect them on-the-fly to local resources. Embodiments of the invention may place this link manager/relocator at the server or at the client, and the static embodiments may be effected by either programmatic or manual procedures, as desired.

It will be understood that the above-described offline browser is quite distinct from conventional applications, including even sophisticated word processors, being distinguished, inter alia, by its ability to work online, when necessary, to search the Web and retrieve information objects from it, employing hypertext links to remote resources and using the Internet's Transmission Control Protocol and Internet Protocols, or equivalents. Preferably, the local browser comprises search, display and hyperlink capabilities comparable to those provided by a conventional Web browser, with adaptations, as necessary, to enable local browsing of the content at the local station. Such adaptations may include the link manager; a local search filter for a Web search engine; and modification of an online browser to load and run locally without automatically initiating access to the Internet. In a preferred embodiment the offline browser is developed from a standard online browser product, available from any suitable source, modified and adapted as necessary to provide the offline mode functionality described herein.

However, a very simple offline browser according to the invention may eschew direct Internet online access capability and be designed to work only with locally stored Web pages, updates and new content elements being received on physical media or via a dial-up connection. Especially if the local browser and station have multimedia capabilities, and the local content elements have auto-play capabilities such as are provided by Sun Microsystems' JAVA (trademark) language, ability of the browser transparently to access multiple resources, CD-ROM, DVD (digital video disks), hard disk, etc. by simply clicking "hot button" hyperlinks can be employed in various new products. For example, a multimedia music product can combine the music with text, still pictures or video about the artist, and permit locally stored updates to be seamlessly merged with original content.

The new content element can be an update of a local content element and, preferably, is also locally stored and is transparently accessed and integrated with other local content elements for viewing or processing by the user, for which purpose the herein described user interface and database modules are those provided by the offline browser which acts in the role of a containing information product.

Richer products will provide multiple Web pages for offline use and may comprise large numbers of content elements which are updated with, or supplemented by, multiple new content elements fetched as a package.

Such an offline browser system can be distributed by a commercial sponsor or content provider to simulate their Web site in a standalone environment without the expense, difficulty and inconvenience of establishing an Internet subscription connection for those who do not have one. To this end, selected Web site content, providing one or more pages, which may have a customized look chosen by the commercial sponsor, "local pages" hereinafter, can be supplied on physical media such as CD-ROM or diskette and updates can be automatically fetched by the transporter. The combination of offline browser and local pages may be seen to be another embodiment of the containing information product described in the parent application. The user interface, database management and other data integration functions described in the parent application are provided by the browser (augmented if necessary), in such an offline browser embodiment of the invention.

Of course, as described above, the offline browser system can be distributed as a shell which uses the transporter to fetch completing elements and content from a remote site, via a telephone network or equivalent network. By disconnecting, automatically if so desired, when the specified information object transport operation or operations has or have been completed the transporter of the invention limits line or access charges. In contrast, with conventional online Web browsing time charges continue to accumulate while the user views or processes received material. The transporter can be repeatedly reactivated on an as-needed basis to provide intermittent communication with the remote server or servers specified or user-entered in its setup protocols, thereby simulating the ongoing, open-ended interactivity of an online connection with the remote server. Naturally, the Web site sponsor may choose to modify the local pages as compared with their Web site counterparts, for example to simplify them, or to provide access to content or function intended by the sponsor for local use only.

The local pages will normally include at least one greeting page introducing the site and providing access to its principal features or categories, and may also include many layers of functionality and content which can be jointly or severally updated by transporter operation. Preferably, at least one local page pursuant to this aspect of the invention will be distinguished from a conventional Web page by the presence of an update function, or hyperlink, for activating the transporter to update that page or, if desired by the sponsor, to update the complete offline browser system. Different update links can employ different object manifests to use the transporter to fetch various content according to the context of the update hyperlink.

In a further embodiment, the offline browser system of the invention can be used in a larger context which combines local content stored on CD-ROM, or equivalent distributable media, (diskette or DVD for example), with additional content from a hard disk, or equivalent and with live browsing or data retrieval from a remote source, for example a Web site on the Internet, via intermittent transporter or data shuttle connections, "shuttling" herein. The inventive offline browser system can combine these resources in a coherent suite.

Thus, local Web content can be pre-distributed on CD-ROM or diskette for use with the described offline browser system. This distributed, locally stored Web content can then be combined with more current, or additional content obtained from the sponsor's Web site or other remote location by either intermittent shuttling or live continuous browsing. This allows user selection of local, intermittent or live modes, as desired, or as available at any given time and place. Providing such multiple access capabilities enables a vendor or sponsor to distribute their product en masse to computer owners or users with confidence that a large number of prospects can use the product easily and currently. For example, diskettes might be given away with a computer magazine to be sure of reaching a market rich in enabled prospects by any vendor willing to make the investment to reach them. A different group are prospective house purchasers, a group rich in computer owners and users, who could be given an initial diskette or CD-ROM containing a realtor's listings, and the inventive offline browser system for viewing and updating the listings from a Web site or other remote server using either the Internet or the telephone network. This method enables the prospects to browse the realtor's listings offline at their leisure, and to update it easily via either the Internet or the telephone network, as needed. The realtor does not have to consider whether their prospect has an Internet access subscription, and the prospect does not have to worry about the difficulties and costs of attempting to download extensive listings.

Clearly, it is in the interest of both the sponsor and the user for the offline browser to work with current content elements. To obtain the benefits provided by the present invention, as it relates to browsing Web content, it is desirable for new online content to be retrieved, and stored locally so that the network connection used for retrieval may be terminated, (terminating time charges) and browsing can proceed on the local station.

Figure 12:
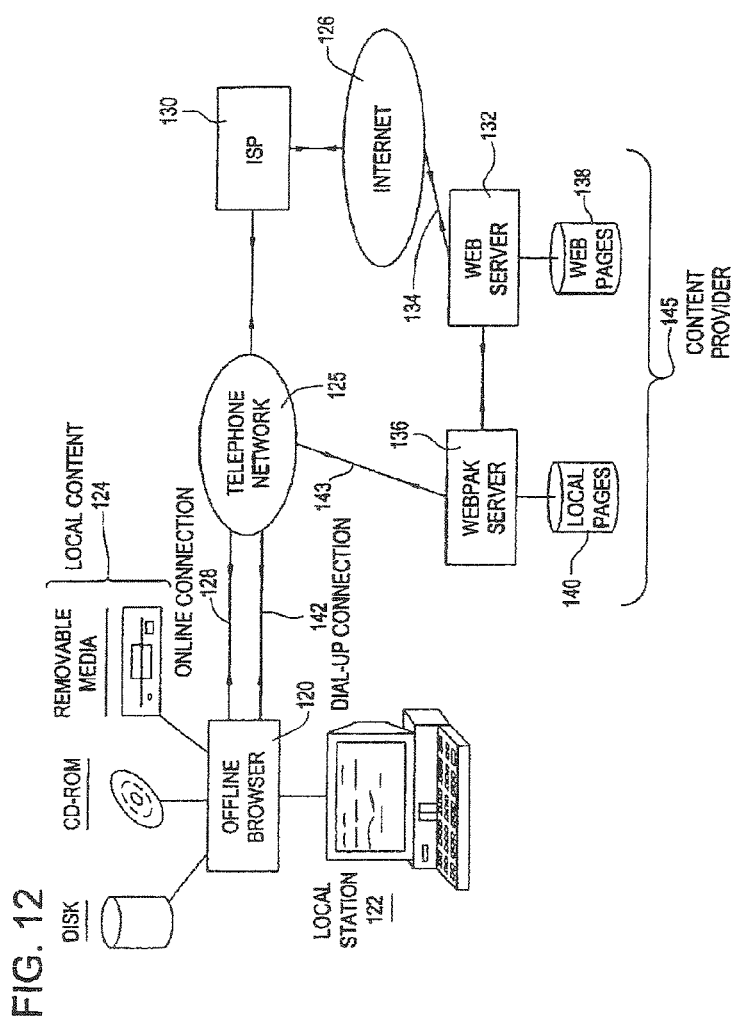
FIG. 12 is a schematic diagram of an offline Web browser embodiment of the invention.

Referring to FIG. 12, an offline browser 120 is shown running at a local station 122 where local content 124 is available at any of various storage media, removable or fixed, such as disk, diskette or CD-ROM. Calls handled by telephone network 125 and routed to an Internet service provider ("ISP") 130 enable the Internet 126 (or equivalent resource-rich, standardized wide area network) to be accessed by offline browser 120 via conventional online connection 128, if such connectivity is available and desired at the local station 122. A content provider maintains a Web site server 132, connected to the Internet via line 134, as a point of presence on the World Wide Web, and, additionally, a web package server 136 which is in communication with Web site server 132 and is equipped and configured for direct telephone access by users via telephone network 125 and telephone line 143. Web server 132 supplies web pages 138 to the Internet and selected Web pages or Web page excerpts are supplied to web package server 136 to serve as local pages 140. Local pages 140, with relevant Web page URLs replaced with appropriate local paths or other local resource locators, if desired, can be retrieved via dial-up connection 142, if conventional Internet access is not available or desired. Clearly, an information product's functionality or usability can be substantially enhanced by including with the local Web pages, whether supplied "over-the-wire" or on physical storage media, any applets needed to run them, for example Sun Microsystems' JAVA (trademark) applets.

Content provider 143B can thus supply local station 122 with Web pages either via online Internet connection 128, if the local station 122 has one, or via other dial-up connection 142, if the local station does not have Internet access facilities. The update can be stored locally and become part of the local content 124 where it is available for offline browsing, avoiding the costs, delays and possibly, access problems associated with online or live browsing. Preferably, the local browser provides user selection of local, intermittent or live modes, as desired, at any given time.

It will be understood that connections 128 and 142 are typically alternative uses of a single physical telephone line, and that alternatively, connection 128 could be any kind of direct Internet or other data network connection. It will also be understood that Web server 132 and web package server 136 are distinguished in their logical embodiments as distinct servers, which can be implemented either using distinct hardware and software systems, or as logically distinct elements on a single hardware platform. Also, preferred embodiments may involve continuous, real-time connection between the servers 132 and 136, for dynamic access to the Web content, or intermittent or even offline file transfer linkage, when static access is sufficient.

Sending of information from the user to web package server 136 can be accommodated, if desired, using the bi-directional capabilities of the transporter. In this case files of any type may be sent to the server 136. Thus, specific information objects including features of the offline browser and the associated HTML content, such as transmission of data entered into HTML forms, can be sent to the web package server 136, using appropriate Internet transaction protocols and associated security and payment functions as desired, as depicted by connection 150. Such a system provides a novel mechanism to support processing of forms included for example, in web packages, as described herein below, that are filled out locally.

In more advanced embodiments, the linkage between web package server 136 and Web server 132 can be used bi-directionally to provide enhanced real-time services such as searching and transaction processing. For example, a response to a user's inquiry or purchase or product order, from a remote Web site can be received by Web server 132 and relayed by the web package server 136 to be made available to the user via the dial-up path 142. Such an embodiment uses the gateway server function described in the parent application and shown as the vendor link 50 in FIG. 1.

Thus, the novel features of providing locally browsable Web pages 140, with replaced URLs, if necessary, and web package server 136, serviced by Web server 132, as described above, enables a content provider, or sponsor to provide a valuable new service: offline Web page browsing with active hyperlinks.

Employing the user interfaces, database managers and API's described hereinabove, the web package can be seamlessly integrated with existing local material employing hyperlinks, if desired, for immediate cross-referencing, or cross-locating of material as between the new and locally pre-existing material.

It will be apparent that the UI/DB functions described for the novel offline browser could be custom built or assembled from suitable browser component toolkits, such as are beginning to appear on the market from such sources as Spyglass, and that such offline browser function can be integrated with other application functions as desired. However the wide availability and growing installed base of standard browsers from major vendors such as Netscape and Microsoft makes it preferable to employ such a standard browser. In such an embodiment, the offline browser is simply a special case of a standard authoring package as described in the parent application. In many cases off-the-shelf browsers can be used effectively, and even browsers previously installed on a user station for other purposes can be employed, by exploiting standard features for extending such products, including helper applications, plug-ins, applets, and API's.

Briefly, such mechanisms allow a standard browser to be used to view content and select links to follow to additional content. In simple embodiments, when the link target is locally resident, it may be automatically handled by the standard browser; when it is not present, the link can, pursuant to the invention, be coded to cause the browser to invoke the transporter as a helper application. This is described more fully in the section below headed "Link Management".

Also, if desired, local pages 140, with local resource locators, can be supplied to the Internet 126 for retrieval via online connection 128, for offline browsing, for example as an appropriately labeled offline browsing package. This feature may be particularly useful for mobile users, and the like for whom Internet service may be available or economic only on an intermittent basis. In this case content can be obtained in efficient bursts when access is available (or even on an automated, unattended schedule, when convenient or low in cost), and then stored locally for continuing use offline. Thus, the time of usage of online content is effectively decoupled from the time of retrieval of the content.

In contemplating the herein described applications of the invention to Web browsing embodiments those skilled in the art will understand that the inventive approach departs dramatically from conventional concepts of Web browsing architecture. Whereas conventional Web browsers are seen primarily as communications programs, which gain strength by using a standardized user interface and data content framework (UI/DB), the inventive approach ignores (or, when used in conjunction with live or online browsing options, downplays) the browser's role in communications, and uses a browser primarily for its UI/DB components, relying on the inventive transporter for communications. And whereas session management is open-ended and conventionally is left to the human frailties of the user, the inventive approach uses the transporter 14 to enable task-oriented session management operable in a short burst or bursts to transport pre-specified objects (whose specification may well be unknown to the user and be embedded in a hyperlink or other software element).

In addition, conventionally, helper applications, API's, plug-ins, and other browser extenders were devised primarily for addition of new content types, or enhancement of content, whereas the present invention utilizes these tools to enhance communications techniques, and enable new communications methods.

It will be understood that short-burst access to bundled packages of content shown as using a dial-up connection 142 to reach the web package server can just as well use an Internet connection or other suitable network, as described above, and under the heading "Equivalent Networks" above, and that such embodiments may become increasingly important in the future.

Link Management

As referenced above, a problem that arises when attempting to integrate retrieved new content elements with pre-existing local content elements stored locally at the user's station, is that, in general, the URLs associated with any hyperlinks in the new content elements fetched from an online Web site will not correctly point to the user's local resources because, in the nature of URL's, (and particularly "absolute URLs" as described below) they will point to a Web site, namely the site from which they were fetched, or some other Internet Web sites. This link redirection problem may arise whether or not the content comprises Web pages, and is inherent in any updatable material that employs hyperlinks where updates will not necessarily be stored in the same logical volume as the original material.

A simple solution to this problem, pursuant to the invention, provides for links to be coded as "relative URLs," which are relative to the source location and contain only relative sub-structure detail. The links may thus remain valid if the substructure is relocated to the local station on a consistent, parallel basis, e.g. if remote pages are within a single directory, the relocated link will be interpreted as pointing to the single local directory. Thus, those elements of the path and filename(s) that are recited in the link must be present at the local station: they could be installed beforehand in an offline browser setup routine or by updates. Link coding may comprise truncation of the absolute URL to remove elements of the Web site address or other modifications as disclosed and suggested herein or as will be apparent to those skilled in the art.

While beneficial in many situations the solution of using relative URLs will not solve the more general problem of offline utilization of links to scattered source materials, including remotely stored materials, where it may be impractical to maintain the relative structure, or where "absolute URLs" may be employed at the remote source. To solve these problems the invention provides, as referenced above, a link manager to redirect or rewrite URLs as necessary for local use.

For smooth and efficient integration of the offline Web browser system with online browsing activity, it is desirable for the offline browser automatically to access the most up-to-date version of any particular content element, and if it must be retrieved from a remote source to be able to fetch it either via live browsing or by shuttle mode. Preferably, the local browser should fetch content from the network only if a local copy is no longer current. This capability requires a mechanism to check time stamps of both network and local copies. More advanced embodiments could use more complex and variable criteria for this decision, such as factors for file size, type, urgency, and connection availability, as well as relative currency.

To solve these problems the invention provides a dynamic link manager cooperative with the local browser to manage link relocations dynamically as links are activated. In preferred embodiments the link manager can operate efficiently regardless of whether content is retrieved via shuttle or live mode.

A variety of levels of sophistication in link management may be employed in embodying the invention, and depending on the functions required, link management may be static or dynamic at either the server or the user station, or both. Key factors are the dynamics of the content in terms of its frequency of change or addition, whether both shuttle and live mode are to be supported, and the extent to which a user's local content is allowed to vary.

In maintaining proper linkage, a key concept is the idea of "working sets" of web content. Linked content constitutes a network which is a directed graph. While in general, Web content is open and any home page may have links which lead to other links that go throughout the entire Web, actual Web sites may be limited or can be artificially limited in the scope of their links. Thus, the term "working set" is used herein to mean a set of linked objects which a user is permitted by a service, content or applications provider, to reference at a given time. This usage of the term "working set" is borrowed from the unrelated field of virtual memory management.

If the working set is kept sufficiently small, it may be practical to transmit all working set elements that have changed whenever the user requests one or more pages in the set. In this case all pages in the current working set are known to be available locally, so that links can be pre-coded at the server to point to local copies (using relative URLs, if they are not already coded in such manner). Then, desired explicit links for updates to current content, or planned extensions, can be coded to cause an intercept, and the handling of the intercept is used to invoke the transporter 14 to retrieve the update package for the working set.

More generally, where the working set is too large for complete transmission on every update, and a scheme for segmentation of the working set into smaller bundles of linked objects, called "web packages," herein which can be obtained from the server individually, as needed, may be employed. In this case, as before, links within a web package may remain as simple relative URLs, which can be expected to work locally and can be followed by the browser without special consideration, but links from one web package to another need to be intercepted and checked to determine whether the destination object is in a local web package, and then proceed accordingly.

Figure 13:
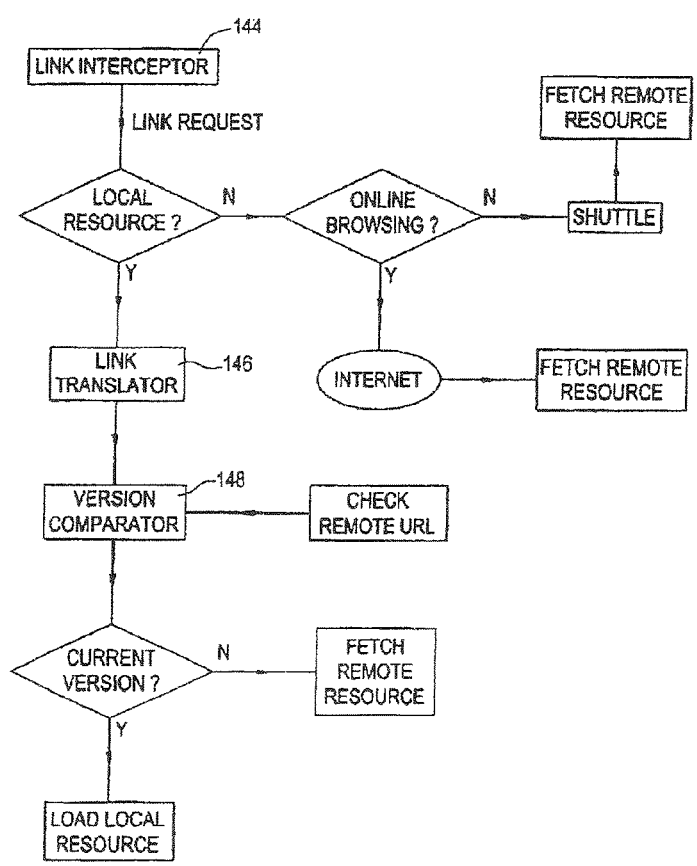
FIG. 13 is a schematic flow diagram of a hyperlink readdressing or redirection process according to an aspect of the invention.

Pursuant to the embodiment of the invention depicted in FIG. 13, the link manager comprises a link interceptor 144 cooperative with the offline browser 120 to intercept links activated by the offline browser 120 and take temporary control of the browser application thread whenever a link pre-coded as not internal to the active web package is encountered. Intercepted links are inspected to determine whether they are calling a resource available locally in another resident web package. If not, depending on the mode of access in use at the time, control is returned to the browser 120 for resource retrieval via live browse or is given to the transporter to perform a shuttle.

In a generalized embodiment, the link interceptor 144 monitors all link requests issued by the browser 120, cooperating with the browser by means of any of a variety of standard or customized mechanisms as described below, and acts or passes them according to their destinations. To effect monitoring the link interceptor 144 can operate at a relatively high level, plugging to the browser's API, assuming it to have one, although this may require some customization of the link interceptor 144 to browser 120.

If the intercepted link is determined to be calling a locally available resource, for example because it recites a filename identical with a locally stored file, it is passed to a link translator 146 to correct its destination. Control and the translated link are then passed back to the local station's offline browser 120 for completion. Preferably, the link manager includes a version comparator 148 which calls a version number, time and date stamp, or other version indicator from the original URL address on the Internet, compares same with corresponding data for the local content and processes the more current version. If necessary, the link manager can include a time and date stamp module (not shown) to label relevant links or link elements as they are received locally.

Preferably also, in applying such a scheme, the link translator 146 reads from the intercepted link sufficient information to enable lookup and translation. Translation can be effected by appropriate modifications of the URL.

Link control and interception cooperative with the local offline browser 120 can be embodied at various levels and points of control. In a simple case, all links except a single class of update link can be pre-converted to relative URLs that work without interception. Update links can be coded to cause a standard shuttle update function to be invoked, such as by invoking a packaged version of the transporter as a helper application, using a coding approach such as described below.

In a more flexible embodiment using the web package segmentation structure, web package-specific intercepts are provided and coding is applied to the links to cause the browser to transfer control for link relocation purposes when specific intercepts are encountered.

In an alternative embodiment of link manager which requires no inline editing of links or selective intercept control, the link interceptor intercepts all HTTP "Get URL" requests (in other words intercepts hypertext transport protocol requests to get a file based on its uniform resource locator address, which has been left in its original form) and makes a determination, based on separately maintained data, as to whether the target object is local, in which case it passes the Get URL back to the browser to execute as a local relative URL, or whether to obtain the target object via remote browsing or via transporter shuttling. Interception can be implemented using browser API functions which are commercially available in various forms including for example DDE, OLE, and Netscape Communications' "Inline Plug-Ins", or through use of proxy server functions, preferably modified for local users. Proxy servers are commonly used as intermediary servers that can redirect URL references in order to implement secure fire walls, but can also be implemented in simple form to perform a comparable redirection function running as a process on the user's machine cooperatively with the browser.

Conventionally, a proxy server provides a standard mechanism that implements an intercept/redirect function in the network (normally applied to the very different objective of resource hiding for purposes of security), outboard from the browser. When use of a proxy server is specified to a browser, all "Get URL" requests are directed first to the proxy server, which then looks up the proper routing and redirects the requesting browser to the actual desired URL in a two stage process. Proxy servers are usually separate shared servers performing network control functions for entire groups of users, and the desired web package storage and access management could be implemented on a similar shared basis, but this activity is typically individual in nature and thus preferably effected at the user's station. Use of a simple proxy server on the user station can be an effective mechanism for link control, if appropriately coordinated with any other uses of proxy servers, such as for security fire walls.

Alternatively, the link interceptor 144 may operate at a much lower level and monitor suitable DOS or other operating system interrupts, such as interrupt 21 or 23, filter all browser originating resource calls, and process the filtered calls selectively according to destination, as described herein. Use of the operating system interrupts in this way may be more difficult to implement, but can provide a more universal link interceptor 144 able to work with a variety of browsers.

Link Coding

Link coding is preferably done when the web packages are built, unless live browsing is to be supported with full or substantially transparent integration of local and online resources. Links internal to a web package are left as (or converted to) relative URLs and need no intercept, although interception may be used for tracking purposes, if desired, enabling a user's "hits" on particular links to be logged and forwarded to a remote source using transporter 14. Such tracking does not require amendment or rewriting of links.

Pre-Coded Web Packages

External links are coded into the web packages, before delivery, so as to be intercepted and amended or rewritten. The intercept process can be manual if static content builds are used, or semi- or fully automated, and can be varied, depending on the dynamics of content structure changes, for example, as follows:

a) Web package definitions can be manually set up to consist of a set of objects, and this definition automatically applied to edit links in new copies of the specified pages. In this case the web package is known to consist of the pre-defined set of pages, and is thus static in page composition, but the content of those pages is dynamic, and requires dynamic link adjustment when new web package copies are built.

b) Alternatively, procedures for automatic segmentation of content into dynamically defined web packages can be used.

Dynamic Link Coding

If live browsing is to be fully integrated then link relocation can be dynamically coded locally, as pages are received. Preferably, the web package structure is used to simplify tracking so as to have similar capability for dynamic web package definition as described in b), above. Alternatively, individually accessed pages can be tracked as single-page web packages (with any associated inline objects), and then consolidated whenever the opportunity and necessary information becomes available, such as on request, or when a web package is received that supersedes the individual page.

In a simplified embodiment of this aspect of the invention, designated pages can be retrieved one-by-one as standard pages (with associated inline objects) from any server, or servers, but managed together, as a package, by the client system at the user's station, as a defined web package object group (using separately maintained web package specification and control information) which can be termed a "virtual web package". Such a virtual web package has the benefits described herein, namely that it can be supplied by direct dial-up using batched, managed access in a short burst for subsequent offline use. However, a virtual web package will lack the packaging-related transmission efficiency of the described "real" web packages, although the need for separate prepackaging or staging of content is also avoided by way of compensatory benefit.

One way of coding a link for interception on an exception basis, such as by using a helper application is by modifying the file extension of its relative URL or local file protocol URL, although at least in some cases, steps may need to be taken to avoid destroying file functionality conferred by program-recognized extensions such, for example, as ".BMP", ".TIF", ".DXP", ".DBF", ".IDX" and the like. Simple substitution of an extension would lose the extension info, and but may be applicable for pages which can be assumed to be written in HTML.

Thus, for example, the existing file extension of the URL in the uncoded link, whatever it might be, could be replaced with a common intercept extension, such as ".TSH", which would cause the coded link call to be intercepted for rewriting when that link were activated by the user. Clearly, multiple coded extensions could be devised to serve a variety of purposes, including, perhaps, usage tracking. This extension-based coding approach is convenient for simple embodiments in which the intercept mechanism is invoked by a special-purpose module or application, analogous to (though providing different functionality from) the commonly available mechanism of a "helper application" which is typically used to invoke viewers for special file types. The inventive use of a helper application mechanism to manage communications while using the browser for viewing is in some senses a reversal of its conventional use.

To retain extension functionality and support more general absolute URLs, a preferred coding practice pursuant to the invention, is to append to the coded link, after the URL's intercept extension, one or more additional legal URL coding characters such as "#" (used for tags within pages) followed by the original URL, with its functional extension. Thus "image.bmp" could be coded as image.tsh#bmp, or more generally, for http://host/path/image.bmp, as linker.tsh#http://host/path/image.bmp. The URL coding character would be ignored by the browser, but would be accessible to the link manager which can delete the URL coding character and the intercept extension, rewrite or amend the URL and return it to the browser for execution, with its original extension intact. It will be understood that starting after the initial "#", all "/" and other special characters (such as "#" for a real tag) must be coded in the form of their hexadecimal equivalents using the standard URL escape characters, in the form "%00", where "00" is the equivalent hexadecimal code, in order to conform to the rules for a legal file protocol URL.

A more preferable alternative means or module to cause or identify exception intercepts is a module that uses a special protocol designation to cause the linker to be invoked as a protocol handler, such as tsh.//image.bmp, or more generally tsh://host/path/image.bmp in cases where the browser allows addition of new protocol handlers, as some recently available versions do. This scheme can also be useful in embodiments where all URLs are intercepted.

To effect URL translations, the link translator preferably comprises a separate set of lookup tables. In addition to specific or wild card designations of original URLs, or URL classes, against corresponding new URLs or URL classes, separate lookup tables enable efficient tracking of link status, time and date stamps, and other relevant link data, and also facilitate grouping of translations and status by web package for transport with a web package as a web package list, providing an integrated product. Such a mechanism also facilitates the selection of a variety of Web pages from a Web site with properly managed links. It is not necessary to modify all local references to a newly supplied web package in advance: the links can simply be intercepted and the web package list consulted live. Alternatively, the coded URL may carry with it a web package identifier for an entire update or extension web package instead of or in addition to the specification of a specific target URL, depending on the variety of access modes and richness of content structure to be supported.

Such mechanisms are very effective for what might be regarded as passive content such as text, images and even multimedia retrieved by the user for independent use at their local station, but greater difficulties may arise with dynamic, changeable content, for example cases of client-server interaction needed for forms handling, searches image map selections, JAVA (trademark) applets and push-pull content.

To carry out these dynamic activities locally or in shuttle mode the invention provides local simulation of the server functionality to complete the interaction. As an alternative, a special server connection can be employed to effect the necessary server interaction in a short, automated session. Such innovations are believed feasible but some limitation of functionality may be desirable. Forms can be included in web packages as blanks, and sent in to the server when filled out. Searches can be passed as standard Web searches, or selected result pages could be included also to avoid a subsequent reconnect. Image maps can be converted to local image maps and push-pull can be facilitated with local scripting, as desired. JAVA applets and live objects, such as director movies should run satisfactorily locally given necessary browser support.

Other schemes for coding links to achieve the purposes of the invention will be apparent to those skilled in the art who will also understand the value of the novel link coding capability of the invention in enabling many useful applications, including web packages with active hyperlinks, as described.

Web Package Utility

Such novel web packages in turn can stimulate a variety of new applications and ways of using Web content or other material compatible with Web standards, especially when combined with the transporter of the invention into automated web package transport embodiments. For example, ready access to web package content furnished by a sponsor from a remote server using the transporter for user-driven dial-up retrieval of the content can introduce non-Web users to Web content and attract them to online services, adoption of which can be facilitated by incorporation of a Web or Internet access provider's subscription package (or enabling shell) in the Web package.

Web Page Caching

It will be understood by one skilled in the art, that the link management modules and methodology of the invention, and its application to web packages, as described, are quite unlike conventional web page cache managers commonly used by browsers temporarily to hold recently accessed pages at the local station for subsequent quick access. Conventional local Web page cache managers are not presently standardized, making it difficult to communicate therewith via an extension module such as the inventive component for direct dial-up access and suffer from the drawbacks that communications access is assumed to be readily available at all times, to replace or add pages, and cached objects are automatically purged under simple policies such as "least-recently-used". Thus the content of conventional Web page cache managers is transient in nature rather than persistent and the cache managers are unsuitable for effecting the offline browsing and other link management functions of the invention, as described above. Furthermore, such conventional Web page cache managers currently neither offer nor can readily be extended to support the required set of link management and relocation features described herein.

Nevertheless, in one preferred embodiment of the invention, a conventional Web page cache manager can be used to enhance the invention, for example, in a case where the browser (and associated cache) is custom built for use in online and shuttle mode, or where an adequately featured cache facility is standardized and generally available across a useful population of browsers. For these purposes, the conventional browser preferably provides, or can be extended to provide the necessary functionality, and offers a suitable API or other control interface, to manage the local objects.

As noted hereinabove, it will be understood that the described approach to link management applies to remote hyperlinked content in general, whether based on current URL usage or current or future variants, extensions or other equivalents of URLs. This includes object-oriented approaches to the handling of hyperlinks using object containers for URLs or other hyperlinks, such as those known in the art as "monikers".

While described to serve the purposes of offline browsing, it will be apparent that the described link management features of the invention can be employed in other situations where it is desired to redirect links.

Link Management Applications

The ability to manage links as described herein, enables a number of new Web capabilities to be provided, serving various recognized and previously unrecognized needs. Properly implemented, using the teachings of the invention, a user can smoothly interwork local, shuttle and live modes for static content formats, for example HTML, images, multimedia and the like. Some applications of the link management aspects of the invention to filling these needs will now be described while others will be apparent to those skilled in the art, or will become apparent as the art develops.

Content Archiving and Relocation

The link interceptor function can be modified to perform many other valuable functions to add value to the basic hypertext functions provided by the standard network protocols. For example, current protocols provide no facility to deal with links which point to content which has been moved or deleted, or which reference a server that is no longer maintained to be accessible on the network, or which is otherwise unavailable: they simply cause an error message to be displayed when such an "empty" link is selected. As at the date of this application such empty links are a relatively minor nuisance. However, their proliferation will become increasingly problematic as linked content developed by uncoordinated and perhaps undisciplined sources grows and evolves. Eventually these empty links could seriously impede Internet traffic, like so many parked cars on the highway. A proposed solution yet to be standardized by the Internet Engineering Task Force involves the use of new forms of link specification which embed indirect but permanent Uniform Resource Names instead of URLs, but this is some time off because of complex policy issues, and has the drawbacks of requiring changes to embedded pointers in existing content, and imposes a relocation overhead on every access. A stopgap approach similarly based on embedding indirect links, called Persistent URLs, has recently been proposed by the Online Computer Library Center, but has similar weaknesses.

Pursuant to an extended embodiment of the invention, browsers can be modified, using the various browser modification or extension facilities described herein, or their equivalents, to provide a solution to this problem that needs no change to current content and imposes overhead only on an exception basis.

Thus to solve the problem of "empty" links the invention provides a modified browser including a link management module to react to messages generated by failure of a link owing to an inadequate response from its destination by calling an enhanced version of the link interceptor module, which includes one or more link search components which is invoked to seek to alternative locations for the desired content, or an explanation of its unavailability, and then provide an adjusted link pointer back to the browser for presentation to the user. As time passes the number of aged or obsolescent links must be expected to become quite voluminous, spawning the need for a link relocation or archive server to maintain the alternative location or explanatory data needed by link search components at the browser. The invention includes such a link archive server as well as modified browsers, as described, intended to work cooperatively therewith, whether in online or offline mode.

A variety of computer-implemented software mechanisms can be used by such a link archive server to provide an archiving and relocation service, pursuant to the invention. Preferably, one or more special-purpose archive and relocation servers is set up to maintain relocation information and, optionally, copies of the "lost" content from the empty links. A link interceptor module at the user's station cooperative or integral with their browser, is configured to query the relocation servers with a failing URL, and receive or retrieve a response containing a corrected URL, if known. Thus, for example, if a page at:

http://server1.com/path1/page1.htm, was not found, the link interceptor could be configured to query either:

http://archive.com/relocator?server1.com/path1/page1.htm, or http://relocator.archive.com/server1.com/path1/page1.htm, as a first relocation server to be checked.

Information on such relocations could be submitted to the relocation server through various means, and an active "spider" process could be applied, being initiated, for example, from the relocation server, to monitor the structure of the Web and detect changes. The spider would save the content or preferably a short coded signature for each page, and then on subsequent scans, would identify relocated pages, using the saved content or signatures, and note the new addresses for responding to inquiries from the link interceptor. Preferably, any relocations that were uncertain would be flagged with a coding that would allow the viewer to be warned of the possibility of error. Such archive servers could also offer an optional repository service for useful pages no longer maintained (or maintained in some new location) by the original source or sponsor. The relocation and archive servers could be maintained as a for-fee service, or sponsored through various mechanisms including advertising, as are search sites, currently.

Where feasible for content servers which remain operative but have content that has been moved or deleted, an alternative, and perhaps more desirable method, of implementing such relocation functions would be at the content server, preferably by convention. Thus, for example, a server could add a basic relocation server function for pages that had previously been available from that server. Thus, for example, if a page at:

http://server1.com/path1/page1.htm, was not found, the convention could be to query either, http://server1.com/relocator?path1/page1.htm, or http://relocator.server1.com/path1/page1.htm, as a first relocation server to be checked.

Screening

The link interceptor module, when configured to intercept all or selected external links or Get URL requests enables user activity to be screened so that undesired requests can be denied or filtered out. Such a screening process can be used to prevent users retrieving inappropriate content, for example content judged indecent or obscene, or from competitors Web sites, so long as an address, or URL, for that content is known. If the user attempts to get an URL on the excluded list, "Object Not Available" can be returned.

The link interceptor module can access a list or table of excluded addresses which may be maintained locally or accessed at a remote site, the access or a periodic refresh can of course be effected by transporter 14, if desired. Where a third party, for example the Internet Service Provider ("ISP" herein) can furnish descriptive classifications of site content, by address or URL, as being indecent, violent, politically incorrect or the like, and password coded setup routine can also be provided enabling a supervisor of the local station to filter out certain categories of content. Thus, a parent can use a password, or multiple passwords to control what content their children view.

It will be appreciated that the link management, intercept and relocation aspects of the invention, and the concept of relative URLs while being particularly advantageous in assisting the implementation of offline browsing, as described herein, can be beneficial independently of the use of transporter 14, for example to enable offline browsing independently of dial-up updates or to enable an URL-driven content screening module which could be a freestanding software component or program implemented at the user's station to screen the user's activity or at the ISP to screen or censor all link calls from the ISP's customers, or elsewhere, as will be apparent to those skilled in the art.

Web Package Assembler

The invention also provides a computer-implementable web package assembler enabling sets or packages of Web pages, as described hereinabove, to be assembled into useful web packages from content available at diverse locations on the Internet. A key component of such a web package assembler is a link relocation module to rationalize all hyperlink references within the package, for local browsing.

Other useful components which can be included in such a novel web package assembler are a selection tool, a retriever and a package assembler. The selection tool specifies the desired content ingredients of the web package in a manner susceptible to search and applies criteria to select suitable content elements from an existing content set which may be as diverse as a single database or directory of data or all Web site data available on the Internet. The retriever applies the selection tool over the content set to gather content elements for the web package, or alternatively to gather a superset of content elements from which the web package can be assembled.

The package assembler uses the selection tool to assemble a desired specific package or web package from the content elements generated by the retriever. These tools will now be described in more detail.

Web Package Selection Tool

A preferred web package selection tool provides a time-optimized selection process to economize on connection charges and which uses a focused methodology to achieve a brief connection. Because of the vastness of the World Wide Web, and the extent of its content, it is important that the selection tool apply a range of filters or selection criteria with optional specification or customization or plug-in control of parameters for content, source, quality, style and other parameters that will be apparent to those skilled in the art. A particularly desirable feature is an option for explicit specification of desired content known to exist on the Web, for example Web pages previously visited, and preferably means (e.g. drag-and-drop, paste-and-copy, or a separately windowed routine employing a file manager) are provided to facilitate such desired content specification for example by posting respective URLs from the user's hotlists, cache of visited sites, vendor- or sponsor-supplied list or other offline (or online retrievable) source of URLs of potential interest.

The objective is to build a coherent package comprising a hyperlinked collection of content elements retrieved from multiple Internet (or other appropriate dispersed source) locations, the content elements being handled and built in an environment of their original HTML or other standardized language, without requiring conversion to proprietary application formats. Options for offline testing of a search query built from multiple parameters, are desirable, where feasible, to avoid unnecessary or excess connection time.

Retriever Tool

The retriever tool uses the search tool and crawls across the Web, like a Web spider, to locate and retrieve desired or suitable content, based on defined criteria, in HTML format.

The analogies to a spider web and references to a Web spider and Web crawling are used to denote an organized search of Web sites involving visits to those sites rather than merely scanning the content of one or more search engines. Clearly, a comprehensive search of the content available at any and all Web sites is a time-consuming project. Crawling techniques can also include the pursuit of hyperlinks to relevant content, and other techniques, as are known to those skilled in the art.

Such a combined search-and-retrieve tool set can be used for other hyperlinked, searchable content bases, as desired.

Package Assembler

The package assembler provides assembly of desired retrieved content elements into desired web packages combining them with any applets required to run, display or otherwise use particular content, or any other appropriate accessories.

Link Relocation Tool

The link relocation tool operates like the link relocation module described hereinabove to effect appropriate changes in links in the retrieved content. The link relocation module provides functionality to adjust hyperlink references in the retrieved content elements to point to other elements within the web package or, as appropriate, to point to other content elements in separate web packages which may also be retrieved, or otherwise to be rewritten or redirected, as described above. Proper resolution of links enables the tools to be used for managed retrieval of related packages as sets, rather than as individual pages as in conventional Web browsing.

Appropriately used, these tools enable the building of a web package, of multiple pages from diverse locations, to be automated, combining Web crawling under specified search constraints.

While these tools will clearly have utility at the user's station, a preferred embodiment of the invention locates them on a web package server accessible to users by direct dial-up connection. If desired, the web package server can be provided with facilities dynamically to assemble batches of content elements into standardized or customized web packages. Standardized web packages might for example be news items for a trade news letter that have been located at and retrieved from a number of sites relevant to activities in the trade, are distributed to a population of users, whereas customized web packages, which are preferably dynamically assembled upon request, are intended for an individual, or small group of users, meeting their specific content requirements.

The application of this package assembler, and in the case of dynamic web package construction, its use in conjunction with the above searching and gathering activities impose novel design constraints in that packages to be transmitted must preferably be compact, and any content gathering done in real time must preferably be done in a way that minimizes call duration. This affects decisions as to how to search, which items to select, and in what form to present the results. For example, size may become a parameter in determining which search results to remit to the requester. The issues and solutions of these decisions will generally be apparent to one skilled in the art, but may vary from those typical in conventional online searching situations, as will be apparent from the teachings herein. For example, when web package construction is dynamic it will typically be desirable to apply a caching facility to keep frequently requested pages or sets of web package elements available at the web package server in order to keep access and assembly time to a minimum.

Short-Burst Connectivity

By efficient management of the communications process, the invention enables calls to be terminated when pre-specified information object transfers have been satisfactorily executed, and furthermore enables the complete call process from dial-up to hang-up to be dedicated to automated fulfillment of the user's instructions in a single short burst connection the duration of which can be optimized by the transporter-related functions described herein. This efficiency is in contrast to a typical online session where the connection can remain open, running up time charges, while the user reads and thinks about each page retrieved (or is interrupted or performs other tasks), and long after data transfer has ceased, unless the user alertly disconnects. It is typical for such "think" time to be 10-20 times greater than the actual communication time. In addition, the compression and object packaging or bundling features of the transporter can enable still greater efficiency in communications as compared with conventional Internet or other online access, which typically retrieves uncompressed pages or messages, one at a time by enabling compressed data transport to be implemented transparently to the user.

E-Mail Retrieval

In a simple example, new e-mail may be retrieved and browsed while still online, with a meter running, whereas retrieved new mail could be browsed just as effectively off-line. Employing the inventive transporter, with suitable adaptations at the host server, the user can fetch a manifest of new mail, edit the manifest, if desired, fetch the new mail and automatically disconnect or, alternatively, disconnect a first e-mail service and call up one or more other such services, in a substantially automatic manner once configured.

Similarly, the inventive transporter can be used to access bulletin boards and pull-down objects relating to particular content threads of interest to the user.

Known, special purpose e-mail readers for short burst access to specific e-mail and bulletin board systems are special-purpose modules configured to fetch only mail objects addressed to the calling user, not objects specified in a manifest, and thus are not suitable for broadcast information object distribution, or publication. Unlike the manifest employed in the present invention, any list of files attached to an e-mail does nothing to provide for further action upon receipt of the listed files nor, because it is embedded in the e-mail message, can it be employed by a user, information product, or remote server to specify files or objects to be fetched. Nor do such e-mail readers comprise separable software transporter components applicable to general-purpose automated information object transport via managed dial-up connections. The ability to optimize the communications process and automatically terminate it with a disconnect for an arbitrary variety of application content, including Web browsing and searching, uniquely disposes the inventive systems to provide a novel, general purpose short burst data retrieval facility for off-line users as described herein, which is quite different from the limited dedicated functionality of e-mail readers.

Short burst connectivity can simulate an online environment by coupling a transporter with one or more hyperlinks, hot buttons or menu selectors enabling a user to effect multiple or repeated data retrieval operations in short bursts from one or more remote sources, by clicking on links and hot buttons while they browse. In special cases, where a dial-up source for the destination information object of the hyperlink is known to be available, a translation or readdressing module could automatically post appropriate header and other retrieval data from hyperlinks in imported content to the transporter and create a manifest for fetching the object from the dial-up source, enabling an online environment to be simulated. Such application of an intermittent, short-burst connectivity approach to browsing and searching of relatively extensive content (such as collections of Web pages) is quite distinct from conventional Web browsing and searching activities which function as a fully online, continuously interactive process. Absent the teachings herein, conventional wisdom would expect the inventive approach to be unduly static and limiting of interaction.

With present-day modems, some delay occurs in the dialing and handshake process which slows the dial-up communication process and may somewhat hinder simulation of an online environment. Advancing technology may reduce these problems increasing the usefulness of the invention. Connections via ISDN are established much faster, while connect time appears at present to be significantly more costly. Accordingly, short burst embodiments of the invention have particular application to use via ISDN networks where retrieval of cumbersome graphics, video and multimedia files may be important. The transporter can readily be adapted to offer a scheduling function providing users with an option to effect retrieval of bulky objects at an off-peak low rate or low traffic time, such as at night.

Using such short burst data retrieval, a user can interact off line, seamlessly merging retrieved data or objects with local data or objects, in a rich and varied environment which may simulate an online session, without the expense and inconvenience that sometimes accompanies extended online sessions. In many instances, for example domestic environments, freeing up a telephone line will be an important benefit, especially to teenage computer users whose parents require a single phone line to be available. These benefits of short burst communication, with minimal use of phone lines, accompanied by off line browsing, are of particular value in the case of interactive digital music CDS, for example, as supplied under an industry standard, or agreed format, such as Music Enhanced CD. Application of the invention to this environment will be described in more detail below.

The short burst access characteristics of the invention may be of particular value to mobile users who often do not have suitable access to adequate communications facilities. Wireless links are relatively expensive and slow, and while improving, can be expected to remain more costly and lower in speed than wireline service. The ability to concentrate activity into short, efficient bursts, and to pre-position selected working sets of current content such as price lists and documentation in a portable system can be of great value to salesmen, field workers, and computer-using working travelers of all kinds It will be apparent that applications of short-burst, intermittent connection can be extended to provide broad support for content searching, and for efficient packaging and transmission of the resulting content, as well as for transaction processing in general, as referenced above, for example by automating and managing communication with a remote search engine. In doing so, the implementation details of the transporter functions and interfaces would preferably be tuned and adapted as appropriate to efficiently and effectively serve the particular purposes addressed by various useful sub-classes of applications, as will be understood by one skilled in the art from the teachings herein.

Transaction Processing

As described in the parent application, the invention provides a flexible vehicle for transaction processing in many different ways via both real time gateway connections and non-real time store-and-forward linkages. Such transactions can be EDI-compliant, or use other remote-ordering protocols for real or de facto standards including HTML forms and Sun Systems JAVA (trademark) applets, and gain the benefits of short-burst communication optimized for reduced communication time. In this manner the benefits of the inventive transporter can be obtained in a way that interworks with and applies useful portions of transaction control, user interface and security software infrastructure that may be available for use at the user and transaction server ends of the transaction chain.

Moving web packages in or with a transporter, both as described pursuant to the invention, creates what may be termed a "web package shuttle". With the short-session and simple connection advantages the invention provides, a powerful general purpose transaction processing capability is enabled having advantages similar to those described for information transport. Such a transaction processing mechanism can adopt any other relevant aspects of the invention described herein including intermittent or short burst repeated connections, gatewaying between a vendor or sponsor's server or a special purpose server and a Web server or Internet point of access so long as HTML form-based transactions, or their equivalent, are supported. Store and forward is also useful in this context so that many transactions can be collected on a special-purpose server for later processing elsewhere.

Interactive Music Products

The Music CD Extra format is a standard supported by Microsoft, Sony, Philips and other industry leaders for a class of high quality recorded audio products distributed on CD with CD-ROM compatible user, multimedia-capable interactivity, enabling users to enhance the music experience (stored in ANSI standard CD audio "red book" format, playable on standard CD audio players) with suitable ancillary content such as liner notes, pictures, video clips, artist data, lyrics, discography, concert schedules, fan club information and so on (encoded in CD-ROM compatible ANSI standard "yellow book" format, playable on standard CD-ROM players).

Variant combined formats have seen limited use, and all of these are collectively referred to as Enhanced CDS. Comparable standards and formats promoting interactive environments for recorded products may be expected for other media and products, for example video products and DVDs, as well as High Density CD, the DVD-based follow-on format for CD audio and CD-ROM.

Such interactive music products may also include online links to the Web or other online services. However, to the inventor's knowledge and belief available products provide or require traditional open-ended online sessions with their associated drawbacks.

The invention provides a novel interactive recorded music product comprising, stored on distributable physical media, a music recording and an information transporter as described herein, coded for automated communication with a pre-specified remote content source, particularly, but not exclusively, a digital music CD, which preferably also includes supplemental interactive capability relevant to the music recording.

Typically, the remote content comprises ancillary content as described above. The remote source preferably comprises a server maintained on behalf of a vendor or sponsor of the music product accessed by direct dial to a number stored or retrievable via a number stored, by or for, the transporter. In a preferred embodiment, a commercial vendor or supplier of the music product maintains a server with ancillary content of interest to purchasers of the music product and pre-installs the transporter with an 800 or ordinary phone number providing automated access to that server. Either in the original product or in an object automatically fetched by the transporter, a content list of available choices can be provided, enabling the user to select desired objects to be fetched. When the selected object or objects has been satisfactorily retrieved, the transporter or an associated user interface, either terminates communications or gives the user the option to transport another object to or from the remote source.

Alternatively to direct dial access to a vendor-maintained remote server, the transporter can be coded to access the Web or equivalent online network, via an access provider, to retrieve one or more specified information objects from the Web using an URL, and to terminate the online session after receipt of the specified objects. If desired after retrieval of an object via the online network, confirmation, or other data can be returned to a pre-designated server via direct dial to that server, bypassing the online network.

A music industry application of the invention can thus embody the inventive offline browser system described above, as a music supplementer system, particularly adapted to the requirements of Music CD Extra and Music Enhanced CD formats providing useful benefits to users lacking online subscriptions.

The music supplementer system ("MSS" herein) can comprise an offline browser system with direct-dial support, a local browser-viewer module with HTML Web page viewing functionality, and preferably with a base set of content elements in HTML format with optional selections of standard Web content or other material for example Adobe's ACROBAT (trademark) or other viewers. The base content elements can conform to an enabling specification appropriate to the MSS and can include any desired content, for example, a basic home page, a tour schedule page, a multi-media download page, a fan club page, a merchandise page, a news page and an artists or other artists page. Preferably, any links on these pages are edited, modified or managed for local execution as described herein. Such pages can be functionally modified versions of online available Web pages, as described above. Key functions can be controlled and customized using HTML pages, or in other appropriate ways, while the invocation of control functions can be done by intercepting links employing a helper application, or via API or viewer customization or other means as described hereinabove.

Various special-purpose useful links can be provided, for example, a "Get Update" link in a home page that refreshes base content by retrieval from a remote source and provides specified optional elements.

Links to optional items for download can trigger transporter functions, as described, to fetch the optional item object if it is not present locally or can simply invoke the object, or a viewer for the object, if it is present locally. Such objects could, for example, include audio or video samples.

Transaction pages, simulating actual Web pages, if desired, can be provided to trigger sends to a remote server to enable joining a fan club, or ordering merchandise, or other user-initiated transaction. Simple transporter send functions can be used for information submission, such as product registrations, and server response and gateway functions can be employed when a response or confirmation is needed.

A user control facility to edit a fetch and send list for the transporter activatable from any desired page can also be provided.

A client system content control component or function, to be implemented at the user's station, to track the presence and status of information objects on the user's storage facilities, including any CD-ROM and hard disk can be provided to control link execution and editing, along with a link manager, as described.

Online Network Charging Mechanism

A drawback of a distributed online network, such as the Internet, which lacks central administration is the difficulty of implementing convenient charging mechanisms. Telephone networks provide a number of charging options, notably, caller-paid charges, collect calls which reverse charges to the called party, subject to the called party's selective approval; sponsor-paid 800- and 888-calls where all calls are paid by the called party; and caller-paid 900- calls which provide for revenue splitting between the telephone company and the called party.

Such services are not generally available on the Internet. Credit cards are now being widely used on the Internet, although some people have lingering security concerns. However, though useful for major purchases, credit cards are not suitable for small time-related charges and do not offer a medium enabling sponsors to provide free access. Standard Internet charging methods require establishment of a subscription with an access provider such as one of the major online services, for example CompuServe and America Online, or with one of the specialized Internet service providers, and generally include usage (time) related charges (either explicitly or implicitly). This approach has the drawbacks described above for casual, first-time and occasional users and limits the marketing uses of the Internet.

Networks managed by centralized service providers for example SPRINTNET or BT TYMNET (trademarks), offer systems enabling such networks to simulate some telephone network charging capabilities. Thus the X.25 standard for packet switching networks provides reverse charging options and a call-negotiation process that determines whether a called server or host will accept collect calls. A caller or user must supply a billed account ID and password for caller paid charges or may be furnished with a special reverse-charge account ID and password.

X.75 standards permit call negotiation and reverse charging mechanisms to be applied across interconnections between individual X 25 networks, allowing some global coordination. Internet protocols do not provide for such call negotiation and charging management. The packet-switched X.25 model does not appear to solve the problem of overcoming the access providers charges and formalities that impede novices and casual users and prevent true, casual sponsor-paid access by any modem-equipped computer user to the sponsor's Internet site, because it is specific to the X.25 protocol and no provision for an equivalent capability is provided for in the Internet protocol.

To solve these and other problems, the invention provides an Internet charging mechanism, including computer-implemented enabling software, in the form of a charge-management module to be applied as a higher level protocol above the enabling online network protocol such for example as the Internet TCP/IP protocols. The charge-management module preferably comprises user, server and access point components operated at the nodes or points of access to identify collect and other calls at each access point, to provide session-negotiation functions and to determine if a called server will accept charges before a call is completed. Hosts that accept collect calls can have an option of selectively controlling access to specific account IDs.

User components of the charge management module preferably include a user interface button or other selection requesting sponsored access to a resource and which is effective to activate the charge management mechanism on the network, or such requests could be an automatic default, or implied by the URL specified. The access point module can collect usage data for calls made via the access point operator and generate bills and call details for the sponsor. The sponsor or server component screens and authorizes or rejects call requests received from the access point. The details of this process could be specific to a single ISP to work among users and servers directly connected to its network only, but preferably a common coordinating mechanism analogous to X.75 could be used by a large number of cooperating ISPs.

900-number equivalent revenue-collecting functionality can be provided by means of a billing gateway server established to manage session setup for revenue-generating calls using specially charged account IDs. The billing servers can allocate a caller's account and credit status, identify the pricing algorithms to be applied for the called server, and maintain an activity record for end-user billing.

Such increased flexibility in charging can enhance and facilitate widespread use of the Internet for both short-burst connectivity applications and for fully online applications. Coupled with the capabilities of the inventive transporter, such novel charging mechanisms can enable new Internet (or other online network) market services such, for example, as allowing non-subscribing users to obtain free sponsored service, or to obtain service-for-fee on a discrete, ad-hoc, time-of-need basis.

Intermittent Web Searching

Searching of the Web, or Internet, or other adequately standardized wide area network replete with data sources, can be understood and accomplished using the transporter as a special case of transaction handling, using similar mechanisms to those described above for transaction handling.

Thus, a search request is simply a send transaction to a search engine, which responds with a fetch object (also referenced as a "response object" in the parent application) comprising a result list or hit list of objects found to match the search, which is then returned to the user, at which time a disconnection can be made. This result can then be used as normal hyperlinked content to obtain the actual target objects in a subsequent request, or a revised search transaction can be submitted. In a similar manner to what was described in relation to browsing, the effect of an ongoing interactive session for searching and transactions can be simulated by a series of short burst transporter-implemented connections.

This intermittent mode of searching can be further exploited using techniques such as those described in the parent application for combining indexes or other content into a single seamless search. As described, an index (or content set) on CD-ROM could be supplemented by an updated supplementary index (or content set) that had been subsequently retrieved to hard disk. It will be apparent that the searching-as-transaction approach can be used in the same way to supplement information already retrieved. For example, a search of content on CD (and hard disk) which is current as of a given date can be supplemented by a search transaction requesting the same search, and additionally specifying that the results be limited to content with a date more recent than that given date. In this way, only the new items not already present would be retrieved, for optimum efficiency in search and transmission time. The result can then be merged with the local results to produce a fully current, complete result (again sorted in whatever order is desired). This approach permits very significant benefits, for example in the case of the searching of general purpose Internet indexes such as YAHOO or LYCOS (trademarks), where repeated identical searches may be done weeks or months apart, with redundancy in all but the most recent results, only the incremental content need actually be obtained and transmitted. Since much Internet activity consist of just such searches, the processing and communications cost savings are potentially very sizeable. Widespread adoption of such connect-time optimized search techniques could even help economize on Internet traffic.

Back Channel for Interactive Systems

A further valuable application of the information object transporter of the invention is to enable a novel interactive communications system by providing back-channel communications via dial-up connections from a population of users to a broadcaster distributing analog or digital material over a one-way primary channel, such as TV air, cable or satellite or data subchannels. Employing a configuration as described in Level 1, this is primarily a send application, where users send objects such as a customer service responses, video program requests, or the like back to the broadcaster, or a vendor coupled to the broadcaster, by dial-up, or equivalent, over a telephone or equivalent point-to-point network.

Optionally, the inventive transporter may be used to fetch objects communicated over the primary broadcast channel. In this case the active request for a fetch object in the manifest could be effected in various ways depending on the nature of the network and the request. If the request were for a standard object scheduled for transmittal via the primary broadcast channel, the transporter would simply request of the local broadcast interface that the object be provided when received. Custom broadcast transmissions could be first requested via a send through the back channel as described above. It will be understood that fetched objects may be transmitted over either channel, with the best choice depending on the characteristics of the network (including any local station addressability characteristics), the content, and the traffic patterns.

Web Publishing

Prior to the date of this application, the concept of publishing on the Web has become a commonplace. Publication is achieved simply by posting a Web page or pages at a Web site where any Web user is free to examine the posting. In addition, it may be assumed that one or more search engines will eventually locate the content, leading interested browsers to the site, and links leading from other Web sites may be set up. Unlike publication in the more commonly understood sense of mass distribution of copies of a document or other work, Web publication is passive in nature: a single copy of the work, assembled according to Web standards, is posted for browsers to read and copy, rather like a document in a library.

Thus, a would-be Web publisher merely has to prepare their content and post it to a suitable site. Since Web sites are computer servers located remotely from the ordinary user or browser, and an ordinary user may have difficulties in mastering the complexities of transmitting files to such a server, it will be apparent that the inventive transporter provides an excellent means of facilitating the transport of documents or other objects from their would-be publishers with local, modem-equipped computer stations, to a Web server via direct dial up connection, using any appropriate ones of the tools and architectures described herein. Equally, the transporter can be used to shuttle acknowledgment and other publication confirmation details back to the originating user. In such an application users will typically have basic Internet connectivity, and this will preferably be employed by the transporter. A benefit of using the transporter is simplification of the transaction for both the user and the service provider.

Thus the transporter can provide an automatic upload including connection, interaction with a user interface to enable selection of files for Web publication; execute a send to load the content to a Web server, a logically distinct server which may be accessed via a distribution server, as described herein, and, if desired, submitted to a search engine via a gateway connection, also as described.

New or improved electronic information products are made possible by the novel information transporter disclosed herein, for example, CD-ROM-based products updated from online services, updatable periodical magazine collections, catalog-based computer shopping with order entry and optionally, order confirmation.

Recently Contemplated CD-ROM Products Updatable from Online Services

A CD-ROM-based product with online service updatability called "MICROSOFT Complete Baseball" (MICROSOFT is a trademark) was announced by Microsoft Corporation apparently on Mar. 1, 1994, with a Jun. 15, 1994 availability date. A product brochure received by the present inventor on April 26 describes a multimedia history of baseball which can be updated with daily scores from an online service, by modem. Nothing in the sales materials suggests any separable information transport components marketable for use with other information products.

In late April 1994, CompuServe® (trademark) online information service announced plans for a CD-ROM information product to be used in conjunction with its online service. The CompuServe® CD-ROM information product online service is usable only with that service, and requires users of its online component to be CompuServe® member/subscribers, on terms such as described above, which terms restrict the CD-ROM product's marketability. The CD-ROM content and user interface is limited to that provided by CompuServe®. Accordingly, such a dedicated CD-ROM service is not a satisfactory solution to independent publishers looking for economical update means, because they will be limited to whatever user interface and data management flexibility the online vendor may provide which will substantially restrict any creative look-and-feel identity the publisher may have provided in their own product. Thus the CD-ROM product is described by CompuServe® in the statement: "It is, essentially, a new window on CompuServe . . . " This product description does not suggest an ability to obtain updated online information for integrated local, offline use with an original information product stored on the CD-ROM, as is provided by the present invention.

In addition to CD-ROM-based products, various new information distribution methods and services are made possible by embodiments of the present invention. The object source can be a remote server equipped with a cooperative communications module closely molded to work effortlessly with the information transporter for distributing objects to a wide base of users. Such a remote server can be linked to a vendor or gatewayed to other information object sources or electronic publishers, and exploit its smooth and efficient information transport capabilities to act as a distribution point for such vendors, sources or publishers.

Thus, the invention further comprises such a special-purpose server designed for use with the novel information transporter and the special-purpose server can be established as a distribution service for publishers who incorporate the information transporter in their products. The invention also provides a method of operating a server to provide such a software service and server-enabling software.

CONCLUSION

The present invention has been described above with the aid of functional building blocks illustrating the performance of functions and relationships thereof. At least some of the boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention.

It is to be appreciated that the Detailed Description section, and not the Summary and Abstract sections, is intended to be used to interpret the claims. The Summary and Abstract sections can set forth one or more, but not all exemplary embodiments of the present invention as contemplated by the inventor, and thus, are not intended to limit the present invention and the appended claims in any way.

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:
1. A computer implemented method, comprising:
receiving first user identification information at a remote computer system over a communications network from a user station during a first user-initiated communication session for a user not previously identified to the remote computer system;
sending second information that is a function of the first user identification information and that is different from the first user identification information from the remote computer system to the user station over the communications network during the first user-initiated communication session to be stored automatically at the user station;
storing third information that is based on the first user identification information at a location remote from the user station and accessible to the remote computer system;
receiving at the remote computer system the second information over the communications network during a subsequent and separate user-initiated communication session automatically from the user station;
retrieving the stored third information at the remote computer system using the received second information, during the subsequent and separate communication session;
using the retrieved third information for interaction with the remote computer system during the subsequent and separate communication session;
receiving first user station identification information at the remote computer system from the user station during the first user-initiated communication session;
sending fourth information that is a function of the first user station identification information and that is different from the first user station identification information to the user station over the communications network during the first user-initiated communication session to be stored automatically at the user station;
storing fifth information that is based on the first user station identification information at the location remote from the user station and accessible to the remote computer system;
receiving the fourth information over the communications network during the subsequent and separate user-initiated communication session automatically from the user station; and
retrieving the stored fifth information using the received fourth information during the subsequent and separate communication session.

2. The method according to claim 1, wherein the fourth information that is a function of the first user station identification information includes user purchase instructions.

3. The method according to claim 1, wherein the fifth information includes transporter information.

4. The method according to claim 2, wherein the fifth information includes substitution information.

5. The method according to claim 4, wherein the substitution information includes information to substitute out-of-stock items, back-ordered items and color substitution information.

6. A computer implemented method, comprising:
receiving first user identification information at a remote computer system over a communications network from a user station during a first user-initiated communication session for a user not previously identified to the remote computer system;
sending second information that is a function of the first user identification information and that is different from the first user identification information from the remote computer system to the user station over the communications network during the first user-initiated communication session to be stored automatically at the user station;
storing third information that is based on the first user identification information at a location remote from the user station and accessible to the remote computer system;
receiving at the remote computer system the second information over the communications network during a subsequent and separate user-initiated communication session automatically from the user station;
retrieving the stored third information at the remote computer system using the received second information, during the subsequent and separate communication session;
using the retrieved third information for interaction with the remote computer system during the subsequent and separate communication session; and
receiving second user identification information at the remote computer system, sending fourth information that is a function of and different from the second user identification information to the user station and storing fifth information based on the second user identification information at the location remote from the user station.

7. A computer implemented method, comprising:
receiving first user identification information at a remote computer system over a communications network from a user station during a first user-initiated communication session for a user not previously identified to the remote computer system;
sending second information that is a function of the first user identification information and that is different from the first user identification information from the remote computer system to the user station over the communications network during the first user-initiated communication session to be stored automatically at the user station;
storing third information that is based on the first user identification information at a location remote from the user station and accessible to the remote computer system;
receiving at the remote computer system the second information over the communications network during a subsequent and separate user-initiated communication session automatically from the user station;
retrieving the stored third information at the remote computer system using the received second information, during the subsequent and separate communication session; and
using the retrieved third information for interaction with the remote computer system during the subsequent and separate communication session;
wherein the third information includes user demographics.

8. A computer implemented method, comprising:
receiving first user identification information at a remote computer system over a communications network from a user station during a first user-initiated communication session for a user not previously identified to the remote computer system;
sending second information that is a function of the first user identification information and that is different from the first user identification information from the remote computer system to the user station over the communications network during the first user-initiated communication session to be stored automatically at the user station;
storing third information that is based on the first user identification information at a location remote from the user station and accessible to the remote computer system;
receiving at the remote computer system the second information over the communications network during a subsequent and separate user-initiated communication session automatically from the user station;
retrieving the stored third information at the remote computer system using the received second information, during the subsequent and separate communication session; and using the retrieved third information for interaction with the remote computer system during the subsequent and separate communication session;

wherein the third information includes information for market analysis.

9. A computer implemented method, comprising:

receiving first user identification information at a remote computer system over a communications network from a user station during a first user-initiated communication session for a user not previously identified to the remote computer system;

sending second information that is a function of the first user identification information and that is different from the first user identification information from the remote computer system to the user station over the communications network during the first user-initiated communication session to be stored automatically at the user station;

storing third information that is based on the first user identification information at a location remote from the user station and accessible to the remote computer system;

receiving at the remote computer system the second information over the communications network during a subsequent and separate user-initiated communication session automatically from the user station;

retrieving the stored third information at the remote computer system using the received second information, during the subsequent and separate communication session; and using the retrieved third information for interaction with the remote computer system during the subsequent and separate communication session;

wherein the third information includes information for renewals.

10. A computer implemented method, comprising:

receiving first user identification information at a remote computer system over a communications network from a user station during a first user-initiated communication session for a user not previously identified to the remote computer system;

sending second information that is a function of the first user identification information and that is different from the first user identification information from the remote computer system to the user station over the communications network during the first user-initiated communication session to be stored automatically at the user station;

storing third information that is based on the first user identification information at a location remote from the user station and accessible to the remote computer system;

receiving at the remote computer system the second information over the communications network during a subsequent and separate user-initiated communication session automatically from the user station;

retrieving the stored third information at the remote computer system using the received second information, during the subsequent and separate communication session; and using the retrieved third information for interaction with the remote computer system during the subsequent and separate communication session;

wherein the third information includes a user location.

* * * * *